(12) United States Patent
Fang et al.

(10) Patent No.: US 8,807,884 B2
(45) Date of Patent: Aug. 19, 2014

(54) TOOL HOLDER FOR MULTIPLE DIFFERENTLY-SHAPED CUTTING INSERTS

(75) Inventors: X. Daniel Fang, Brentwood, TN (US);
Jean-Luc Dufour, Franklin, TN (US);
David J. Wills, Franklin, TN (US)

(73) Assignee: Kennametal Inc., Latrobe, PA (US)

( * ) Notice: Subject to any disclaimer, the term of this patent is extended or adjusted under 35 U.S.C. 154(b) by 874 days.

(21) Appl. No.: 12/641,399

(22) Filed: Dec. 18, 2009

(65) Prior Publication Data
US 2011/0150586 A1 Jun. 23, 2011

(51) Int. Cl.
B23C 3/00 (2006.01)
B23C 5/06 (2006.01)
B23C 5/22 (2006.01)
B23B 29/00 (2006.01)

(52) U.S. Cl.
CPC ............... B23C 5/2208 (2013.01); B23C 5/06 (2013.01); B23C 2200/0488 (2013.01); B23C 2200/0444 (2013.01); B23C 2210/168 (2013.01); B23C 2200/0455 (2013.01); B23C 2200/0422 (2013.01); B23C 2200/045 (2013.01); B23C 2200/0405 (2013.01)
USPC ................. 407/66; 407/67; 407/33; 407/35

(58) Field of Classification Search
CPC  B23B 29/00; B23B 2205/12; B23B 2205/00; B23B 2210/02; B23Q 2003/00
USPC .......... 407/113, 114, 115, 116, 66, 67, 33, 35
See application file for complete search history.

(56) References Cited

U.S. PATENT DOCUMENTS

| | | | |
|---|---|---|---|
| 1,838,520 A * | 12/1931 | Archer | ........................ 407/104 |
| 3,399,442 A | 9/1968 | Jones et al. | |
| 3,557,416 A | 1/1971 | Jones | |
| 3,805,349 A | 4/1974 | Nose | |
| 3,806,713 A | 4/1974 | Ryberg | |
| 4,274,766 A | 6/1981 | Raupp et al. | |
| 4,292,365 A | 9/1981 | Kane et al. | |
| 4,294,565 A | 10/1981 | Erkfritz | |
| 4,412,763 A | 11/1983 | Shallenberger, Jr. | |
| 4,461,602 A | 7/1984 | Zettl | |
| 4,493,596 A | 1/1985 | Grunsky et al. | |
| 4,595,322 A | 6/1986 | Clement | |
| 4,659,264 A | 4/1987 | Freidline | |
| 4,681,488 A | 7/1987 | Markusson | |
| 4,699,549 A | 10/1987 | Shimomura et al. | |
| 4,760,548 A | 7/1988 | Baker et al. | |
| 4,940,369 A | 7/1990 | Aebi et al. | |

(Continued)

FOREIGN PATENT DOCUMENTS

CN  1130884 A  9/1996
CN  1171314 A  1/1998
(Continued)

OTHER PUBLICATIONS

U.S. Appl. No. 12/369,796, filed Feb. 12, 2009.

(Continued)

*Primary Examiner* — Will Fridie, Jr.
(74) *Attorney, Agent, or Firm* — Larry R. Meenan, Esq.

(57) ABSTRACT

Insert pockets of tool holders configured to accommodate multiple differently-shaped cutting inserts are disclosed. Cutting tool holders and cutting tool systems are also disclosed.

20 Claims, 51 Drawing Sheets

(56) References Cited

U.S. PATENT DOCUMENTS

| | | | |
|---|---|---|---|
| 5,052,863 A | 10/1991 | Satran | |
| 5,071,292 A | 12/1991 | Satran | |
| 5,092,718 A | 3/1992 | Shallenberger | |
| 5,094,572 A | 3/1992 | Alsbury et al. | |
| 5,137,398 A | 8/1992 | Omori et al. | |
| 5,145,294 A * | 9/1992 | Flueckiger | 407/42 |
| 5,145,295 A | 9/1992 | Satran | |
| 5,193,946 A | 3/1993 | Arai et al. | |
| 5,203,649 A | 4/1993 | Katbi et al. | |
| 5,226,761 A | 7/1993 | Satran et al. | |
| 5,244,318 A | 9/1993 | Arai et al. | |
| 5,246,315 A | 9/1993 | Hansson et al. | |
| 5,333,972 A | 8/1994 | Bernadic et al. | |
| 5,338,135 A | 8/1994 | Noguchi et al. | |
| 5,340,246 A | 8/1994 | Tukala | |
| 5,346,336 A | 9/1994 | Rescigno | |
| 5,377,116 A | 12/1994 | Wayne et al. | |
| 5,388,932 A | 2/1995 | DeRoche et al. | |
| 5,408,598 A | 4/1995 | Pryor, Jr. | |
| 5,421,679 A | 6/1995 | Pantzar et al. | |
| 5,443,335 A | 8/1995 | Shimano et al. | |
| 5,454,670 A * | 10/1995 | Noda et al. | 407/42 |
| 5,474,407 A | 12/1995 | Rodel et al. | |
| 5,586,843 A | 12/1996 | Minicozzi | |
| 5,593,255 A | 1/1997 | Satran et al. | |
| 5,634,745 A | 6/1997 | Wiman et al. | |
| 5,658,100 A | 8/1997 | Deiss et al. | |
| 5,688,081 A | 11/1997 | Paya | |
| 5,695,303 A | 12/1997 | Boianjiu et al. | |
| 5,725,334 A | 3/1998 | Paya | |
| 5,762,453 A | 6/1998 | Arai et al. | |
| 5,791,831 A | 8/1998 | Shimano et al. | |
| 5,791,833 A | 8/1998 | Nielbauer | |
| 5,791,883 A | 8/1998 | Ban et al. | |
| 5,803,674 A | 9/1998 | Satran et al. | |
| 5,951,212 A | 9/1999 | Emoto et al. | |
| 5,951,213 A | 9/1999 | Fauser et al. | |
| 5,957,629 A | 9/1999 | Hessman et al. | |
| 5,957,635 A | 9/1999 | Nuzzi et al. | |
| 5,971,676 A | 10/1999 | Kojima | |
| 6,050,752 A | 4/2000 | DeRoche | |
| 6,053,671 A | 4/2000 | Stedt et al. | |
| 6,100,904 A | 8/2000 | Gupta | |
| 6,142,716 A | 11/2000 | Jordberg et al. | |
| 6,152,658 A * | 11/2000 | Satran et al. | 407/103 |
| 6,164,878 A * | 12/2000 | Satran et al. | 407/113 |
| 6,186,705 B1 | 2/2001 | Kumar et al. | |
| 6,234,724 B1 * | 5/2001 | Satran et al. | 407/43 |
| 6,238,133 B1 | 5/2001 | DeRoche et al. | |
| 6,244,791 B1 | 6/2001 | Wiman et al. | |
| 6,257,807 B1 | 7/2001 | Heinloth | |
| 6,270,297 B1 | 8/2001 | Fang et al. | |
| 6,540,448 B2 | 4/2003 | Johnson | |
| 6,543,970 B1 | 4/2003 | Qvarth et al. | |
| 6,599,061 B1 | 7/2003 | Nelson | |
| 6,623,217 B2 | 9/2003 | Brockett et al. | |
| 6,655,881 B2 | 12/2003 | Shimizu | |
| 6,669,412 B1 | 12/2003 | Hirose et al. | |
| 6,684,742 B1 | 2/2004 | White | |
| 6,715,967 B2 | 4/2004 | Wiman et al. | |
| 6,722,824 B2 | 4/2004 | Satran et al. | |
| 6,769,844 B2 | 8/2004 | Waggle | |
| 6,811,359 B2 | 11/2004 | Craig | |
| 6,835,028 B2 | 12/2004 | Usui et al. | |
| 6,884,006 B2 | 4/2005 | Nagashima | |
| 6,921,233 B2 | 7/2005 | Duerr et al. | |
| 6,929,427 B2 | 8/2005 | Satran | |
| 6,929,429 B2 | 8/2005 | Riviére | |
| 6,957,935 B2 | 10/2005 | Sung et al. | |
| 6,960,049 B2 | 11/2005 | Inayama | |
| 7,021,871 B2 | 4/2006 | Arvidsson et al. | |
| 7,037,051 B2 * | 5/2006 | Wermeister | 407/113 |
| 7,070,363 B2 | 7/2006 | Long, II et al. | |
| 7,147,407 B2 | 12/2006 | Satran | |
| 7,201,545 B2 | 4/2007 | Ejderklint | |
| 7,220,083 B2 | 5/2007 | Festeau et al. | |
| 7,232,279 B2 * | 6/2007 | Smilovici et al. | 407/113 |
| 7,234,899 B2 | 6/2007 | Fang et al. | |
| 7,241,082 B2 | 7/2007 | Smilovici et al. | |
| 7,281,884 B2 | 10/2007 | Maeda | |
| 7,306,409 B2 | 12/2007 | Stabel et al. | |
| 7,325,471 B2 | 2/2008 | Massa et al. | |
| 7,367,755 B2 | 5/2008 | Wurfels et al. | |
| 7,393,163 B2 | 7/2008 | Edvardsson et al. | |
| 7,494,303 B2 | 2/2009 | Koskinen | |
| 7,537,419 B2 | 5/2009 | Sjoberg et al. | |
| 7,547,164 B2 | 6/2009 | Hessman | |
| 7,600,952 B2 | 10/2009 | Festeau et al. | |
| 7,604,440 B2 | 10/2009 | Fouquer | |
| 7,687,156 B2 | 3/2010 | Fang et al. | |
| 7,722,297 B2 * | 5/2010 | Dufour et al. | 407/66 |
| 7,846,551 B2 | 12/2010 | Fang et al. | |
| 8,162,572 B2 | 4/2012 | Festeau et al. | |
| 2003/0031520 A1 | 2/2003 | Hintze et al. | |
| 2003/0206777 A1 | 11/2003 | Gyllengahm | |
| 2003/0226694 A1 | 12/2003 | Moseley | |
| 2006/0115340 A1 | 6/2006 | Nishio et al. | |
| 2006/0245837 A1 | 11/2006 | Dufour et al. | |
| 2007/0041798 A1 | 2/2007 | Nasu et al. | |
| 2008/0170919 A1 | 7/2008 | Dufour et al. | |
| 2008/0304924 A1 | 12/2008 | Engstrom | |
| 2009/0097929 A1 | 4/2009 | Festeau et al. | |
| 2009/0279962 A1 | 11/2009 | Dufour et al. | |
| 2010/0080662 A1 | 4/2010 | Satran et al. | |
| 2010/0183386 A1 | 7/2010 | Heinloth et al. | |
| 2010/0202839 A1 | 8/2010 | Fang et al. | |
| 2010/0272526 A1 | 10/2010 | Dufour et al. | |
| 2010/0284753 A1 | 11/2010 | Festeau et al. | |
| 2010/0303563 A1 | 12/2010 | Fang et al. | |
| 2012/0213605 A1 | 8/2012 | Festeau et al. | |

FOREIGN PATENT DOCUMENTS

| | | |
|---|---|---|
| CN | 1041499 C | 1/1999 |
| CN | 1041901 C | 2/1999 |
| CN | 1045557 C | 10/1999 |
| CN | 1117646 C | 8/2003 |
| CN | 1484563 A1 | 3/2004 |
| DE | 9400327 U1 | 3/1994 |
| DE | 4118070 C2 | 2/1995 |
| DE | 4400538 A1 | 7/1995 |
| EP | 0035848 B1 | 2/1985 |
| EP | 0285660 A1 | 10/1988 |
| EP | 0432340 A1 | 6/1991 |
| EP | 1157768 A1 | 11/2001 |
| EP | 1205877 A1 | 5/2002 |
| EP | 1346789 B1 | 11/2006 |
| EP | 1749602 A2 | 2/2007 |
| EP | 1952925 A2 | 8/2008 |
| EP | 2119520 A1 | 11/2009 |
| FR | 2364724 A1 | 4/1978 |
| GB | 951624 | 3/1964 |
| GB | 2298600 A | 9/1996 |
| IL | 169340 | 4/2010 |
| JP | 49-32280 A | 3/1974 |
| JP | 52-103081 A | 8/1977 |
| JP | 59-214501 A | 12/1984 |
| JP | 61-201719 U | 12/1986 |
| JP | 4-315510 A | 11/1992 |
| JP | 5-285708 A | 11/1993 |
| JP | 8-039329 | 2/1996 |
| JP | 8-174327 A | 7/1996 |
| JP | 8-243831 A | 9/1996 |
| JP | 11-129109 A | 5/1999 |
| JP | 2002-301603 | 10/2002 |
| JP | 2003-25135 A | 1/2003 |
| JP | 2003-275920 | 9/2003 |
| JP | 2004-291099 | 10/2004 |
| KR | 10-0430868 | 6/2004 |
| RU | 2138371 C1 | 9/1999 |
| RU | 2005110805 A | 10/2006 |
| RU | 2318634 C2 | 3/2008 |
| SU | 344930 A | 8/1972 |
| SU | 814573 A1 | 3/1981 |

(56) References Cited

FOREIGN PATENT DOCUMENTS

| | | | |
|---|---|---|---|
| SU | 1278110 | A1 | 12/1986 |
| SU | 1504006 | A1 | 8/1989 |
| WO | WO 92/21467 | A1 | 12/1992 |
| WO | WO 94/12302 | A1 | 6/1994 |
| WO | WO 95/00272 | A1 | 1/1995 |
| WO | WO 95/32071 | A1 | 11/1995 |
| WO | WO 96/35538 | A1 | 11/1996 |
| WO | WO 02/18083 | A2 | 3/2002 |
| WO | WO 02/20206 | A1 | 3/2002 |
| WO | WO 02/102536 | A1 | 12/2002 |
| WO | WO 03/099495 | A1 | 12/2003 |
| WO | WO 2004/096474 | A1 | 11/2004 |
| WO | WO 2006/041353 | A1 | 4/2006 |

OTHER PUBLICATIONS

U.S. Appl. No. 12/431,384, filed Apr. 28, 2009.

Bourke, Paul, "Spline Curves (in 3D)", Nov. 1996, XP002300113. printed from http://astronomy.swin.edu.au/~pbourke/curves/spline/, 5 pages.

Shi dongping, et al., CAD/CAM for Cemented Carbide Indexable Inserts, J. Huazhong Univ. of Sci. & Tech., vol. 22, No. 2, Feb. 1994, with English abstract, 4 pages.

Shaw et al., "The Rotary Cutting Tool," Transactions of the ASME, Aug. 1952, Cambridge, Massachusetts, pp. 1065-1076.

Armarego et al., "Fundamental Studies of Driven and Self-Propelled Rotary Tool Cutting Processes—I. Theoretical Investigation," Int. J. Mach. Tools Manufact., vol. 34, No. 6, pp. 785-801.

Davis et al., Metals Handbook Ninth Edition, vol. 16, Machining, 1989, p. 311.

Milling Cutters and End Mills, The American Society of Mechanical Engineers, An American National Standard, ASME B94.19-1997, Revision of ANSI/ASME B94.19-1985, pp. 2-4.

Fundamentals of Tool Design, Fourth Edition, revised by Dr. John G. Nee, CMfgE, Society of Manufacturing Engineers, 1998, p. 103.

Oberg et al., 26th Edition Machinery's Handbook, A Reference Book for the Mechanical Engineer, Designer, Manufacturing Engineer, Draftsman, Toolmaker, and Machinist, Industrial Press Inc., New York, 2000, pp. 723-724.

U.S. Appl. No. 12/967,441, filed Dec. 14, 2010.

U.S. Appl. No. 13/721,335, filed Dec. 20, 2012, (34 pages).

* cited by examiner (Section A-A)

(Section B-B)

(Section C-C)

(Section F-F)

(Section G-G)

(Section H-H)

TOOL HOLDER FOR MULTIPLE DIFFERENTLY-SHAPED CUTTING INSERTS

TECHNICAL FIELD

The present disclosure is generally directed to cutting tools, including cutting tool holders and cutting inserts. In particular, the present disclosure is directed to a cutting insert pocket configuration in a cutting tool holder for multiple differently-shaped indexable cutting inserts.

BACKGROUND

Indexable cutting inserts for cutting tools include, for example, cutting inserts made of carbide, ceramic, coated carbide, coated ceramic, or other hard materials. Cutting inserts generally have a unitary structure and one or more cutting edges located at various corners or around peripheral edges of the inserts. Indexable cutting inserts are mechanically secured to a tool holder, but the inserts are adjustable and removable in relation to the tool holder. Indexable cutting inserts may be readily re-positioned (i.e., indexed) to present a new cutting edge to the workpiece or may be replaced in a tool holder when the cutting edges dull or fracture, for example. In this manner, indexable insert cutting tools are modular cutting tool assemblies that include at least one cutting insert and a tool holder.

Cutting inserts include, for example, milling inserts, turning inserts, drilling inserts, and the like. Milling inserts and drilling inserts are used in material cutting operations where the cutting tool rotates while a workpiece remains stationary. Milling tools and drilling tools include a rotary tool holder and at least one milling insert or drilling insert mechanically secured in respective insert pockets formed in the tool holder. Turning inserts are used in material cutting operations where the cutting tool remains stationary while the workpiece rotates. Turning tools include a tool holder and at least one turning insert mechanically secured in respective insert pockets formed in the tool holder.

The present disclosure describes various innovations in cutting tool design characterized by versatile insert pocket configurations that are structured to mechanically engage, support, and secure multiple differently-shaped cutting inserts.

SUMMARY

Embodiments disclosed herein are directed to cutting insert pockets of tool holders, wherein the cutting insert pockets include a seat face and insert-engaging pocket walls. The seat face is configured to engage a top side or a bottom side of a cutting insert. The insert-engaging pocket walls are configured to engage peripheral sides of multiple differently-shaped cutting inserts. The cutting insert pocket is configured to accommodate a round-shaped cutting insert and at least one polygon-shaped cutting insert.

Other embodiments disclosed herein are directed to cutting tool holders and cutting tool systems including insert pockets configured to accommodate a round-shaped cutting insert and at least one polygon-shaped cutting insert.

It is understood that the invention disclosed and described herein is not limited to the embodiments disclosed in this Summary.

BRIEF DESCRIPTION OF THE DRAWINGS

Various characteristics of the non-limiting embodiments disclosed and described herein may be better understood by reference to the accompanying figures, in which.

Figure 1:
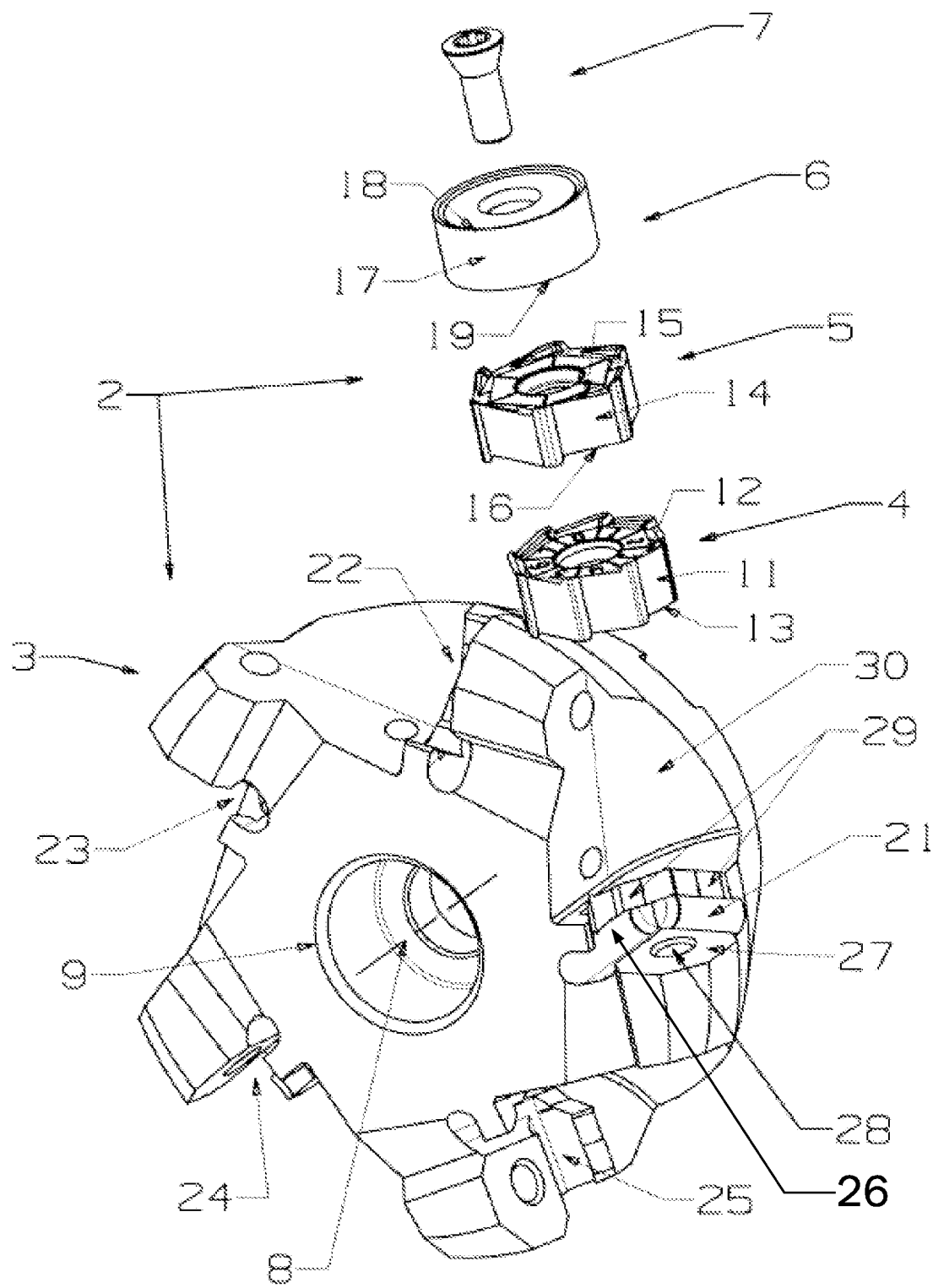
FIG. 1 is a perspective view of an embodiment of a cutting tool system including a tool holder including insert pockets configured to accommodate, alternatively, round-shaped cutting inserts, hexagon-shaped cutting inserts, or octagon-shaped cutting inserts.

The reader will appreciate the foregoing details, as well as others, upon considering the following detailed description of various non-limiting embodiments according to the present disclosure. The reader also may comprehend additional details upon implementing or using embodiments described herein.

DETAILED DESCRIPTION OF NON-LIMITING EMBODIMENTS

It is to be understood that various descriptions of the disclosed embodiments have been simplified to illustrate only those features, aspects, characteristics, and the like that are relevant to a clear understanding of the disclosed embodiments, while eliminating, for purposes of clarity, other features, aspects, characteristics, and the like. Persons having ordinary skill in the art, upon considering the present description of the disclosed embodiments, will recognize that other features, aspects, characteristics, and the like may be desirable in a particular implementation or application of the disclosed embodiments. However, because such other features, aspects, characteristics, and the like may be readily ascertained and implemented by persons having ordinary skill in the art upon considering the present description of the disclosed embodiments, and are, therefore, not necessary for a complete understanding of the disclosed embodiments, a description of such features, aspects, characteristics, and the like is not provided herein. As such, it is to be understood that the description set forth herein is merely exemplary and illustrative of the disclosed embodiments and is not intended to limit the scope of the invention as defined solely by the claims.

In the present disclosure, other than where otherwise indicated, all numbers expressing quantities or characteristics are to be understood as being prefaced and modified in all instances by the term "about." Accordingly, unless indicated to the contrary, any numerical parameters set forth in the following description may vary depending on the desired properties one seeks to obtain in the embodiments according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. Any maximum numerical limitation recited herein is intended to include all lower numerical limitations subsumed therein and any minimum numerical limitation recited herein is intended to include all higher numerical limitations subsumed therein. Accordingly, Applicants reserve the right to amend the present disclosure, including the claims, to expressly recite any sub-range subsumed within the ranges expressly recited herein. All such ranges are intended to be inherently disclosed herein such that amending to expressly recite any such sub-ranges would comply with the requirements of 35 U.S.C. §112, first paragraph, and 35 U.S.C. §132(a).

The grammatical articles "one", "a", "an", and "the", as used herein, are intended to include "at least one" or "one or more", unless otherwise indicated. Thus, the articles are used herein to refer to one or more than one (i.e., to at least one) of the grammatical objects of the article. By way of example, "a component" means one or more components, and thus, possibly, more than one component is contemplated and may be employed or used in an implementation of the described embodiments.

Any patent, publication, or other disclosure material that is said to be incorporated by reference herein, is incorporated herein in its entirety unless otherwise indicated, but only to the extent that the incorporated material does not conflict with existing definitions, statements, or other disclosure material expressly set forth in this disclosure. As such, and to the extent necessary, the express disclosure as set forth herein supersedes any conflicting material incorporated by reference herein. Any material, or portion thereof, that is said to be incorporated by reference herein, but which conflicts with existing definitions, statements, or other disclosure material set forth herein is only incorporated to the extent that no conflict arises between that incorporated material and the existing disclosure material. Applicant reserves the right to amend the present disclosure to expressly recite any subject matter, or portion thereof, incorporated by reference herein.

The present disclosure includes descriptions of various embodiments. It is to be understood that all embodiments described herein are exemplary, illustrative, and non-limiting. Thus, the invention is not limited by the description of the various exemplary, illustrative, and non-limiting embodiments. Rather, the invention is defined solely by the claims, which may be amended to recite any features expressly or inherently described in or otherwise expressly or inherently supported by the present disclosure. Therefore, any such amendments would comply with the requirements of 35 U.S.C. §112, first paragraph, and 35 U.S.C. §132(a).

The various embodiments disclosed and described herein can comprise, consist of, or consist essentially of, the features, aspects, characteristics, limitations, and the like, as variously described herein. The various embodiments disclosed and described herein can also comprise additional or optional features, aspects, characteristics, and the like, that are known in the art or that may otherwise be included in various embodiments as implemented in practice.

The present disclosure is directed to insert pocket configurations in tool holders structured to accommodate multiple indexable cutting inserts having various shapes. The insert pocket configurations feature single structural geometries that can mechanically engage, support, and secure multiple types of cutting inserts, each type having a different shape. In this way, the pocket configurations disclosed and described herein may provide a significant economic advantage by providing a single tool holder configured to accommodate multiple different-shaped indexable cutting inserts, which may provide cost reduction, production simplification, and inventory reduction that benefits both cutting tool manufacturers and cutting tool end-users.

The pocket configurations disclosed and described herein may accommodate single-sided cutting inserts or double-sided cutting inserts. Double-sided cutting inserts generally include two opposed rake faces located on a top side and a bottom side of the unitary insert structure. The opposed rake faces are connected by flank faces located on the peripheral sides of the insert structure. The number of peripheral sides (flank faces) depends on the shape of the insert structure (e.g., parallelogram-shaped inserts have four peripheral sides, hexagon-shaped inserts have six peripheral sides, octagon-shaped inserts have eight peripheral sides, and the like). Double-sided cutting inserts generally include cutting edges located on both the top side and the bottom side of the unitary insert structure. Single-sided cutting inserts generally include cutting edges located on only the top side of the unitary insert structure.

The cutting edges of a cutting insert are formed by the intersections between the peripheral sides and the top side and/or bottom side of the insert structure. In this way, the cutting edges are formed by the intersection of the rake faces and the flank faces. In a single-sided cutting insert, the cutting edges are located at the periphery of the top side. In a double-sided cutting insert, the cutting edges are located at the periphery of the top side and the bottom side of the double-sided insert structure. Various double-sided cutting inserts are described, for example, in U.S. Pat. Nos. 6,543,970; 6,921,233; 6,929,429; 7,232,279; 7,241,082; and 7,306,409, each of which is incorporated by reference herein.

Compared to single-sided indexable cutting inserts, double-sided indexable cutting inserts provide twice the number of available cutting edges, which may reduce costs for both manufacturers and cutting tool end-users. However, the complex geometry of double-sided indexable cutting inserts limits the geometry of the insert pockets in tool holders, which must securely engage and support and, therefore, accommodate a cutting insert without prematurely dulling or otherwise damaging the cutting edges. The complexity increases as the number of peripheral sides and cutting edges increases.

Various embodiments of tool holders described herein include insert pocket configurations structured and shaped to engage and accommodate single-sided and double-sided indexable cutting inserts. The disclosed insert pocket configurations include single pocket geometries structured to engage and accommodate multiple types of indexable cutting inserts, each having different shapes (e.g., circular-shaped, square-shaped, pentagon-shaped, hexagon-shaped, octagon-shaped, and the like). In various embodiments, the disclosed insert pocket configurations include single pocket geometries that can engage and accommodate multiple differently-shaped double-sided indexable cutting inserts.

FIG. 1 is a perspective view of an embodiment of a cutting tool system 2 for milling operations that includes: a tool holder 3; any one of three double-sided cutting inserts (i.e., an octagon-shaped cutting insert 4, a hexagon-shaped cutting insert 5, or a round-shaped cutting insert 6); and a screw 7 to removably secure a cutting insert (4, 5, or 6) in the tool holder 3 in a desired orientation. As described above, a double-sided cutting insert refers to a cutting insert having cutting edges on both the top side and the bottom side of the insert. As such, the octagon-shaped double-sided cutting insert 4 has cutting edges located at the periphery of top side 12 and bottom side 13. The hexagon-shaped double-sided cutting insert 5 has cutting edges located at the periphery of top side 15 and bottom side 16. The round-shaped double-sided cutting insert 6 has cutting edges located at the periphery of top side 18 and bottom side 19.

In FIG. 1, the top sides and bottom sides of each double-sided cutting insert (4, 5, and 6) are connected by generally perpendicular sides located at the periphery of the unitary insert structure. The top side 12 and bottom side 13 of the octagon-shaped cutting insert 4 are connected by peripheral side 11. The top side 15 and bottom side 16 of the hexagon-shaped cutting insert 5 are connected by peripheral side 14. The top side 18 and bottom side 19 of the round-shaped cutting insert 6 are connected by peripheral side 17.

The cutting inserts 4, 5, and 6 are generally referred to as negative cutting inserts in cutting tool terminology. The octagon-shaped double-sided cutting insert 4 has eight cutting edges per side (top and bottom) or sixteen cutting edges in total. The hexagon-shaped double-sided cutting insert 5 has six cutting edges per side (top and bottom) or twelve cutting edges in total. The round-shaped cutting insert 6 has an indefinite number of available cutting edges depending on how the cutting insert is indexed and used in a particular cutting application.

The tool holder 3 has five identical pockets 21, 22, 23, 24, and 25, which are uniformly positioned about the central axis 8 passing through the center hole 9 of the tool holder 3. Each of the five pockets (illustrated in detail by pocket 21 in FIG. 1) includes: a seat face 27 for mechanically contacting and engaging a top or bottom side of a cutting insert, thereby seating the cutting insert in the pocket 21; a screw hole 28 for securing a cutting insert with a screw 7; a relief recess 26 for providing clearance space for the cutting edges of a double-sided cutting insert positioned and secured in the pocket 21; a flute 30 above the pocket 21 for evacuating chips produced during material cutting operations; and a series of pocket walls 29.

The pocket walls 29 include insert-engaging pocket walls that mechanically contact and support a cutting insert positioned in the pocket 21, and non-engaging pocket walls that do not mechanically contact a cutting insert positioned and secured in the pocket 21. The insert-engaging pocket walls are perpendicular to the seat face 27. The non-engaging pocket walls are also shown perpendicular to the seat face 27. However, the pocket walls do not need to be perpendicular as shown.

Figure 2A:
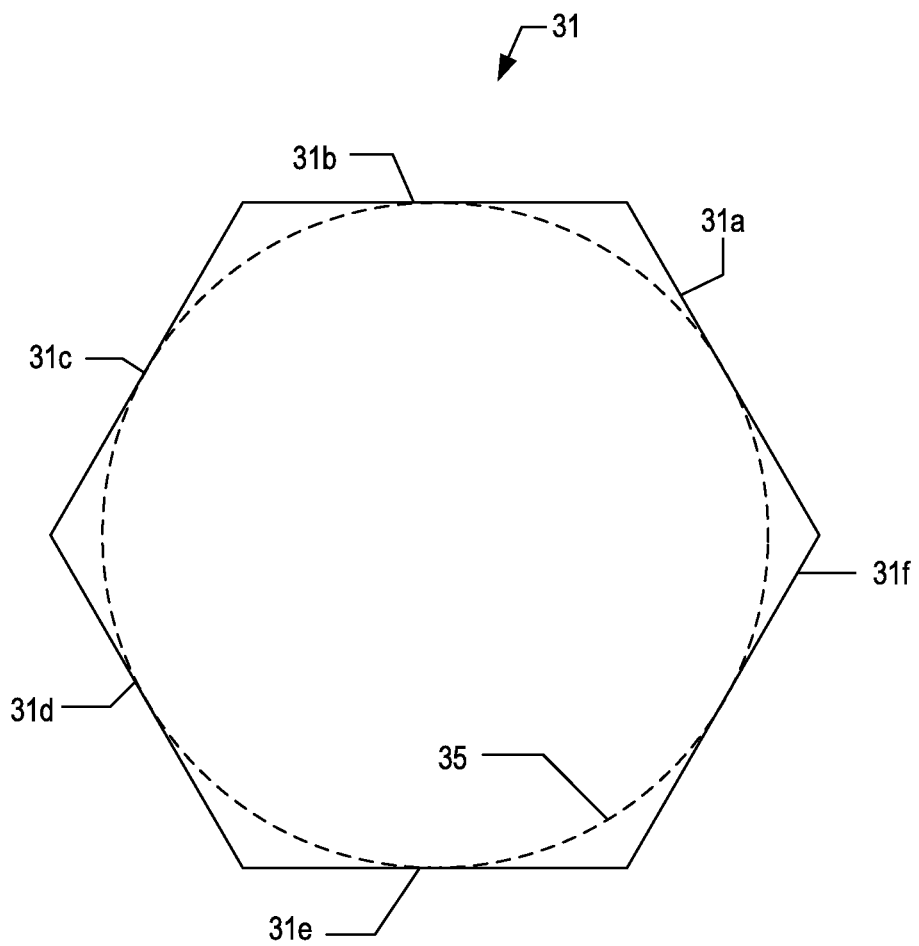
FIGS. 2A-2E are schematic diagrams illustrating the geometrical relationship among a round-shaped cutting insert, a hexagon-shaped cutting insert, and an octagon-shaped cutting insert.
Figure 2B:
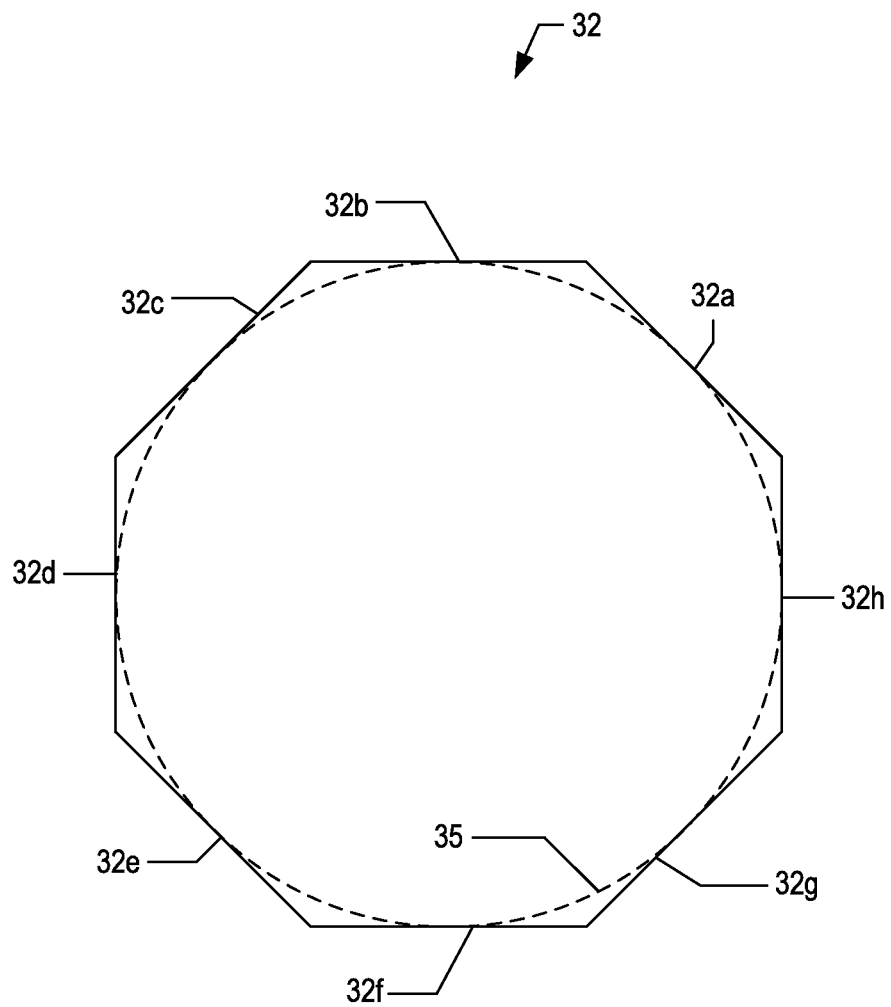
Figure 2C:
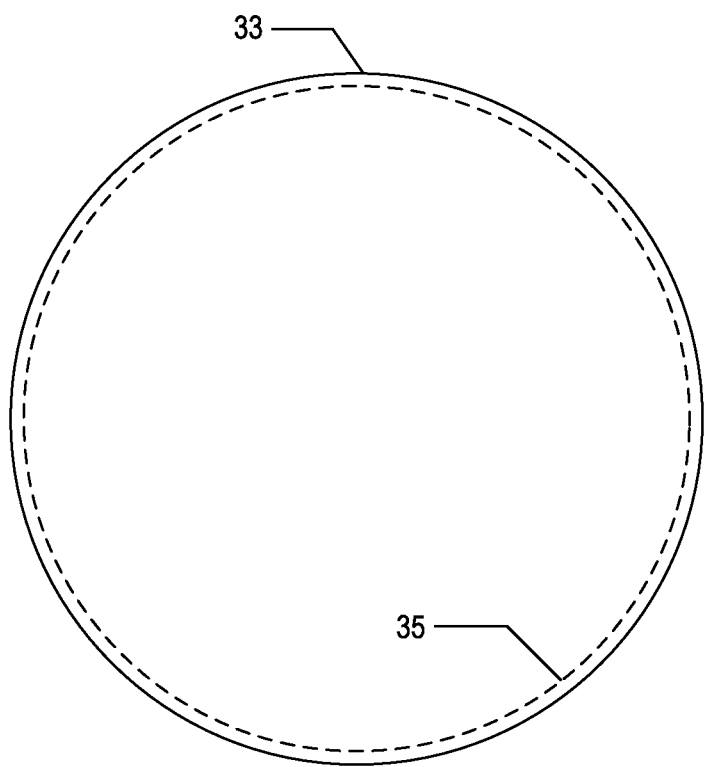
Figure 2D:
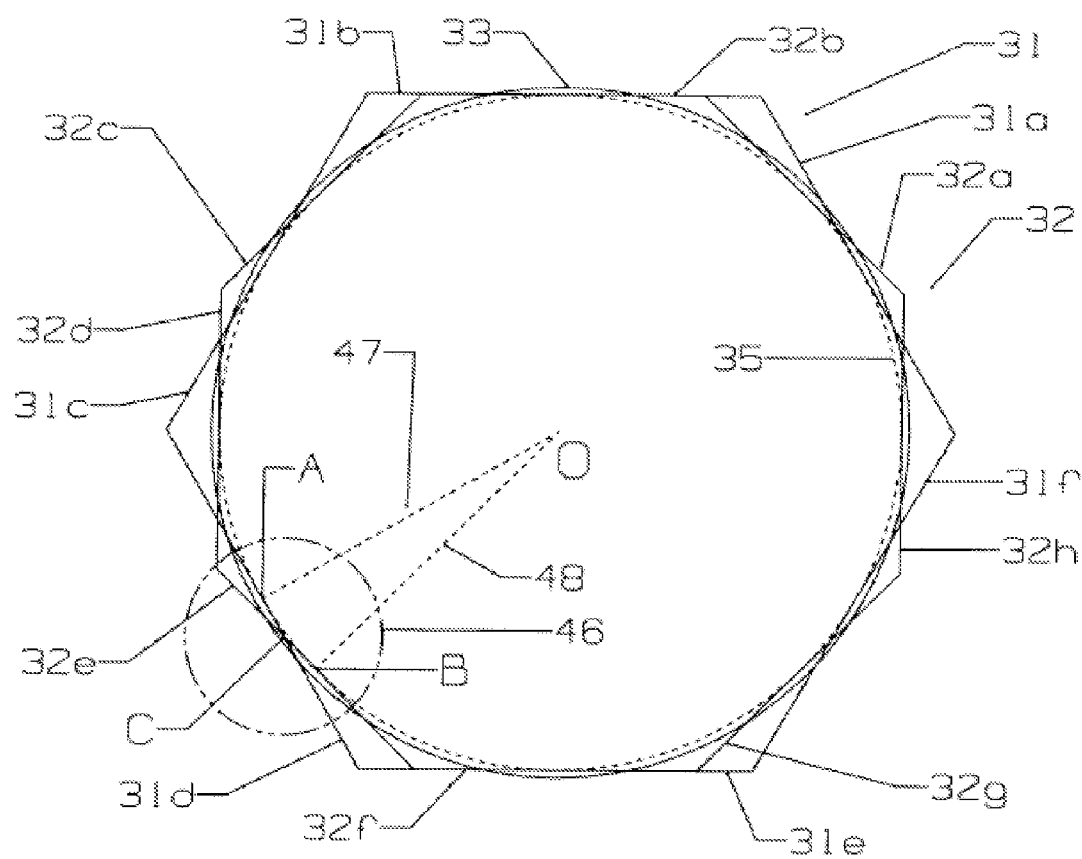
Figure 2E:
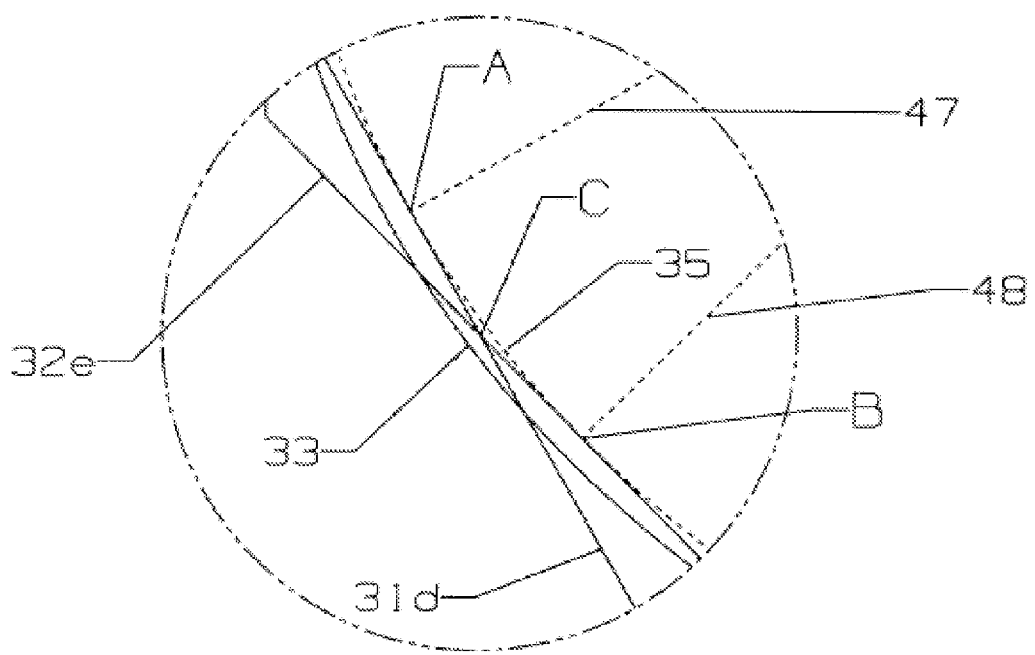
Figure 2F:
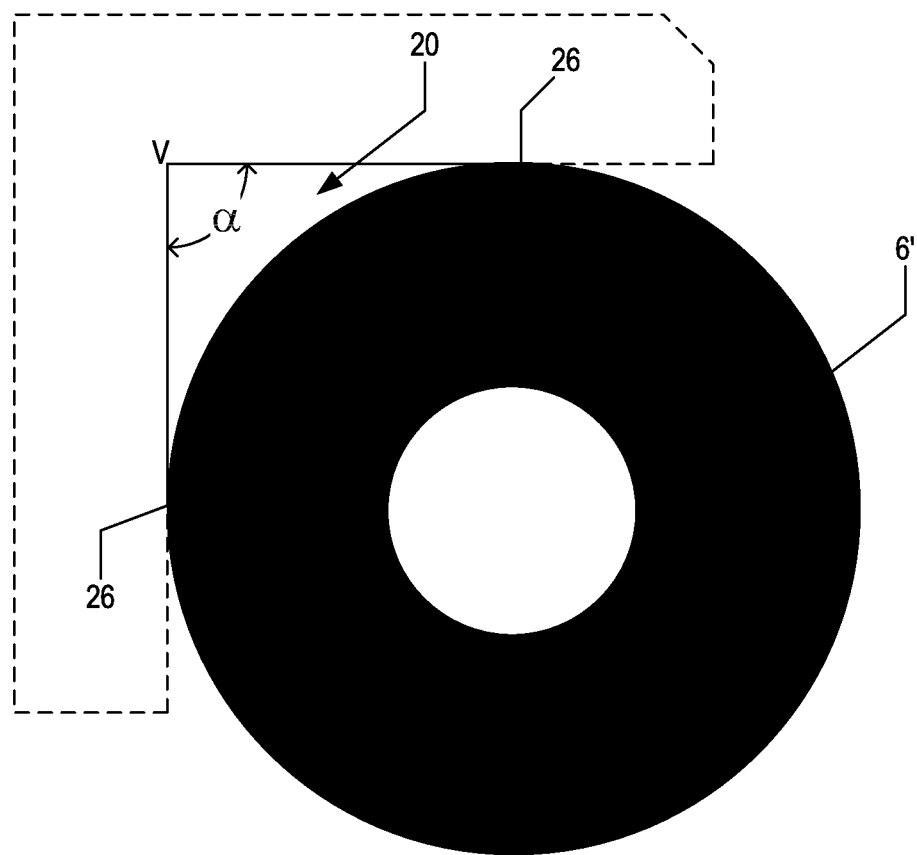
FIG. 2F is a schematic diagram illustrating the orientation of a round-shaped cutting insert positioned in an insert pocket of a tool holder.

FIGS. 2A-2C illustrate an octagon, a hexagon, and a circle, respectively, which may represent an octagon-shaped cutting insert, a hexagon-shaped cutting insert, and a round-shaped cutting insert (e.g., the double-sided cutting inserts 4, 5, and 6 as shown in FIG. 1). FIGS. 2D-2E schematically illustrate the geometrical relationship among an octagon-shaped cutting insert, a hexagon-shaped cutting insert, and a round-shaped cutting insert. FIG. 2F schematically illustrates the orientation of a cutting insert in a pocket.

The hexagon 31 represents the external profile of a hexagon-shaped cutting insert (e.g., cutting insert 5 shown in FIG. 1), and includes six peripheral sides, designated as 31a-31f. The octagon 32 represents the external profile of an octagon-shaped cutting insert (e.g., cutting insert 4 shown in FIG. 1), and includes eight peripheral sides, designated as 32a-32h. The circle 33 represents a round-shaped cutting insert (e.g., cutting insert 6 shown in FIG. 1).

The hexagon 31 and the octagon 32 have the same inscribed circle (IC) 35. The circle 33 has a larger diameter than the IC 35. The circle 33 and the IC 35 are concentric and have the same center point as indicated by the letter "O" in FIG. 2D. The difference between the diameter of the circle 33 and the diameter of the IC 35 is described further below.

In order to securely position a cutting insert in a pocket in a tool holder, a cutting insert should have at least two pocket-engaging surfaces that mechanically contact at least two corresponding insert-engaging pocket walls of the pocket. The pocket-engaging surfaces of cutting inserts are located in regions of the peripheral sides that connect the top side and the bottom side of the cutting inserts. The mechanical contact between the insert-engaging pocket walls of a pocket and the pocket-engaging surfaces of an insert support the insert when the insert is positioned and secured in the pocket.

A V-shaped angle ($\alpha$) is formed between the at least two insert-engaging pocket walls, wherein $0<\alpha<180$. The angle ($\alpha$) formed between the at least two insert-engaging pocket walls has a vertex that points inwardly into the pocket towards the body of the tool holder. For example, FIG. 2F illustrates a round-shaped cutting insert 6' positioned in a pocket 20. The insert 6' mechanically contacts the walls of the pocket with pocket-engaging surfaces 26. Tangential projections of the pocket-engaging surfaces 26 intersect at vertex (V), forming a V-shaped angle ($\alpha$). The vertex (V) of the angle ($\alpha$) points into the pocket 20.

As used herein, the term "pocket-engaging surface" refers to at least a region of a peripheral side of a cutting insert that mechanically contacts the walls of an insert pocket of a tool holder. As used herein, the term "insert-engaging pocket wall" refers to a pocket wall configured to mechanically contact and support a cutting insert positioned and secured in an insert pocket. In this manner, the pocket-engaging surfaces of a cutting insert engage and mechanically contact the insert-engaging pocket walls of a pocket.

Referring to FIG. 2D, the side 31b and the side 31d may represent pocket-engaging surfaces of a hexagon-shaped cutting insert represented by the hexagon 31. The angle formed by the hexagonal sides 31b and 31d has a vertex that may point inwardly towards an insert pocket in a tool holder (not shown). Likewise, the side 32b and the side 32e may represent pocket-engaging surfaces of an octagon-shaped cutting insert represented by the octagon 32. The angle formed by the octagonal sides 32b and 32e also has a vertex that may point inwardly towards an insert pocket in a tool holder (not shown).

Other combinations of polygonal sides may represent pocket-engaging surfaces depending on the orientation of an indexable cutting insert positioned in a pocket of a tool holder. For example, round-shaped cutting inserts are rotationally-symmetric because the shape is invariant when rotated through any angle. Polygonal-shaped cutting inserts are rotationally-symmetric when rotated through integer multiples of an angle $2\pi/n$, where n is the number of polygonal sides. Therefore, the angle formed between the pocket-engaging surfaces of an insert as described herein will have a vertex that points inwardly towards an insert pocket in a tool holder as the insert is indexed in the insert pocket and the respective pocket-engaging surfaces contact the insert-engaging pocket walls.

FIG. 2E shows an expanded view of the region indicated by the circle 46 in FIG. 2D. FIG. 2E illustrates the geometrical relationship between the side 31d of the hexagon 31, the side 32e of the octagon 32, the IC 35, and the circle 33. The IC 35 intersects the side 31d at point "A". Line 47 connects point "A" and the center of the IC 35 at point "O" and, therefore, is a radius of the IC 35. The IC 35 intersects the side 32e at point "B". Line 48 connects point "B" and the center of the IC 35 at point "O" and, therefore, is also a radius of the IC 35. The side 31d intersects the side 32e at the point "C".

The geometrical relationship illustrated in FIG. 2E may be used to develop a single insert pocket configuration that will engage and accommodate, alternatively, an octagon-shaped cutting insert, a hexagon-shaped cutting insert, or a round-shaped cutting insert. The pocket walls of the pocket may be configured to engage the side 31d, the side 32e, or the circle 33, thereby functioning as insert-engaging pocket walls. In order to mechanically contact and accommodate three differently-shaped cutting inserts, the insert-engaging pocket walls must contour to the most outward portions (from the center point "O") of the side 31d, the side 32e, and the circle 33 in the superimposed concentric orientation illustrated in FIGS. 2D and 2E. The portion of the side 31d including the point "A" cannot be part of an insert-engaging pocket wall and, likewise, the portion of the side 32e including the point "B" cannot be part of an insert-engaging pocket wall. This is so because point "A" falls inside the octagon 32 and point "B" falls inside the hexagon 31, and two solid structures cannot occupy the same space at the same time.

Further, as illustrated in FIG. 2E, if a round-shaped cutting insert had the same diameter as the IC 35, it would not mechanically contact an insert-engaging pocket wall associated with the side 31d or an insert-engaging pocket wall associated with the side 32e. Increasing the diameter of the circle 33 relative to the IC 35 so that the diameter of the circle 33 passes point "C" forms a circle (representing a round-shaped cutting insert) that intersects both side 31d and side 32e. In this manner, a round-shaped cutting insert having the diameter of circle 33 would include a pocket-engaging surface that can mechanically contact an insert-engaging pocket wall. In this way, an insert pocket can be configured having insert-engaging pocket walls that engage and accommodate, alternatively, an octagon-shaped cutting insert, a hexagon-shaped cutting insert, and a round-shaped cutting insert.

A mathematical model may be used to define the geometry of a single insert pocket configured to engage and accommodate multiple differently-shaped cutting inserts. A mathematical model allows for the quantitative specification of the geometrical features of the insert-engaging pocket walls within the insert pocket. For example, a mathematical model allows the contacting positions on the insert-engaging pocket walls to be quantitatively defined and specified so that multiple differently-shaped cutting inserts are sufficiently supported and secured in the pocket. A mathematical model also allows for a quantitative specification that prevents over crowding of the insert-engaging pocket walls within a relatively small area. The mathematical models described herein are developed using an orthogonal coordinate system centered at the center point "O" of the concentrically superimposed shapes as illustrated in FIG. 3A.

Figure 3A:
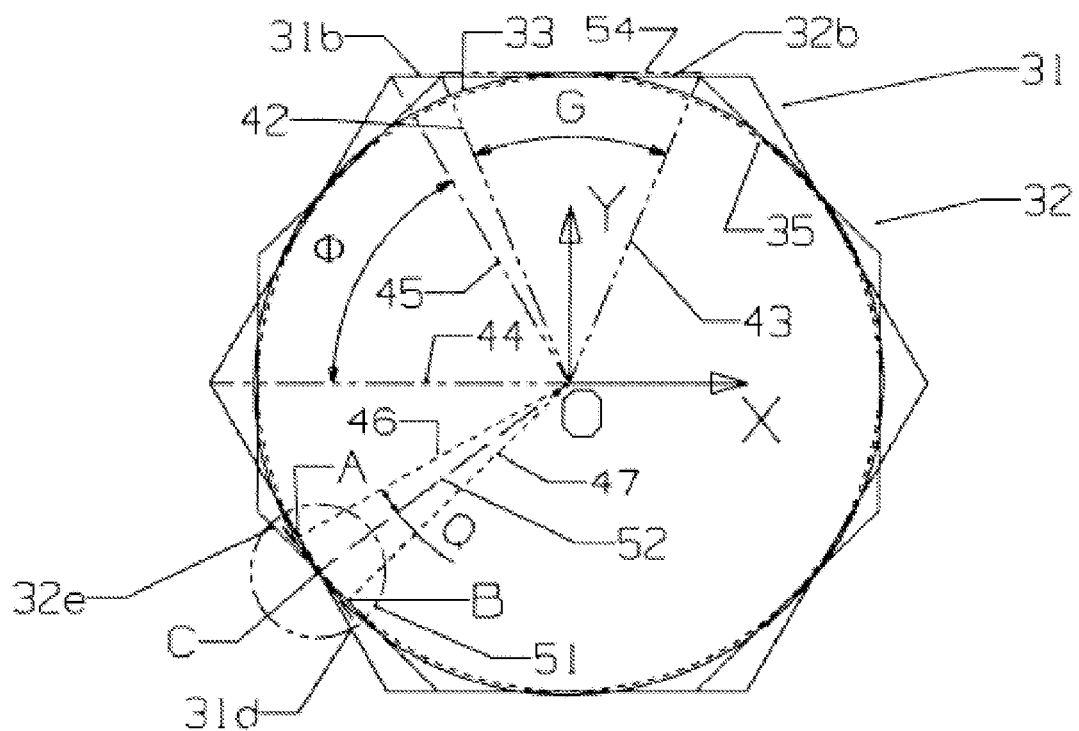
FIGS. 3A and 3B are schematic diagrams illustrating the geometrical relationship among a round-shaped cutting insert, a hexagon-shaped cutting insert, and an octagon-shaped cutting insert as mathematically specified in relation to an orthogonal coordinate system.
Figure 3B:
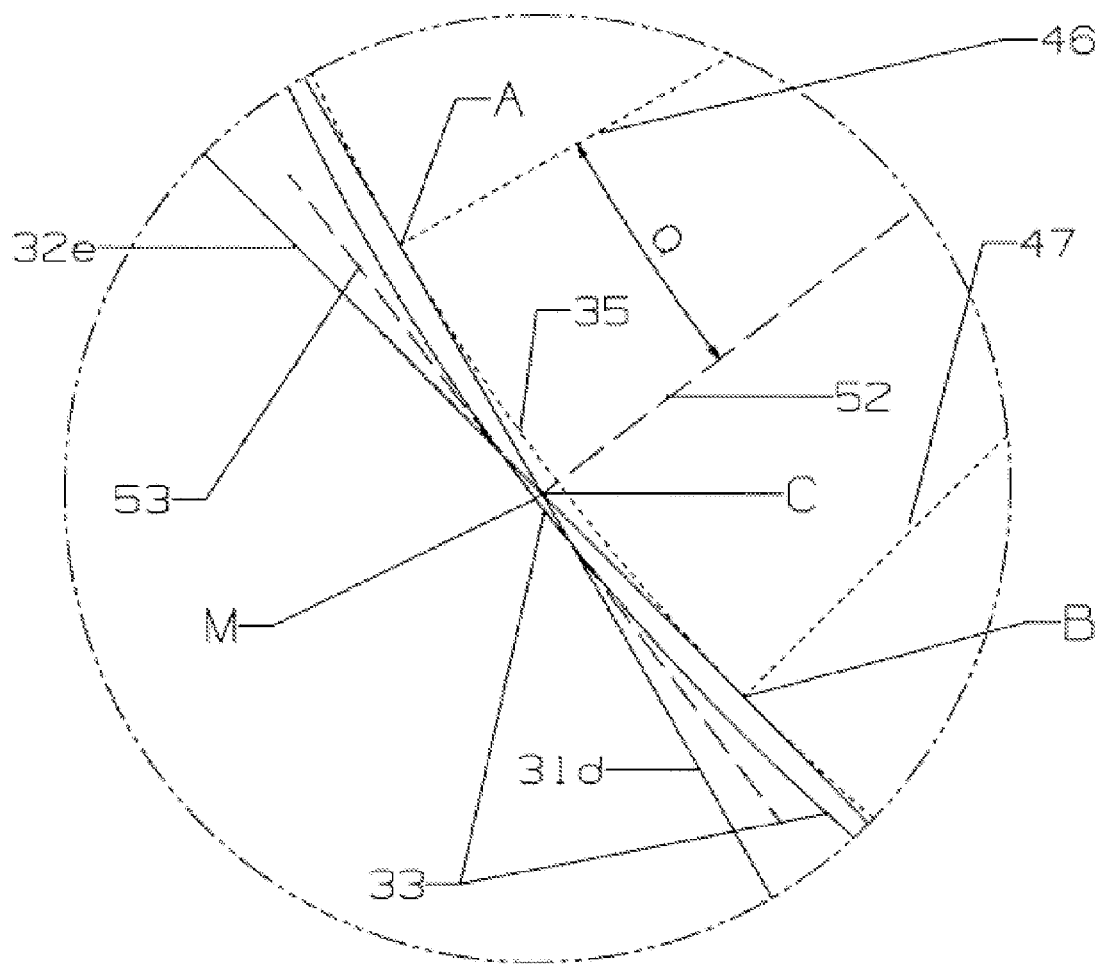

FIG. 3A shows the octagon 32 representing an octagon-shaped cutting insert, the hexagon 31 representing a hexagon-shaped cutting insert, and the circle 33 representing a round-shaped cutting insert in a superimposed concentric orientation having an X-O-Y orthogonal coordinate system centered at the center point "O" of the IC 35 and the circle 33. FIG. 3B shows an expanded view of the region indicated by the circle 51 in FIG. 3A. FIGS. 3A and 3B illustrate the geometrical relationship of the two polygonal cutting insert shapes and the round cutting insert shape with the superimposed coordinate system.

The center angle ("CA") of a regular polygon having equal length sides may be represented by Equation (1):

$$CA = 2\pi/n \qquad (1)$$

wherein "n" is the number of sides of a polygon. Referring to FIG. 3A, the center angle "Φ" of the hexagon 31 is formed by the lines 44 and 45, and Φ=60° according to Equation (1). The center angle "G" of the octagon 32 is formed by the lines 42 and 43, and G=45° according to Equation (1).

The point "A" is the intersection point between the side 31d of the hexagon 31 and the IC 35. The point "A" bisects side 31d. The line 46, which connects point "A" and point "O", and which is a radius of the IC 35, is perpendicular to the side 31d because side 31d is a tangent with respect to the IC 35. The point "A" in the X-O-Y coordinate system can be determined by Equation (2):

$$(X_A, Y_A) = \left(-\frac{IC}{2} * \cos\frac{\Phi}{2}, -\frac{IC}{2} * \sin\frac{\Phi}{2}\right) \quad (2)$$

where "Φ" is the center angle of the hexagon 31, and "IC" is a diameter of the IC 35 ("IC/2" being a radius of the IC 35 as represented, for example, by line 46 in FIGS. 3A and 3B).

A linear equation for the side 31d in the X-O-Y coordinate system may then be expressed by Equation (3):

$$Y + \frac{IC}{2} * \sin\frac{\Phi}{2} = -\tan\Phi * \left(X + \frac{IC}{2} * \cos\frac{\Phi}{2}\right) \quad (3)$$

Likewise, the point "B" is the intersection point between the side 32e of the octagon 32 and the IC 35. The point "B" bisects side 32e. The line 47, which connects point "B" and point "O", and which is a radius of the IC 35, is perpendicular to the side 32e because side 32e is a tangent with respect to the IC 35. The point "B" in the X-O-Y coordinate system can be determined by Equation (4):

$$(X_B, Y_B) = \left(-\frac{IC}{2} * \cos(G), -\frac{IC}{2} * \sin(G)\right) \quad (4)$$

where "G" is the center angle of the octagon 32, and "IC" is a diameter of the IC 35 ("IC/2" being a radius of the IC 35 as represented, for example, by line 47 in FIGS. 3A and 3B).

A linear equation for the side 32e in the X-O-Y coordinate system may then be expressed by Equation (5):

$$Y + \frac{IC}{2} * \sin(G) = -\tan(G) * \left(X + \frac{IC}{2} * \cos(G)\right) \quad (5)$$

The line 52 that connects the point "C" (i.e., the intersection of the hexagon side 31d and the octagon side 32e) and point "O" in FIG. 3A may then be specified as follows. Referring to FIG. 3B, the diameter of the circle 33 representing a round-shaped double-sided cutting insert has a diameter that is increased relative to the diameter of the concentric IC 35. The increase in diameter may be expressed by Equation (6):

$$D_R = IC + dIC \quad (6)$$

where $D_R$ is the diameter of the circle 33, IC is the diameter of the concentric IC 35, and dIC is an increase in diameter.

The relative angular position of line 52 may be expressed as the angle (Q) formed between line 52 and line 46. The angle (Q) formed between line 52 and line 46 may be expressed by Equation (7):

$$Q = \frac{\Phi - G}{2} \quad (7)$$

In FIG. 3B, line 53 is perpendicular to the line 52 and tangent to the circle 33. Line 52 is extended by dIC/2 to intersect the circle 33 and the line 53 at point "M". The increase in the diameter (dIC) of the circle 33 relative to the IC 35 must be of sufficient magnitude so that point "M" is farther from point "O" than point "C". The line connecting point "M" and point "O" is a radius of circle 33, which may be expressed as $D_R/2$. The line connecting point "C" and point "O" must be shorter than the radius of circle 33, but is mathematically defined to be longer than the radius of the IC 35. By increasing the diameter of the circle 33 relative to the diameter of the IC 35 so that the diameter of the circle 33 passes point "C", an insert-engaging pocket wall may be quantitatively specified that can mechanically contact a pocket-engaging surface on a peripheral side of a round-shaped cutting insert. The coordinates of the point "M" in the X-O-Y coordinate system may be expressed by Equation (8):

$$(X_M, Y_M) = \left(-\frac{IC + dIC}{2} * \cos\left(\frac{\Phi}{2} + Q\right), -\frac{IC + dIC}{2} * \sin\left(\frac{\Phi}{2} + Q\right)\right) \quad (8)$$

A linear equation for the line 53 may then be expressed by Equation (9):

$$Y + \frac{IC + dIC}{2} * \sin\left(\frac{\Phi}{2} + Q\right) = \\ -\tan\frac{\Phi + G}{2} * \left(X + \frac{IC + dIC}{2} * \cos\left(\frac{\Phi}{2} + Q\right)\right) \quad (9)$$

Equations (1)-(9) described above provide a mathematical model that quantitatively specifies the positioning of insert-engaging pocket walls relative to an orthogonal coordinate system centered at the center point of three differently-shaped cutting inserts. The model specifies one set of the at least two sets of insert-engaging pocket walls configured to engage and accommodate an octagon-shaped cutting insert, a hexagon-shaped cutting insert, and a round-shaped cutting insert. Specifically, Equations (3), (5), and (9) mathematically specify insert-engaging pocket walls corresponding to a hexagon-shaped cutting insert, an octagon-shaped cutting insert, and a round-shaped cutting insert, respectively, positioned in the insert pocket.

The model described above specifies insert-engaging pocket walls corresponding to the representative side 31d of a hexagon-shaped cutting insert, the representative side 32e of an octagon-shaped cutting insert, and the line 53 tangent to a peripheral side of a round cutting insert. As described above in connection with FIG. 2F, in order to securely position a cutting insert in an insert pocket of a tool holder, the cutting insert should have pocket-engaging surfaces that mechanically contact at least two corresponding insert-engaging pocket walls of the insert pocket, wherein the insert-engaging pocket walls form an angle having a V-shape that points inwardly toward the pocket. A second of the at least two insert-engaging pocket walls must be specified for each differently-shaped cutting insert.

As described above in connection with FIG. 2D, for the hexagon 31, the side 31b and the side 31d may be pocket-engaging surfaces, and when the hexagon is disposed with polygonal sides 31b and 31d contacting the pocket walls, an angle formed between polygonal sides 31b and 31d has a vertex that points inwardly towards an insert pocket in a tool holder. Likewise, for the octagon 32, the polygonal sides 32b and 32e may be pocket-engaging surfaces, and, when the octagon is positioned with polygonal sides 32b and 32e contacting the pocket walls, an angle formed between the polygonal sides 32b and 32e also has a vertex that points inwardly towards an insert pocket in a tool holder. Further, other combinations of polygonal sides may represent pocket-engaging surfaces depending on the orientation of an indexable cutting insert positioned in a pocket of a tool holder. The rotational symmetry of indexable cutting inserts allows a given insert to be positioned in a pocket of a tool holder in multiple orientations. Therefore, the angle formed between the pocket-engaging surfaces of an insert as described herein will have a vertex that points inwardly towards an insert pocket in a tool holder as the insert is indexed in the insert pocket and the respective pocket-engaging surfaces contact the insert-engaging pocket walls.

The hexagon side 31b and the octagon side 32b are co-linear (as depicted in two-dimensions, but are co-planar in three-dimensions). Therefore, a corresponding insert-engaging pocket wall may be mathematically specified as a co-planar pocket wall. Because the circle 33 representing a round cutting insert shares the same center point "O" with the IC 35 of both the hexagon 31 and the octagon 32, a corresponding insert-engaging pocket wall may be mathematically specified as a plane that is tangent to the circle 33 and parallel to a coplanar pocket wall configured to engage both a hexagon-shaped cutting insert and an octagon-shaped cutting insert. In this manner, the insert-engaging pocket wall configured to engage a round-shaped cutting insert is parallel to the sides 31b and 32b and tangent to circle 33. The insert-engaging pocket wall configured to engage a round-shaped cutting insert must be positioned at a greater distance from point "O" than the hexagon and octagon insert-engaging pocket wall in order to spatially accommodate the diameter increase dIC.

FIG. 3A shows that the hexagon side 31b and the octagon side 32b are parallel to offset line 54, which is tangent to the circle 33. The position of the sides 31b and 32b and the line 54 may be expressed in the X-O-Y coordinate system by Equations (10) and (11), respectively:

$$Y = IC/2 \quad (10)$$

$$Y = (IC + dIC)/2 \quad (11)$$

where IC and dIC have the definitions described above. Equations (1)-(11) provide a mathematical model that quantitatively specifies the positioning of insert-engaging pocket walls configured to engage and accommodate an octagon-shaped cutting insert, a hexagon-shaped cutting insert, and a round-shaped cutting insert at two different pocket-engaging surfaces on each differently-shaped insert.

Figure 4A:
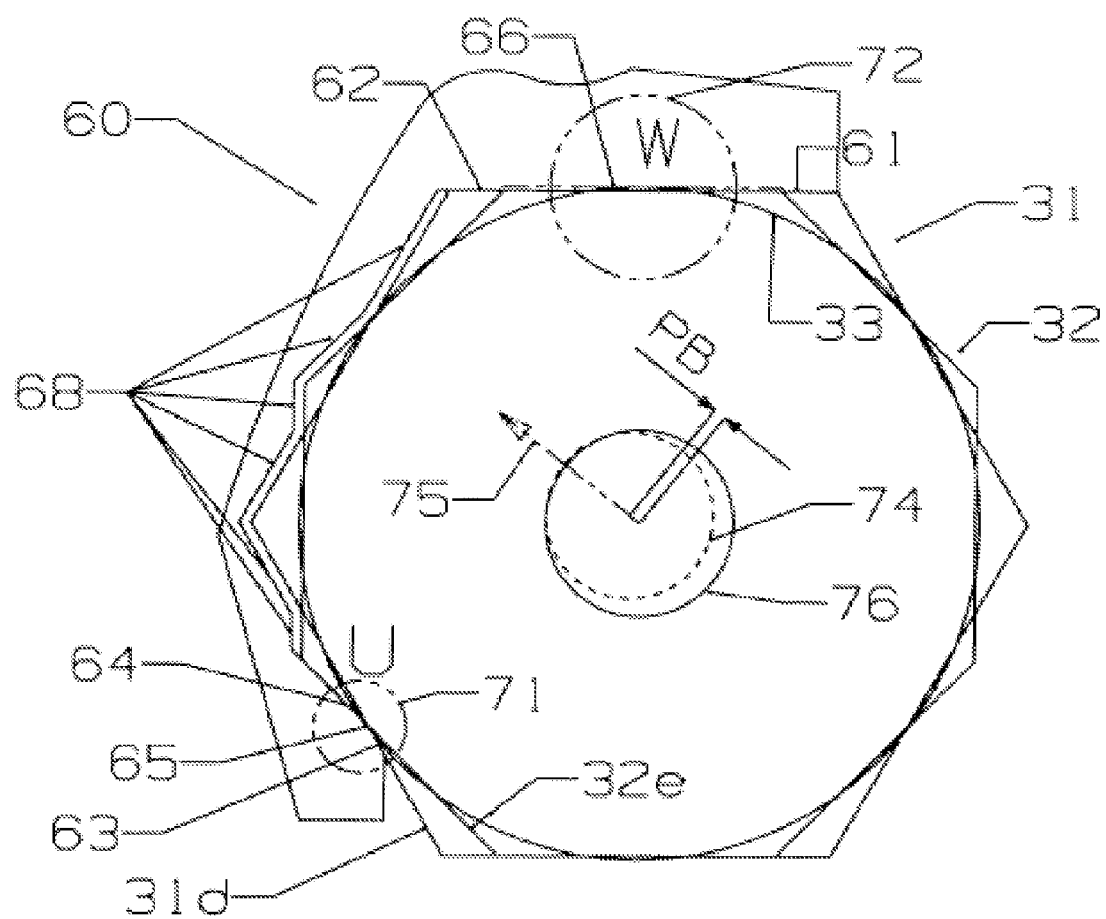
FIGS. 4A-4C are schematic diagrams illustrating the geometrical relationship among a round-shaped cutting insert, a hexagon-shaped cutting insert, and an octagon-shaped cutting insert as positioned in an insert pocket of a tool holder.
Figure 4B:
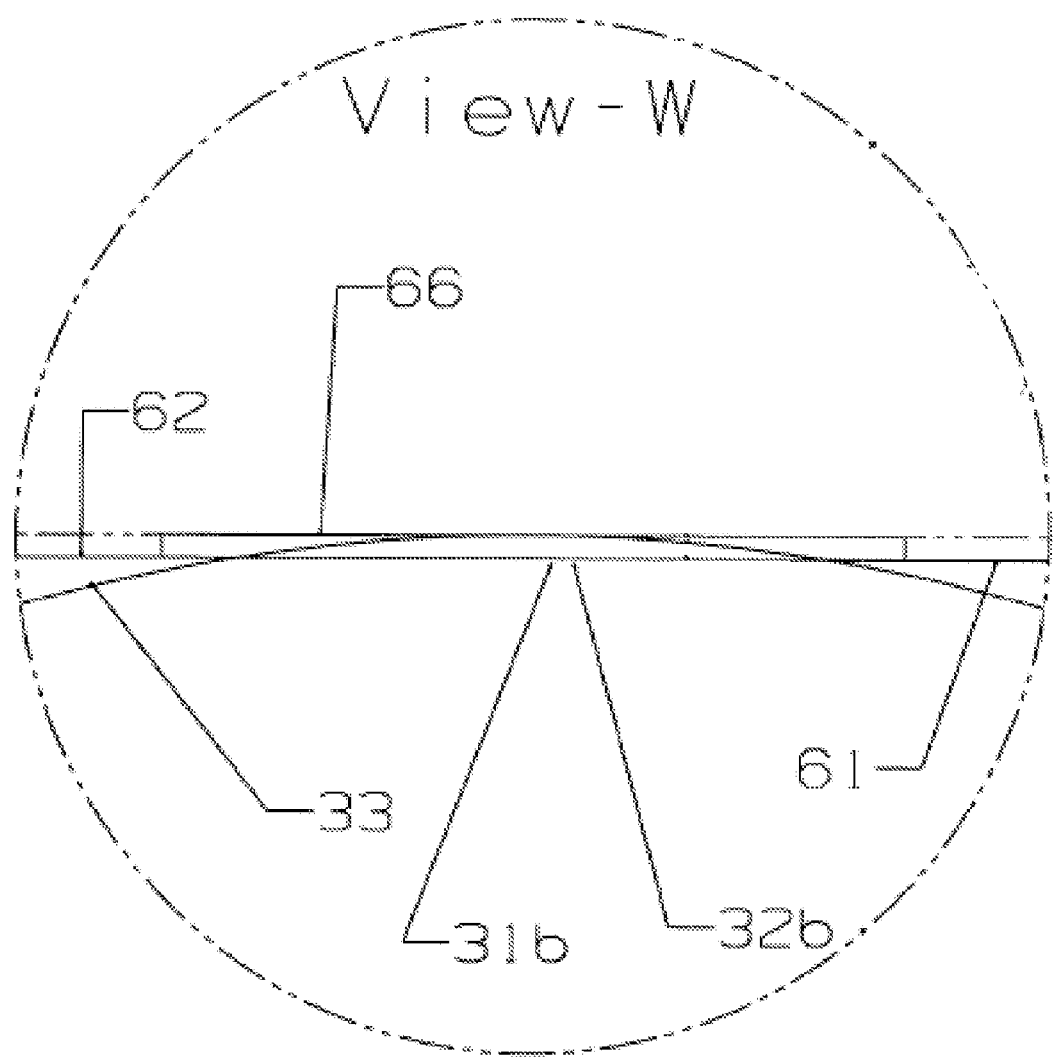
Figure 4C:
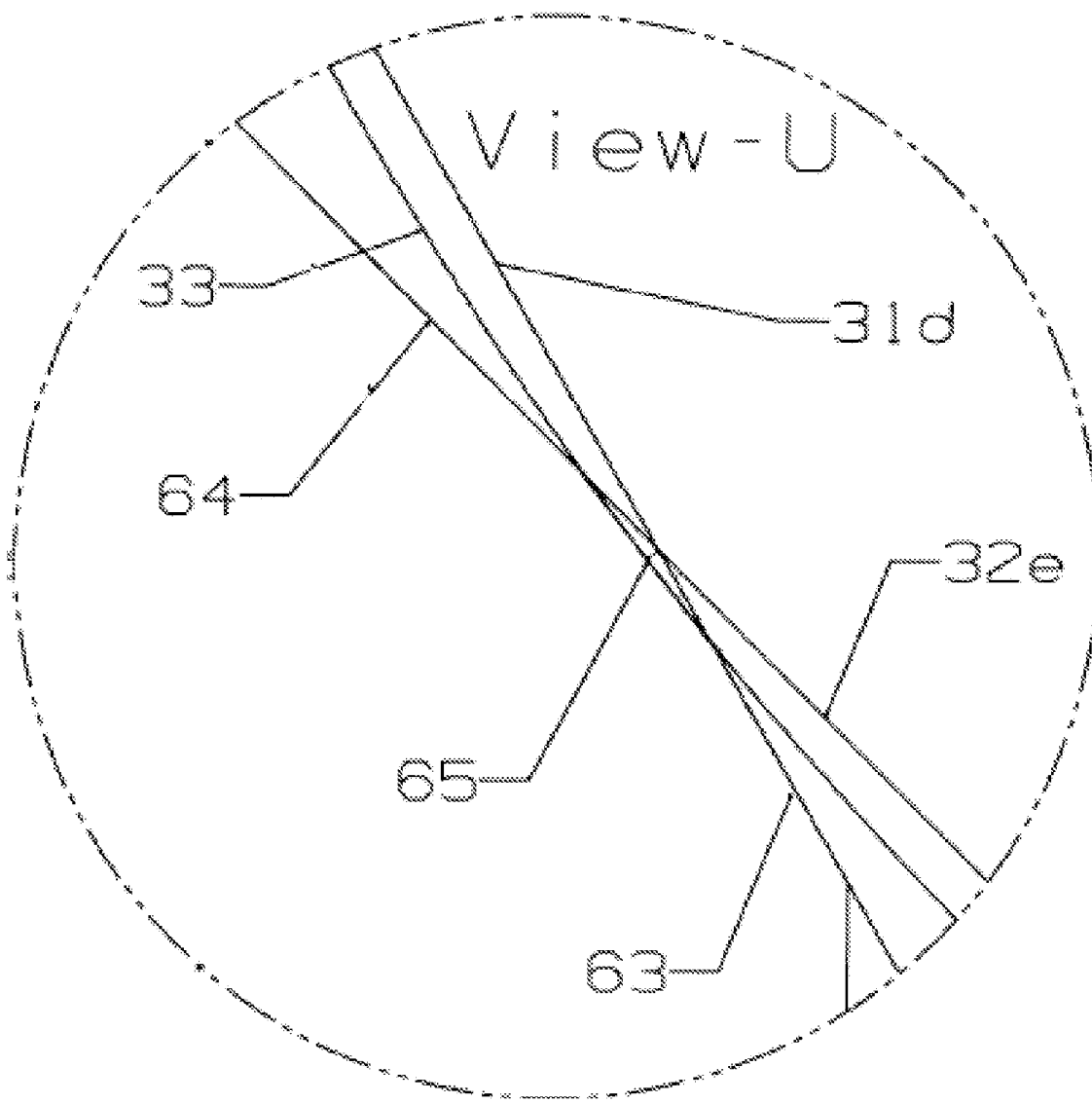

FIGS. 4A-4C schematically illustrate an embodiment of a pocket wall configuration, including insert-engaging pocket walls, having an octagon-shaped cutting insert, a hexagon-shaped cutting insert, and a round-shaped cutting insert positioned in the insert pocket. FIG. 4A illustrates the overall relationship between the pocket 60 with the three cutting inserts (represented by hexagon 31, octagon 32, and circle 33). FIG. 4B is an expanded view (labeled View-W) of the region indicated by the circle 72 in FIG. 4A. FIG. 4C is an expanded view (labeled View-U) of the region indicated by the circle 71 in FIG. 4A.

In FIG. 4B, the pocket walls 61 and 62 are formed in the pocket 60 according to Equation (10) in order to mechanically contact the pocket-engaging surfaces 31b and 32b of a hexagon-shaped cutting insert and an octagon-shaped cutting insert, respectively. A recessed pocket wall 66 is formed in the pocket 60 according to Equation (11) in order to mechanically contact a pocket-engaging surface located on the peripheral side of a round-shaped cutting insert (represented by circle 33).

In FIG. 4C, the pocket wall 63 is formed in the pocket 60 according to Equation (3) in order to mechanically contact the pocket-engaging surface 31d of a hexagon-shaped cutting insert. The pocket wall 64 is formed in the pocket 60 according to Equation (5) in order to mechanically contact the pocket-engaging surface 32e of an octagon-shaped cutting insert. The pocket wall 65 is formed in the pocket 60 according to Equation (9) in order to mechanically contact a pocket-engaging surface of a round-shaped cutting insert. In this manner, pocket walls 61, 62, 63, 64, 65, and 66 are insert-engaging pocket walls configured to engage corresponding pocket-engaging surfaces on multiple differently-shaped cutting inserts.

In FIG. 4A, a pocket screw hole 74 and a cutting insert center hole 76 are shown offset from each other in the direction indicated by the arrow 75. The offset value "PB", as shown in FIG. 4(A), may be referred to as pull back (PB). The function of a PB is to apply a biasing force that forces the cutting insert inwardly towards the pocket walls. Because the insert-engaging pocket walls for each differently-shaped cutting insert as positioned in an insert pocket form a V-shaped angle pointing inwardly toward the pocket, each cutting insert may be secured in the pocket 60 with the PB force.

The pocket walls 61/62 and 63 are configured to engage and support a hexagon-shaped cutting insert. The pocket walls 61/62 and 64 are configured to engage an octagon-shaped cutting insert. The pocket walls 66 and 65 are configured to engage a round-shaped cutting insert. The pocket walls 68 are non-engaging pocket walls and are configured to provide sufficient clearance for the non-engaging surfaces of the cutting inserts to prevent a secured cutting insert from over-constraint in the pocket 60. Collectively, the pocket walls are configured to accommodate any one of the three differently-shaped cutting inserts at any given time. In this way, the pocket 60 is structured and shaped to accommodate three types of differently-shaped cutting inserts.

Figure 5A:
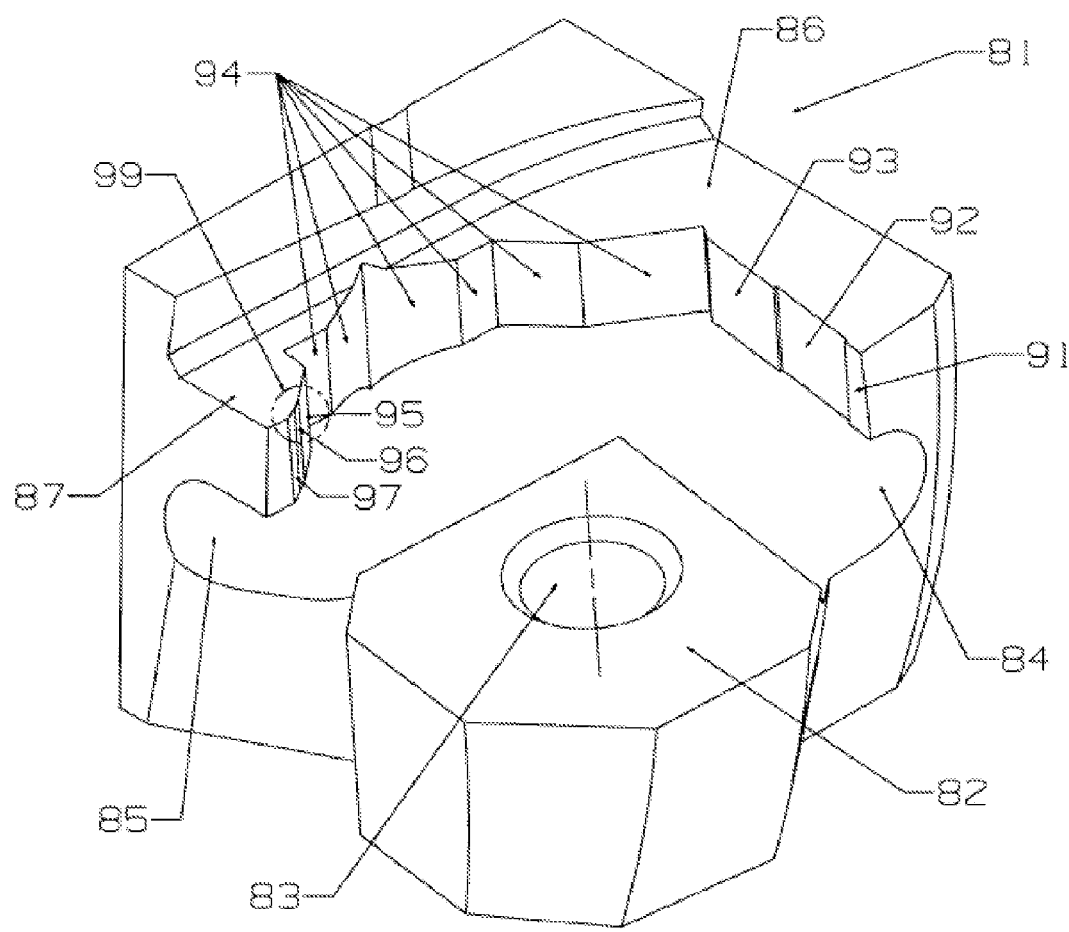
FIG. 5A is a perspective view of an insert pocket in a tool holder configured to accommodate, alternatively, round-shaped cutting inserts, hexagon-shaped cutting inserts, or octagon-shaped cutting inserts.
Figure 5B:
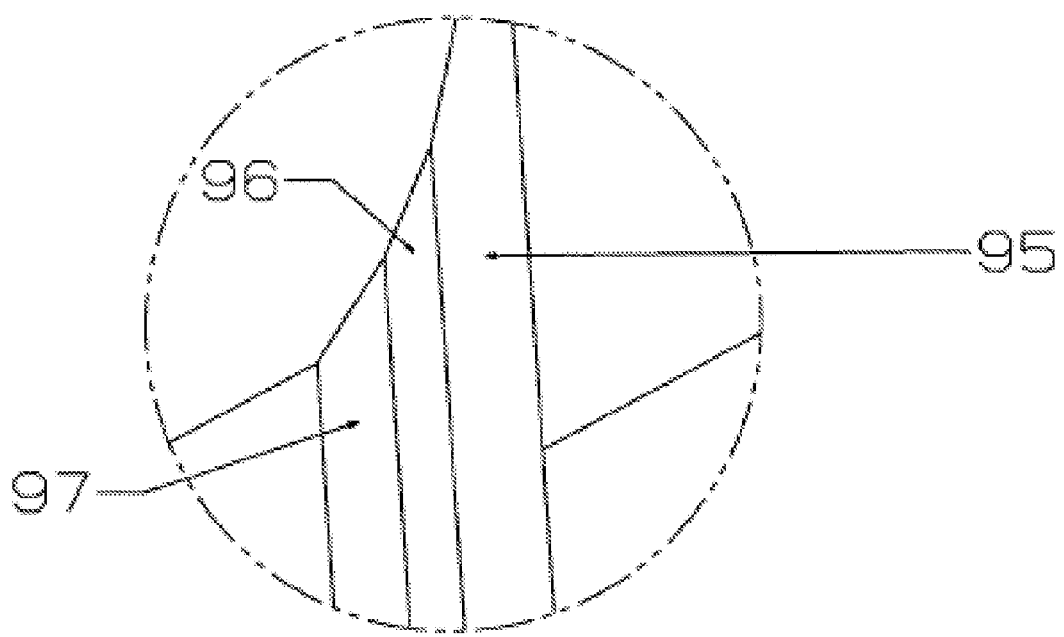
FIG. 5B is an expanded view of a region of FIG. 5A.
Figure 5C:
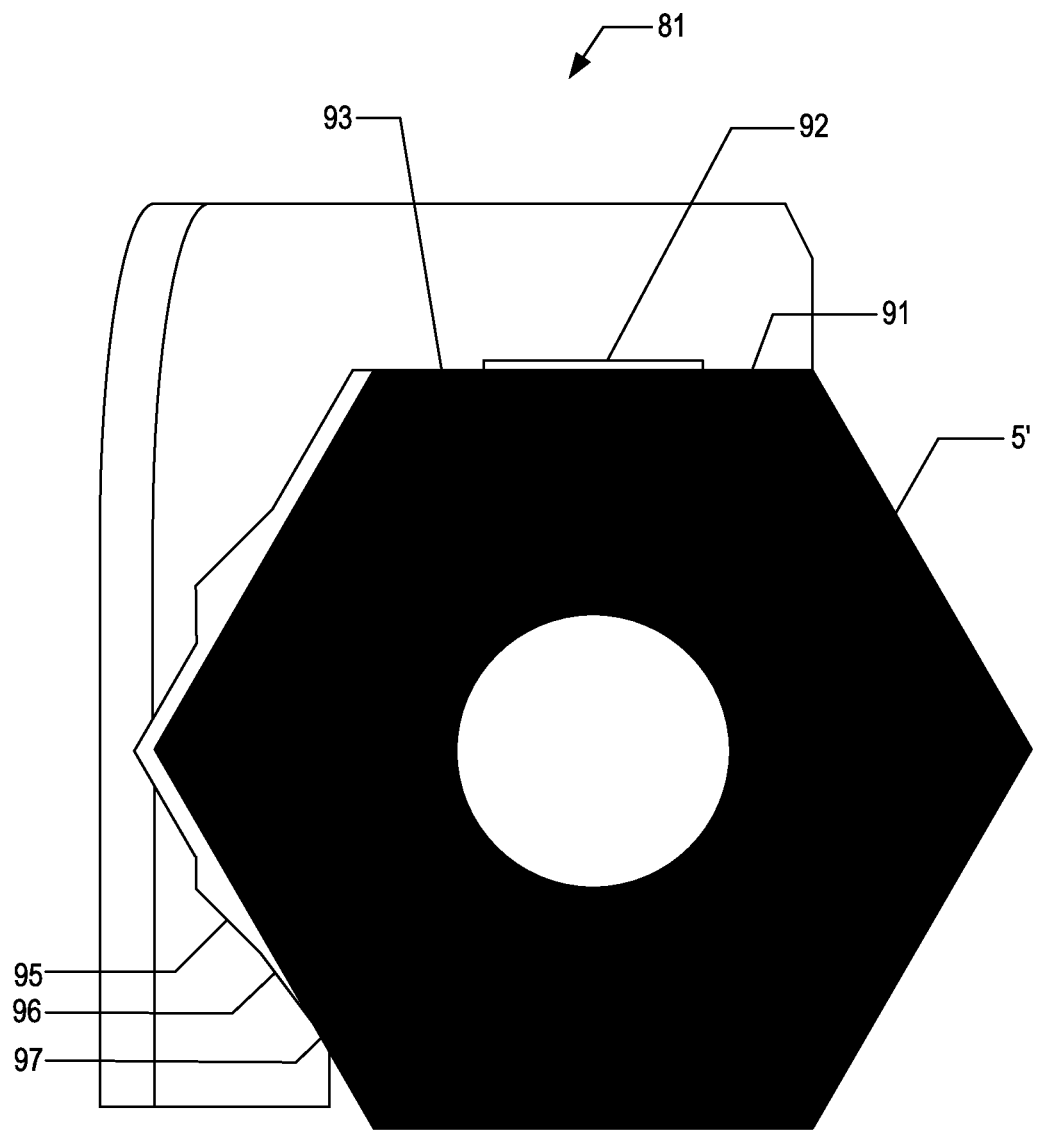
FIGS. 5C-5E are schematic diagrams of the insert pocket shown in FIG. 5A engaging a hexagon-shaped cutting insert, an octagon-shaped cutting insert, and a round-shaped cutting insert, respectively.
Figure 5D:
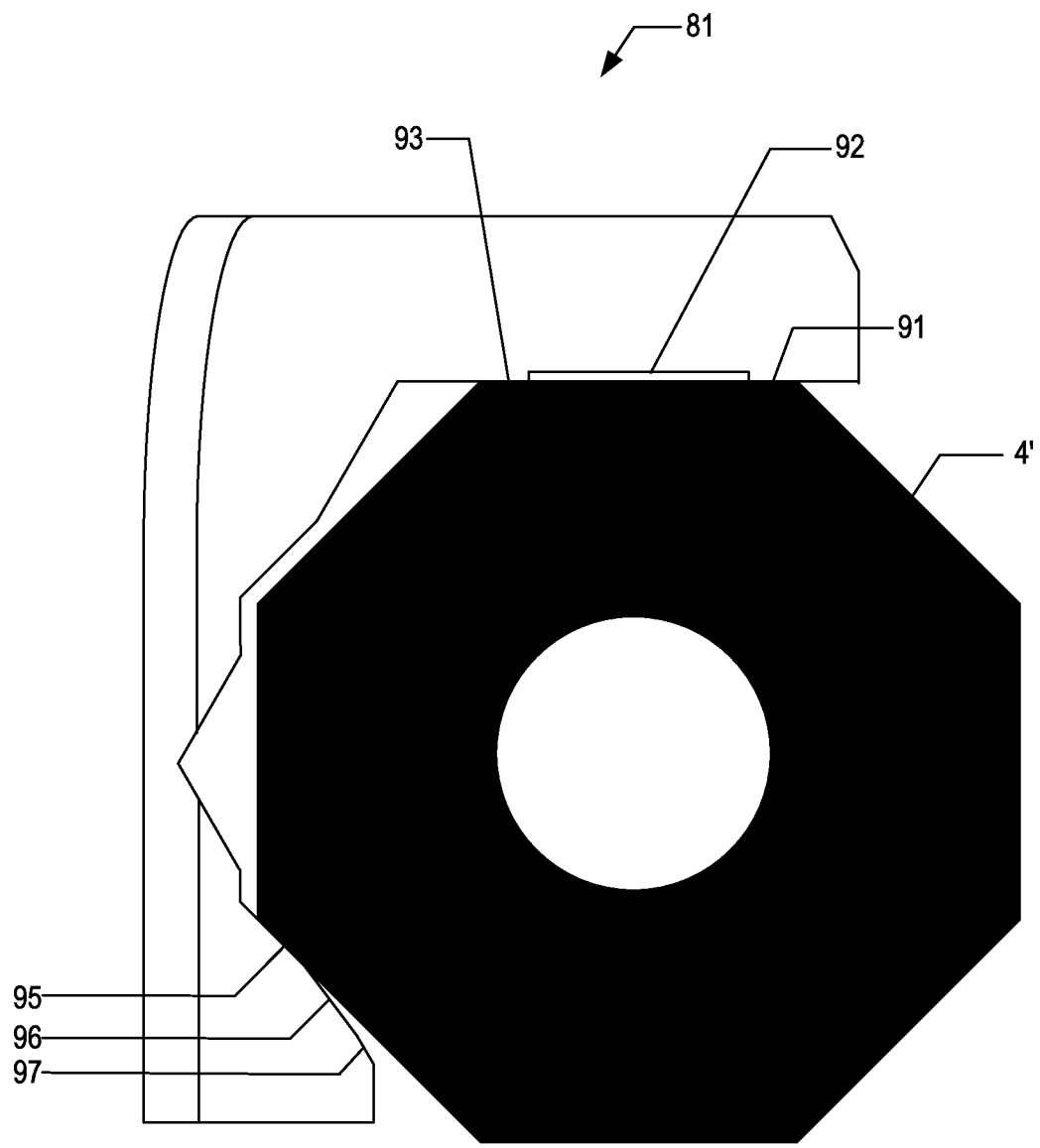
Figure 5E:
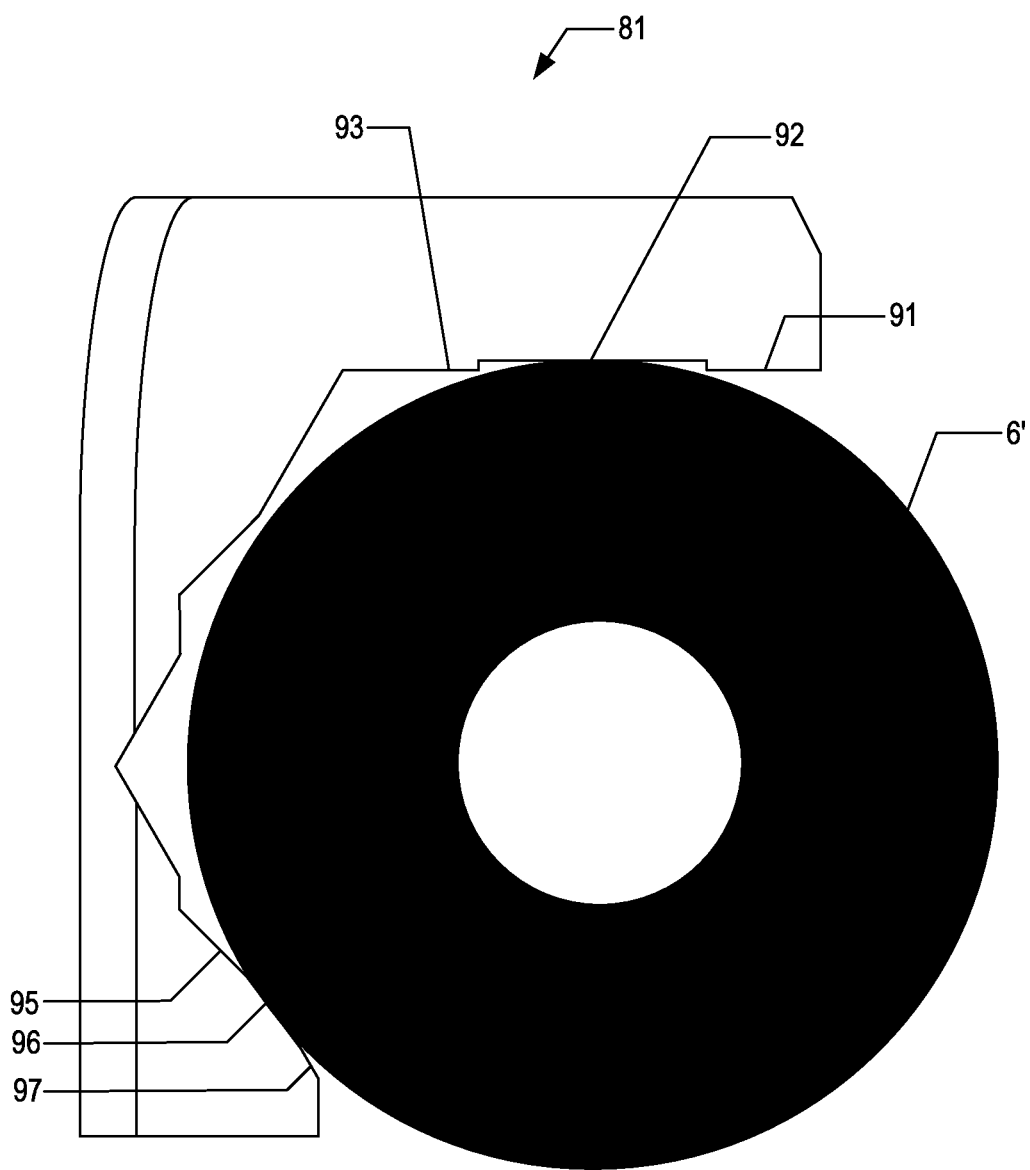

FIGS. 5A-5E illustrate an embodiment of an insert pocket 81 configured to engage and accommodate multiple differently-shaped indexable cutting inserts having a hexagon shape, an octagon shape, or a round shape. FIG. 5A is a perspective view of the insert pocket 81 and FIG. 5B is an expanded view of the region indicated by circle 99 in FIG. 5A. FIGS. 5C-5E show the insert pocket 81 engaging a hexagon-shaped cutting insert 5', an octagon-shaped cutting insert 4', and a round-shaped cutting insert 6', respectively. The inserts shown in FIGS. 5C-5E are shaded relative to the other illustrated features to highlight the positioning of the inserts in the pocket 81 relative to the pocket walls.

The insert pocket includes a seat face 82 to contact and seat the top side or the bottom side of a cutting insert, a screw hole 83 to secure a cutting insert, top faces 86 and 87, and recesses 84 and 85 to provide relief space for the cutting edges of a double-sided cutting insert. The pocket also includes a series of pocket walls 91, 92, 93, 94, 95, 96, and 97. The pocket walls 91/93 and 97 are configured to engage a hexagon-shaped double-sided cutting insert (such as, for example, the cutting insert 5 illustrated in FIG. 1). The pocket walls 91/93 and 95 are configured to engage an octagon-shaped double-sided cutting insert (such as, for example, the cutting insert 4 illustrated in FIG. 1). The pocket walls 92 and 96 are configured to engage a round-shaped double-sided cutting insert (such as, for example, the cutting insert 6 illustrated in FIG. 1).

The insert-engaging pocket walls 91, 92, 93, 95, 96, and 97 are perpendicular to the seat face 82. The non-engaging pocket walls 94 are not necessarily perpendicular to the seat face 82 as long as they provide sufficient clearance for the non-engaging surfaces of the cutting inserts to be positioned and secured in the pocket 81. In this manner, a single pocket 81 is configured to engage and accommodate multiple differently-shaped double-sided cutting inserts.

FIG. 5C illustrates a hexagon-shaped cutting insert 5' positioned in pocket 81. The insert 5' engages the pocket walls 91/93 and 97. FIG. 5D illustrates an octagon-shaped cutting insert 4' positioned in pocket 81. The insert 4' engages the pocket walls 91/93 and 95. FIG. 5E illustrates a round-shaped cutting insert 6' positioned in pocket 81. The insert 6' engages the pocket walls 92 and 96.

Figure 6A:
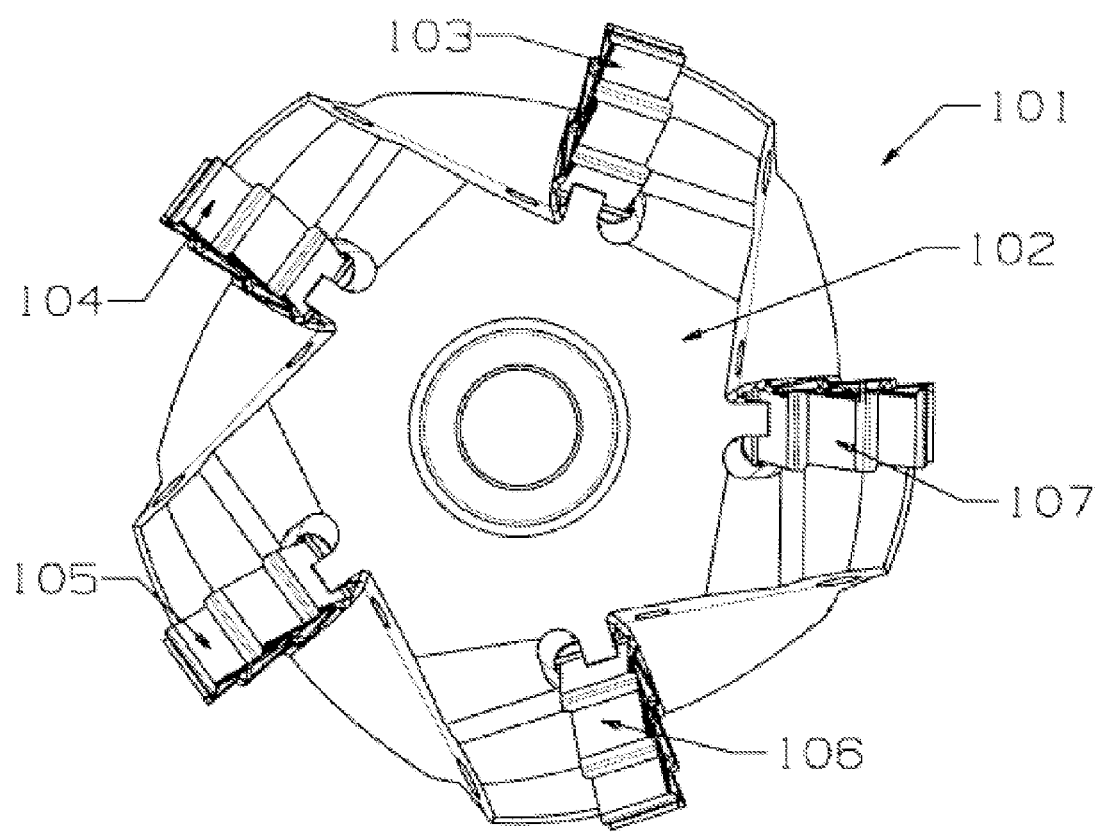
FIG. 6A is a bottom view of a tool holder including five identical cutting insert pockets engaging five octagon-shaped double-sided cutting inserts.
Figure 6B:
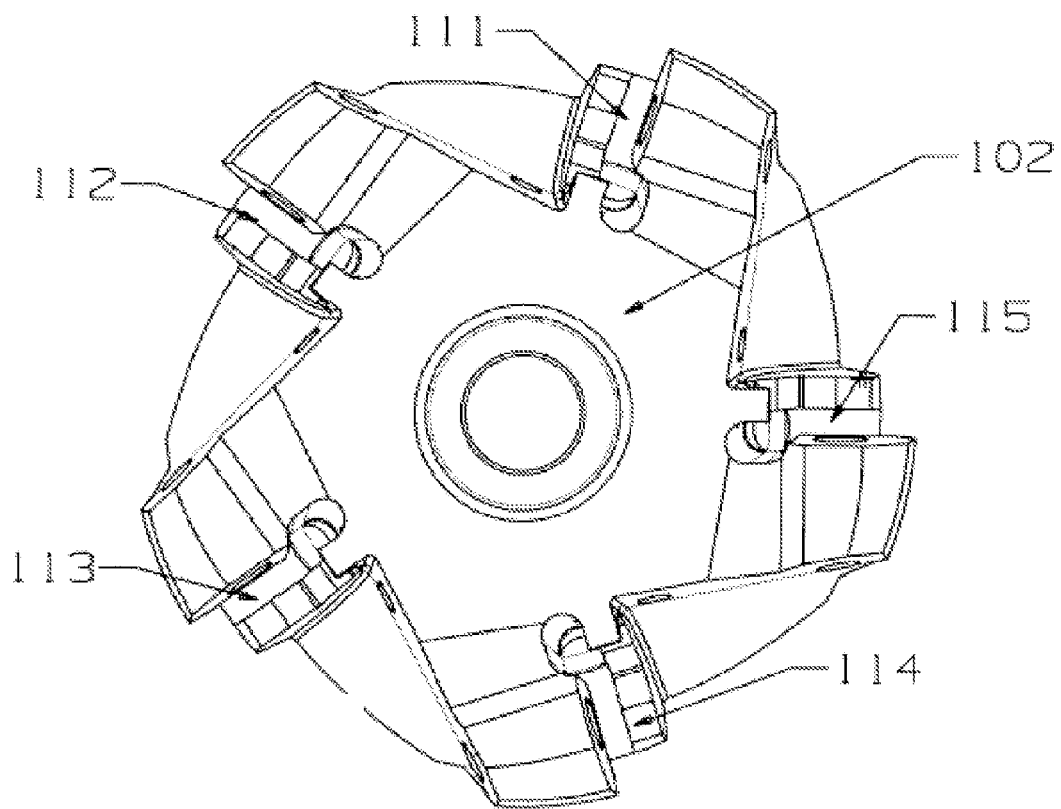
FIG. 6B is a bottom view of the tool holder shown in FIG. 6A without the cutting inserts positioned in the insert pockets.

FIG. 6A illustrates a cutting tool system 101 including a tool holder 102 and five identical octagon-shaped double-sided cutting inserts 103, 104, 105, 106, and 107, each having eight cutting edges per side (16 total), like the octagon-shaped double-sided cutting insert 4 illustrated in FIG. 1. FIG. 6B illustrates five identical insert pockets 111, 112, 113, 114, and 115 in the tool holder 102 without cutting inserts positioned in the pockets.

Figure 7A:
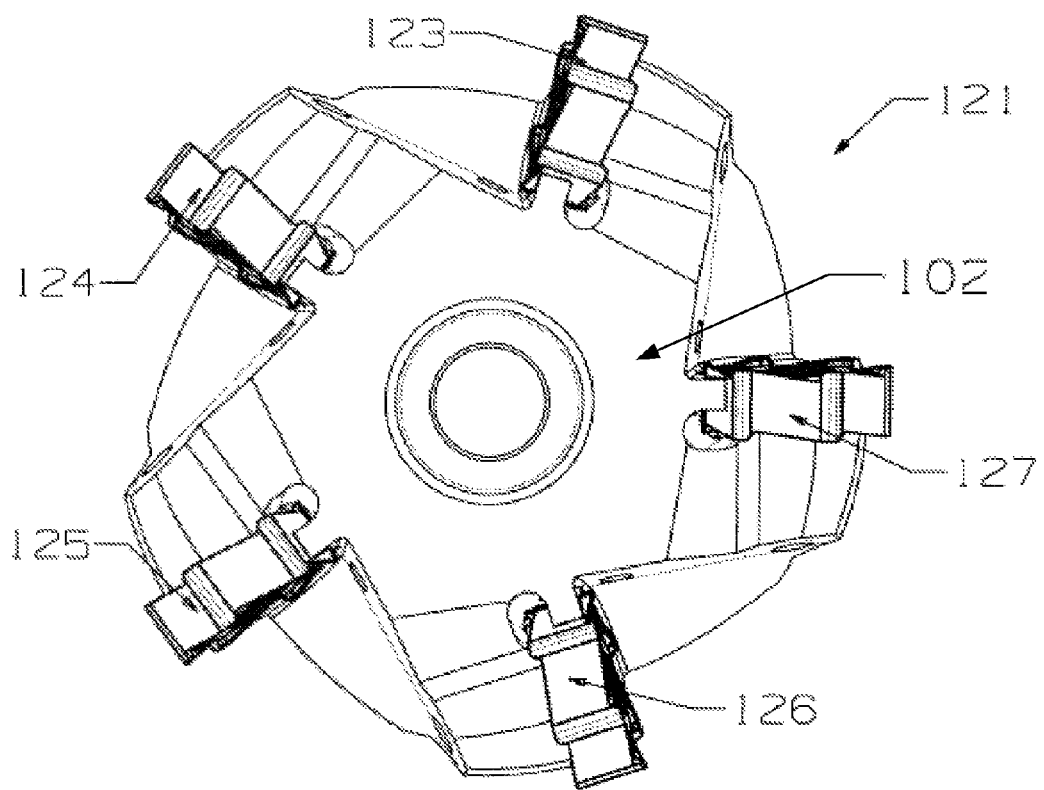
FIGS. 7A and 7B are bottom views of the tool holder shown in FIG. 6B holding five hexagon-shaped cutting inserts and five round-shaped cutting inserts, respectively.
Figure 7B:
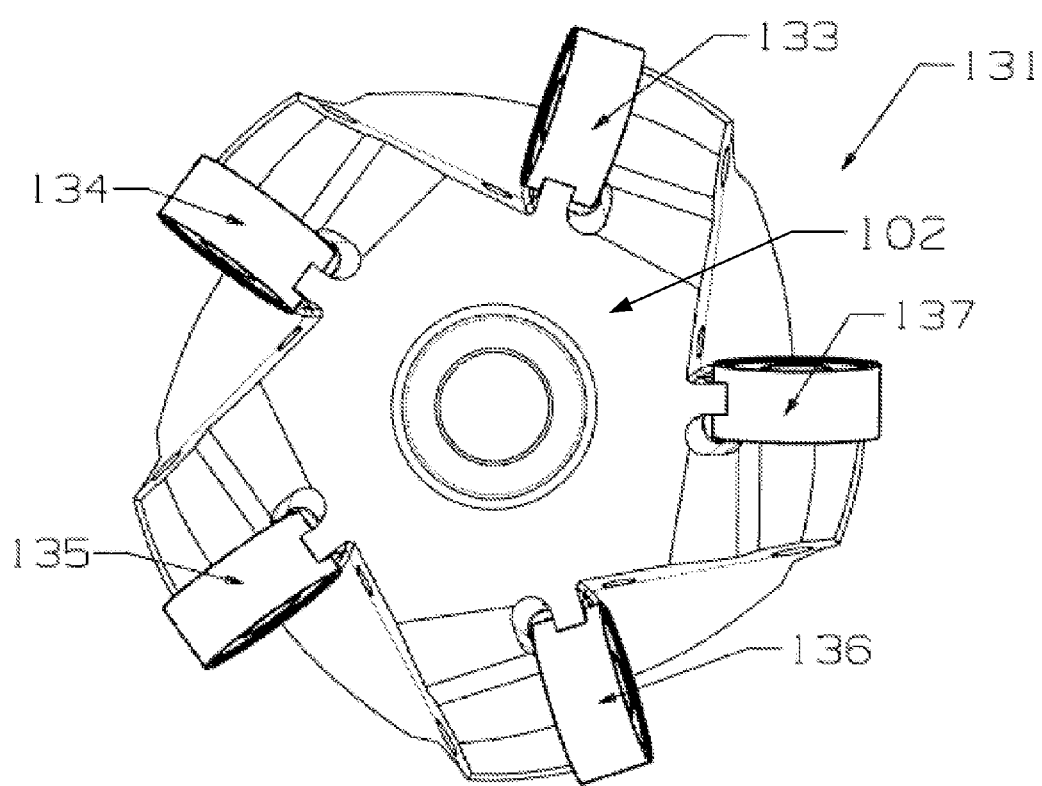

FIG. 7A illustrates a cutting tool system 121 including the same tool holder 102 having the same pockets 111-115 as illustrated in FIGS. 6A and 6B. The five insert pockets respectively contain five hexagon-shaped double-sided cutting inserts 123, 124, 125, 126, and 127, each having six cutting edges per side (12 total), like the hexagon-shaped double-sided cutting insert 5 illustrated in FIG. 1. FIG. 7B illustrates a cutting tool system 131 comprising the same tool holder 102 having the same pockets 111-115 as illustrated in FIGS. 6A and 6B. The five insert pockets respectively contain five round-shaped double-sided cutting inserts 133, 134, 135, 136, and 137, each having a round cutting edge per side, like the round-shaped double-sided cutting insert 6 illustrated in FIG. 1.

Figure 8A:
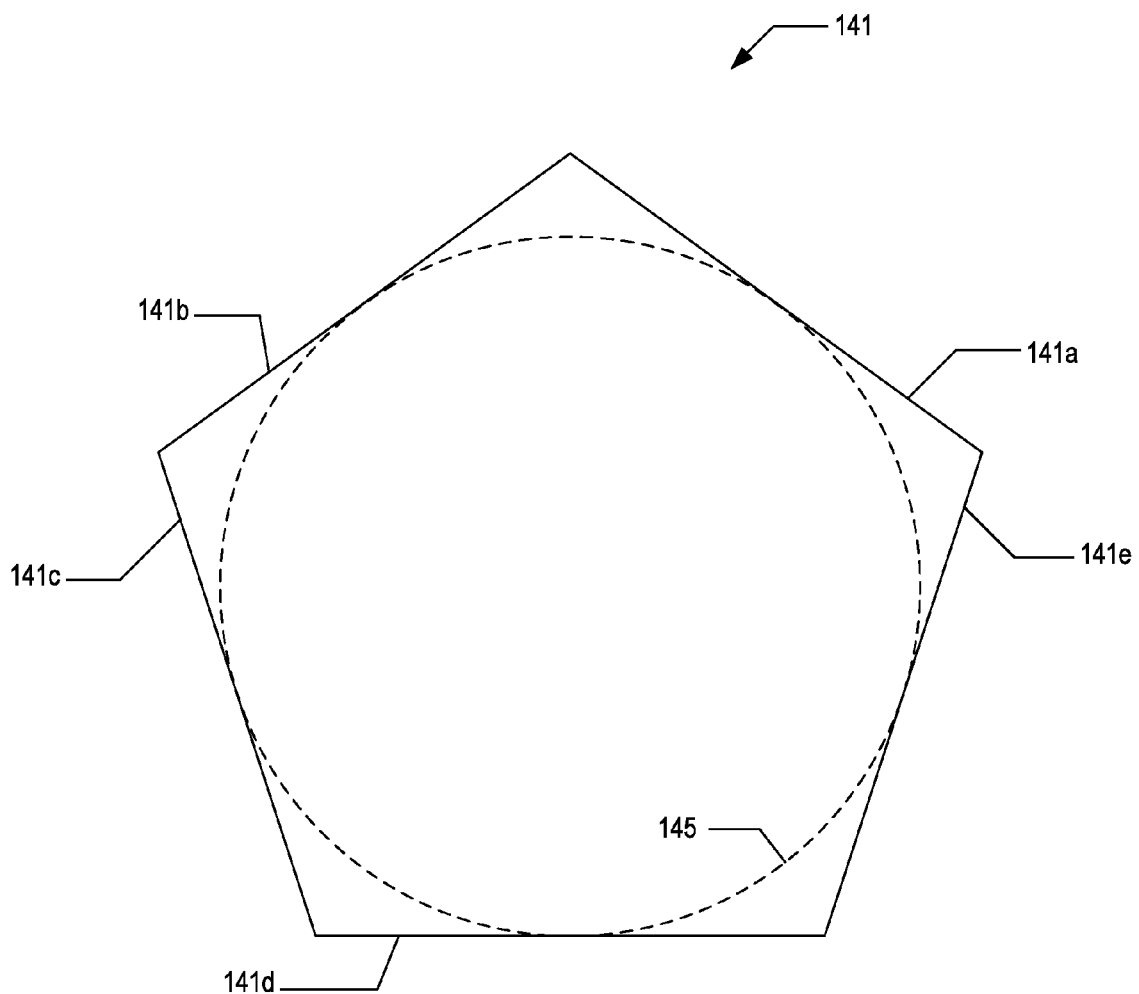
FIGS. 8A-8F are schematic diagrams illustrating the geometrical relationship among a round-shaped cutting insert, a pentagon-shaped cutting insert, and a heptagon-shaped cutting insert.
Figure 8B:
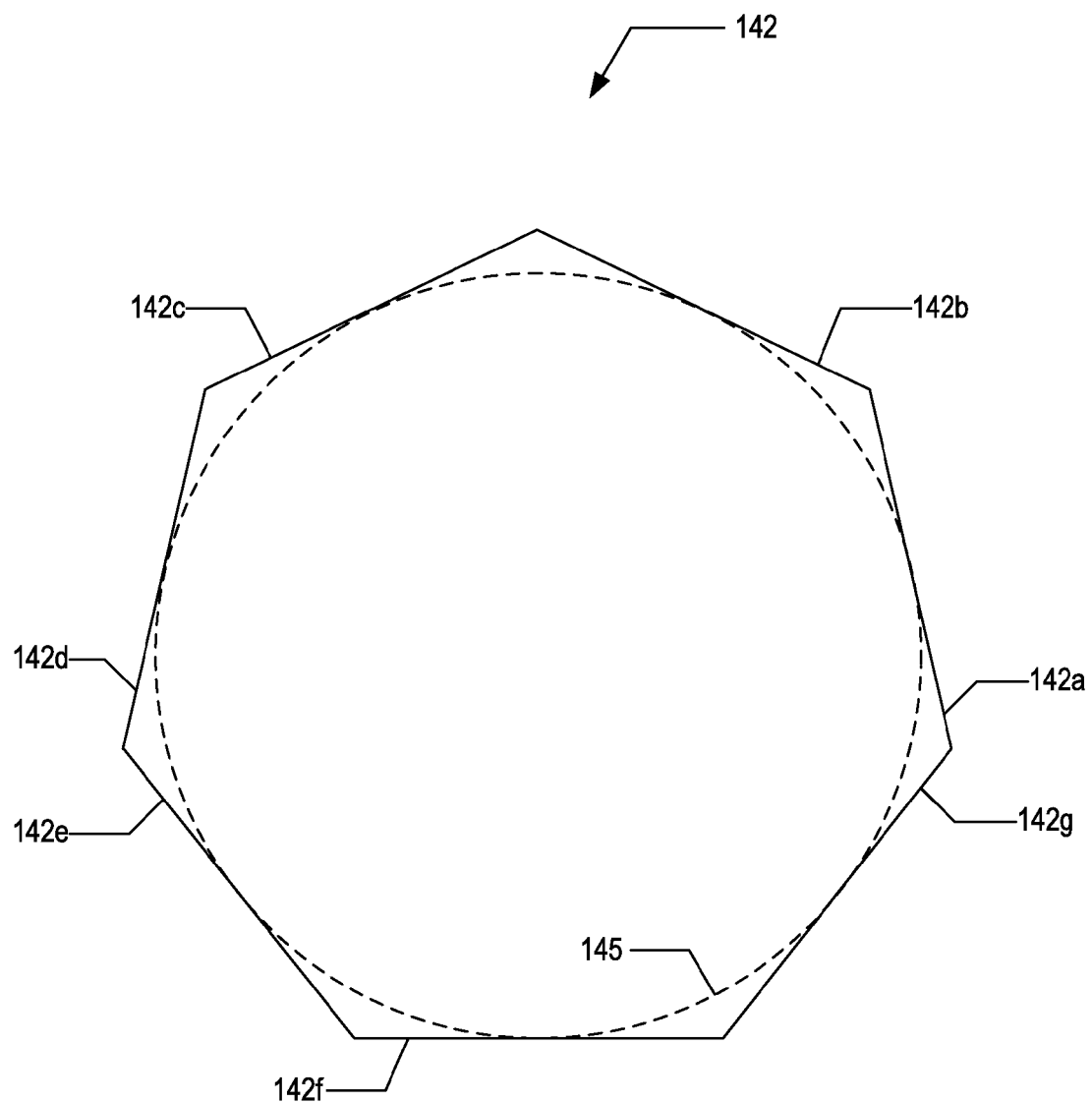
Figure 8C:
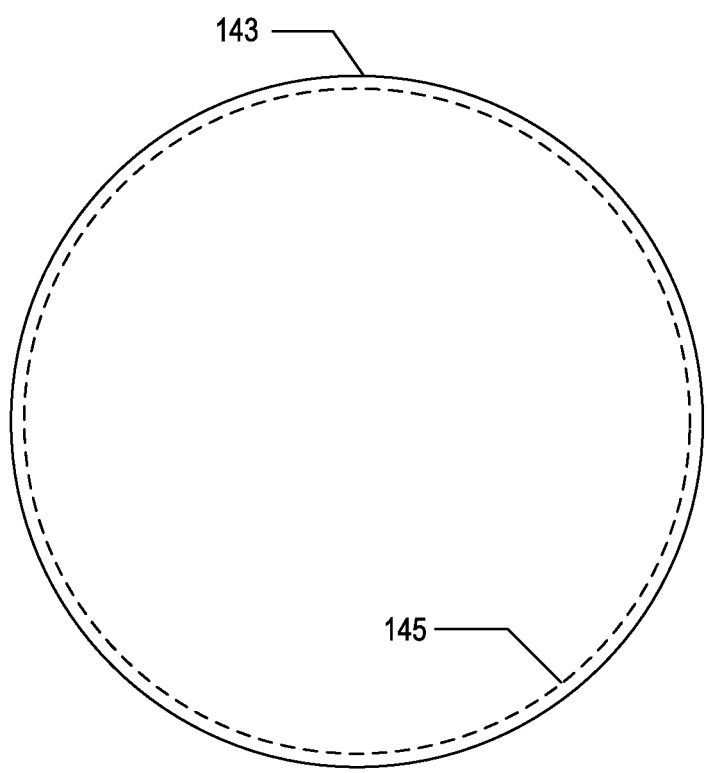
Figure 8D:
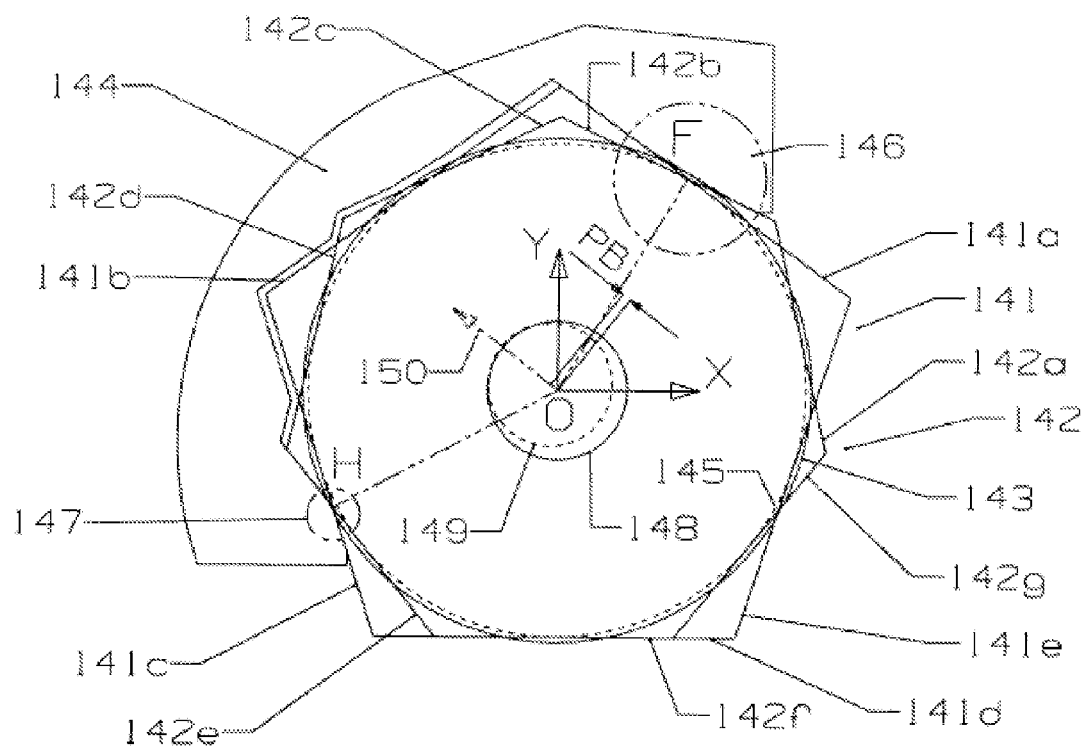
Figure 8E:
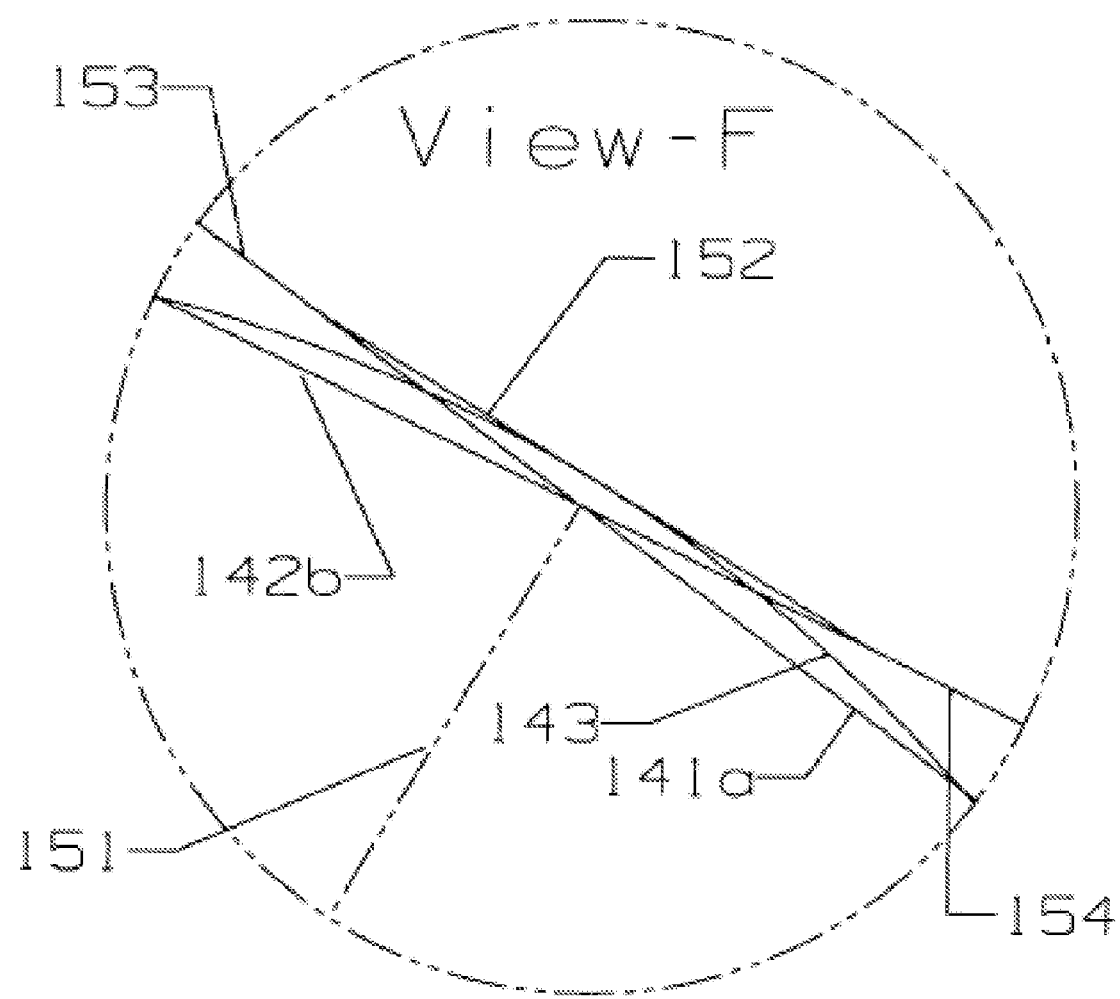
Figure 8F:
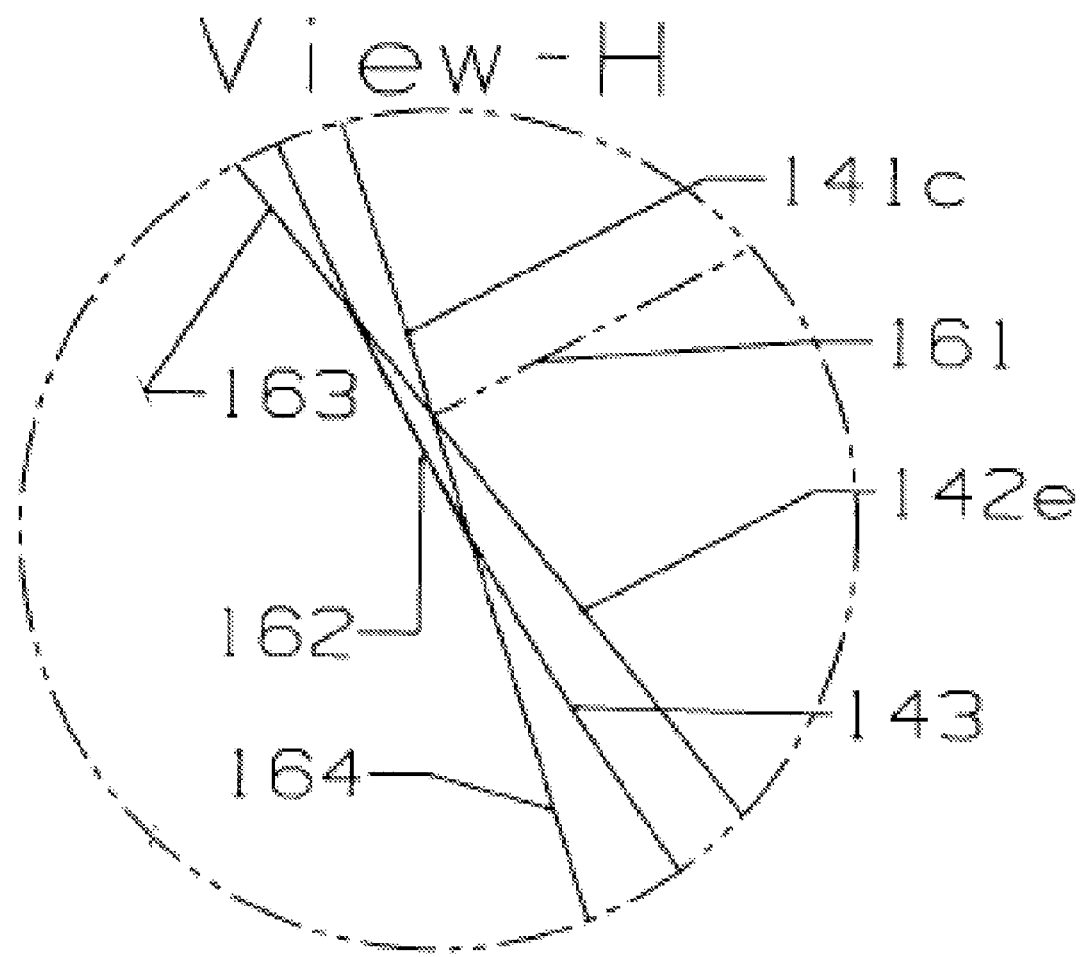

FIGS. 8A-8C illustrate a pentagon 141 representing a pentagon-shaped cutting insert, a heptagon 142 representing a heptagon-shaped cutting insert, and a circle 143 representing a round-shaped cutting insert, respectively. FIGS. 8D-8F schematically illustrate the geometrical relationship among the pentagon, the heptagon, and the circle, each shown concentrically superimposed and positioned in a pocket 144.

FIG. 8A shows a pentagon 141 illustrating a pentagon-shaped cutting insert and having five peripheral sides 141a, 141b, 141c, 141d, and 141e. An inscribed circle (IC) 145 is also shown in FIG. 8A. FIG. 8B shows a heptagon 142 illustrating a heptagon-shaped cutting insert and having seven peripheral sides 142a, 142b, 142c, 142d, 142e, 142f, and 142g. The same IC 145 that is shown in FIG. 8A is also shown in FIG. 8B. FIG. 8C shows a circle 143 illustrating a round-shaped cutting insert. The same IC 145 that is shown in FIGS. 8A and 8B is also shown in FIG. 8C.

FIG. 8D illustrates pocket 144 engaging and accommodating three differently-shaped cutting inserts including: a pentagon-shaped cutting insert (pentagon 141); a heptagon-shaped cutting insert (heptagon 142); and a round-shaped cutting insert (circle 143). The pentagonal sides 141a and 141c represent pocket-engaging surfaces. The heptagonal sides 142b and 142e represent pocket-engaging surfaces.

A V-shaped angle that points inwardly towards the pocket 144 is formed by each set of polygonal sides representing pocket-engaging surfaces (i.e., 141a/141c and 142b/142e) as oriented in the pocket 144. Likewise, tangential projections of the pocket-engaging surfaces of the round-shaped insert form a V-shaped angle that points inwardly towards the pocket 144. Further, other combinations of polygonal sides may represent pocket-engaging surfaces depending on the orientation of the rotationally-symmetric indexable cutting inserts positioned in the pocket. The angles formed between the particular pocket-engaging surfaces of the respective inserts will have vertices that points inwardly towards the insert pocket as the inserts are indexed in the insert pocket and the respective pocket-engaging surfaces contact the insert-engaging pocket walls.

The cutting inserts represented by pentagon 141, heptagon 142, and circle 143 may be secured in the pocket 144 with the PB force illustrated in FIG. 8D by the arrow 150, which results from the offset between the center hole 148 of a cutting insert and the screw hole 149 of the pocket 144. The diameter of the round-shaped cutting insert 143 is longer than the diameter of the IC 145 of the pentagon-shaped cutting insert 141 and the heptagon-shaped cutting insert 142, as described above in connection with the development of Equation (6).

FIG. 8E shows an expanded view (labeled as View-F) of the region indicated by the circle 146 in FIG. 8D. FIG. 8F shows an expanded view (labeled as View-H) of the region indicated by the circle 147 in FIG. 8D. A mathematical model analogous to the model described above may be derived to quantitatively specify the intersection between the polygonal sides 141a and 142b, the line 151 connecting the intersection between sides 141a and 142b and the center point "O", and the insert-engaging pocket walls 152, 153, and 154 (FIG. 8E). Likewise, an analogous mathematical model may be derived to quantitatively specify the intersection between the polygonal sides 141c and 142e, the line 161 connecting the intersection between sides 141c and 142e and the center point "O", and the insert-engaging pocket walls 162, 163, and 164 (FIG. 8F).

Figure 9A:
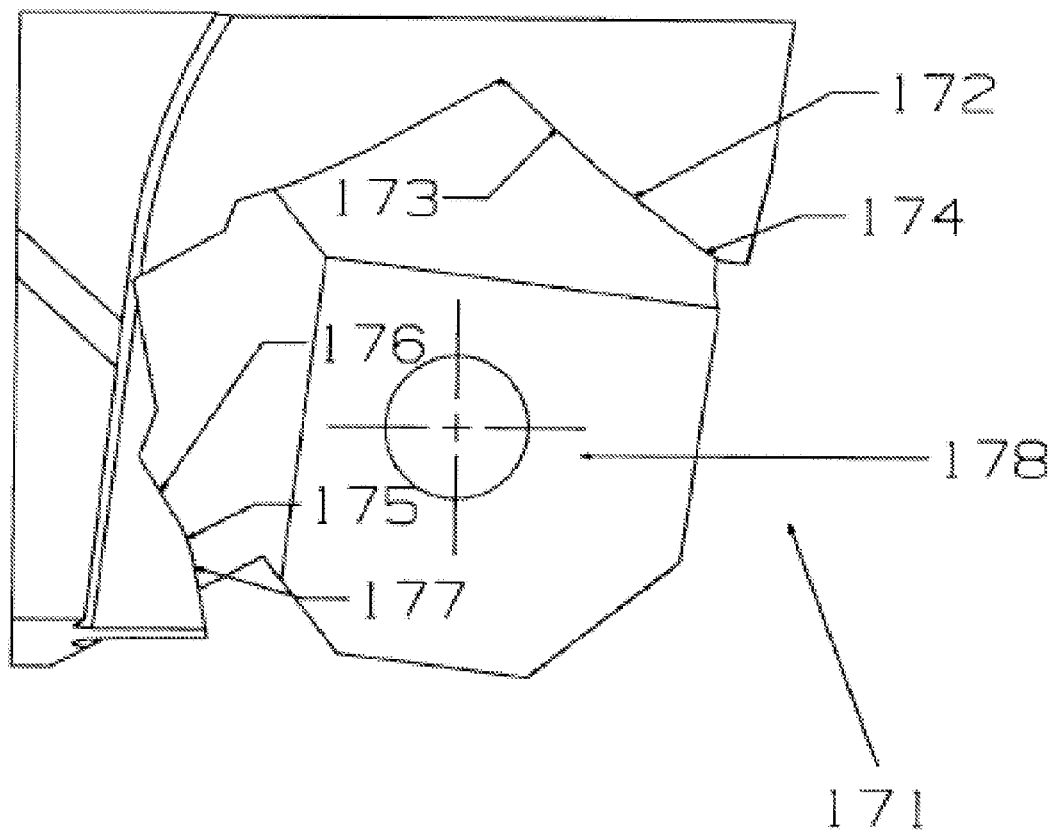
FIG. 9A is a top view of an insert pocket in a tool holder configured to accommodate, alternatively, round-shaped cutting inserts, pentagon-shaped cutting inserts, or heptagon-shaped cutting inserts.
Figure 9B:
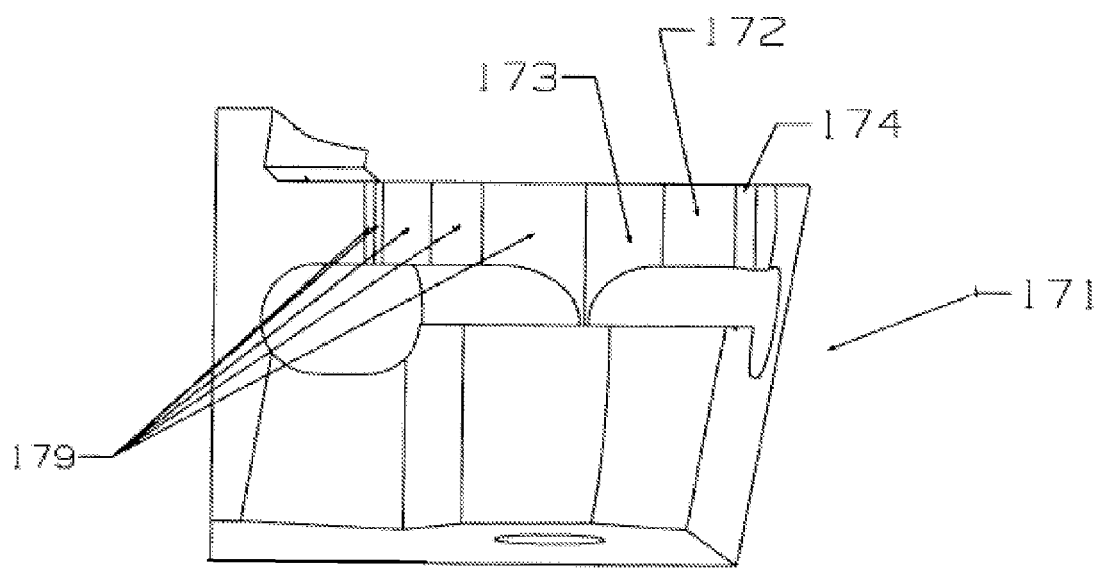
FIG. 9B is side view of the insert pocket shown in FIG. 9A.
Figure 9C:
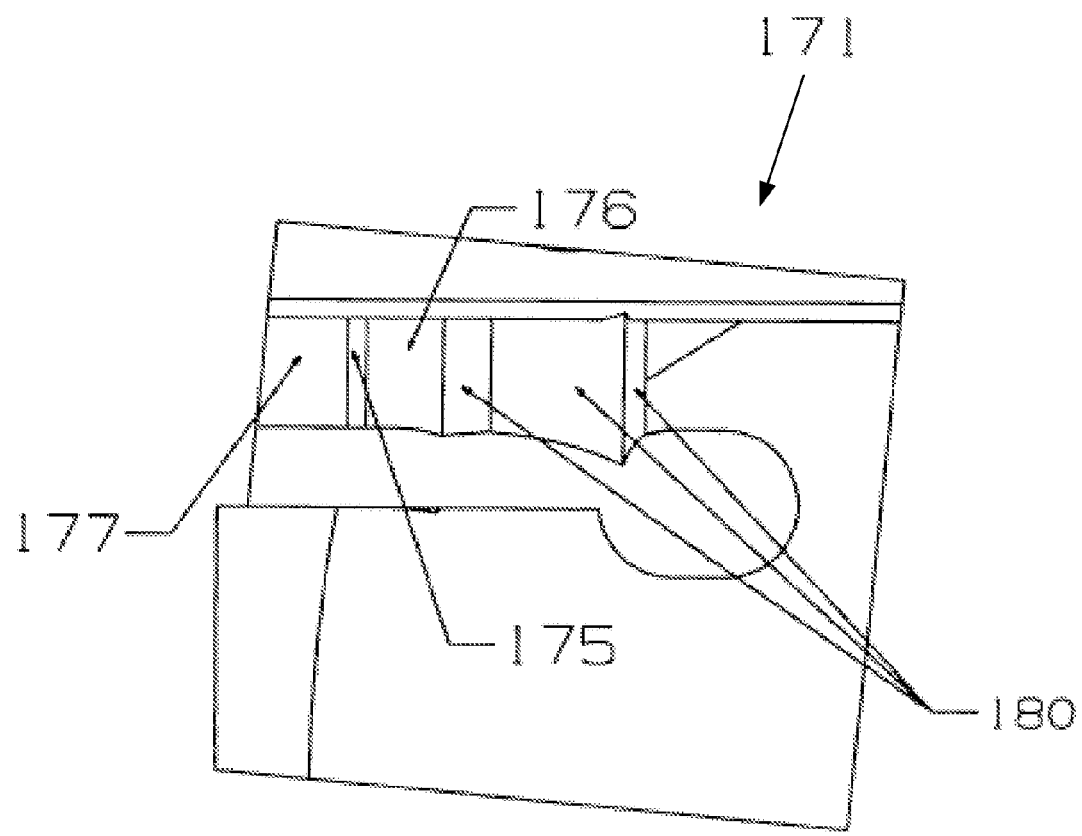
FIG. 9C is a different side view of the insert pocket shown in FIG. 9A.
Figure 9D:
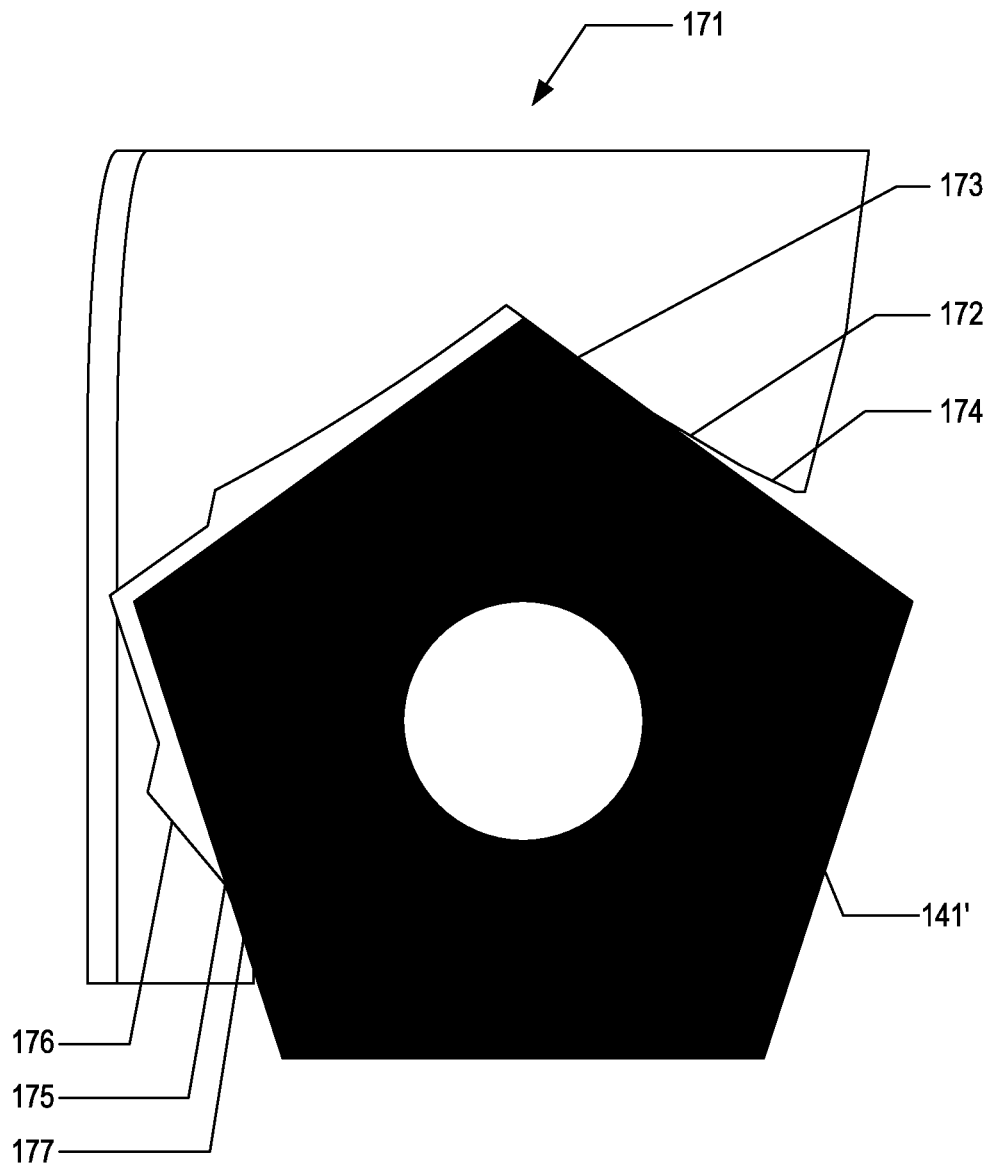
FIGS. 9D-9F are schematic diagrams of the insert pocket shown in FIG. 9A engaging a pentagon-shaped cutting insert, a heptagon-shaped cutting insert, and a round-shaped cutting insert, respectively.
Figure 9E:
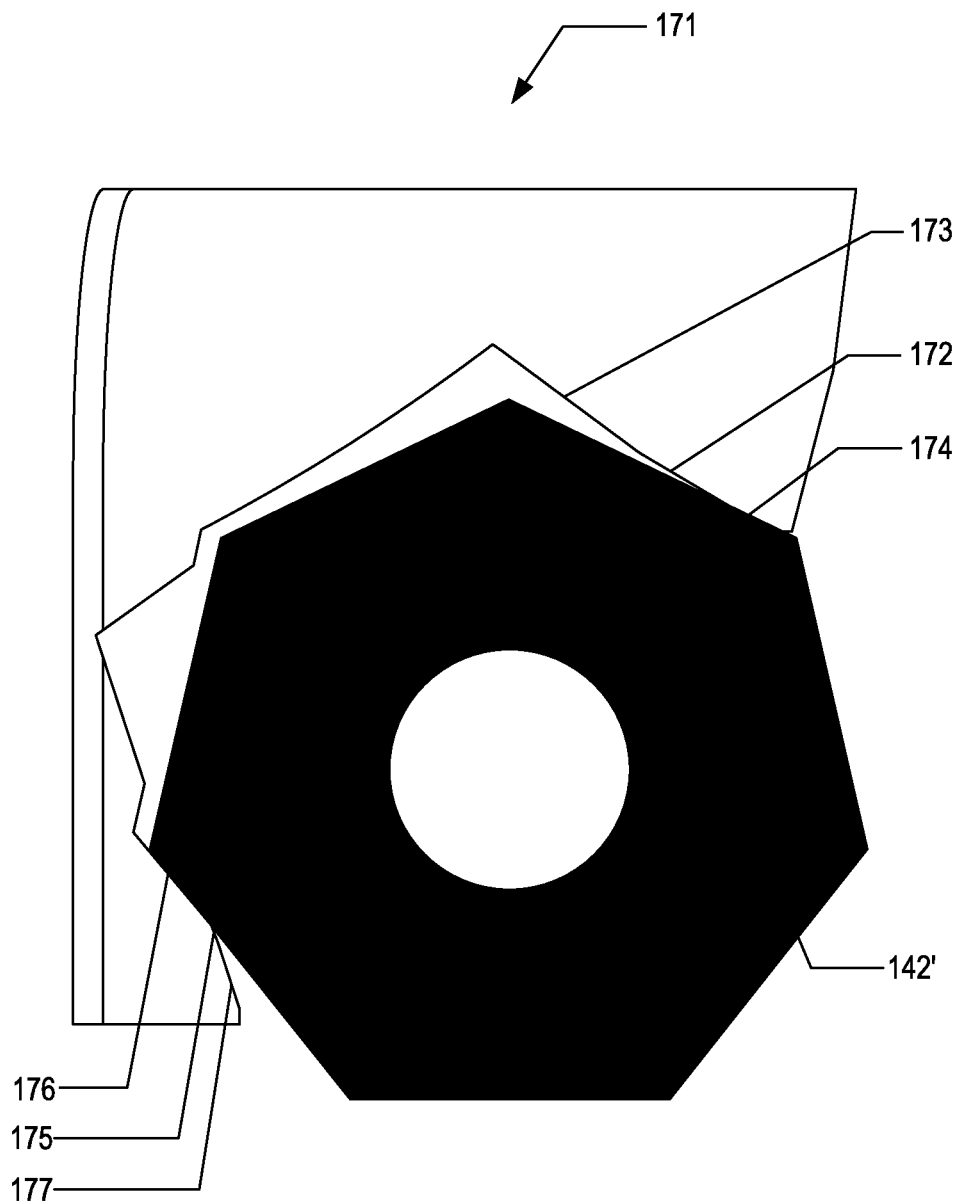
Figure 9F:
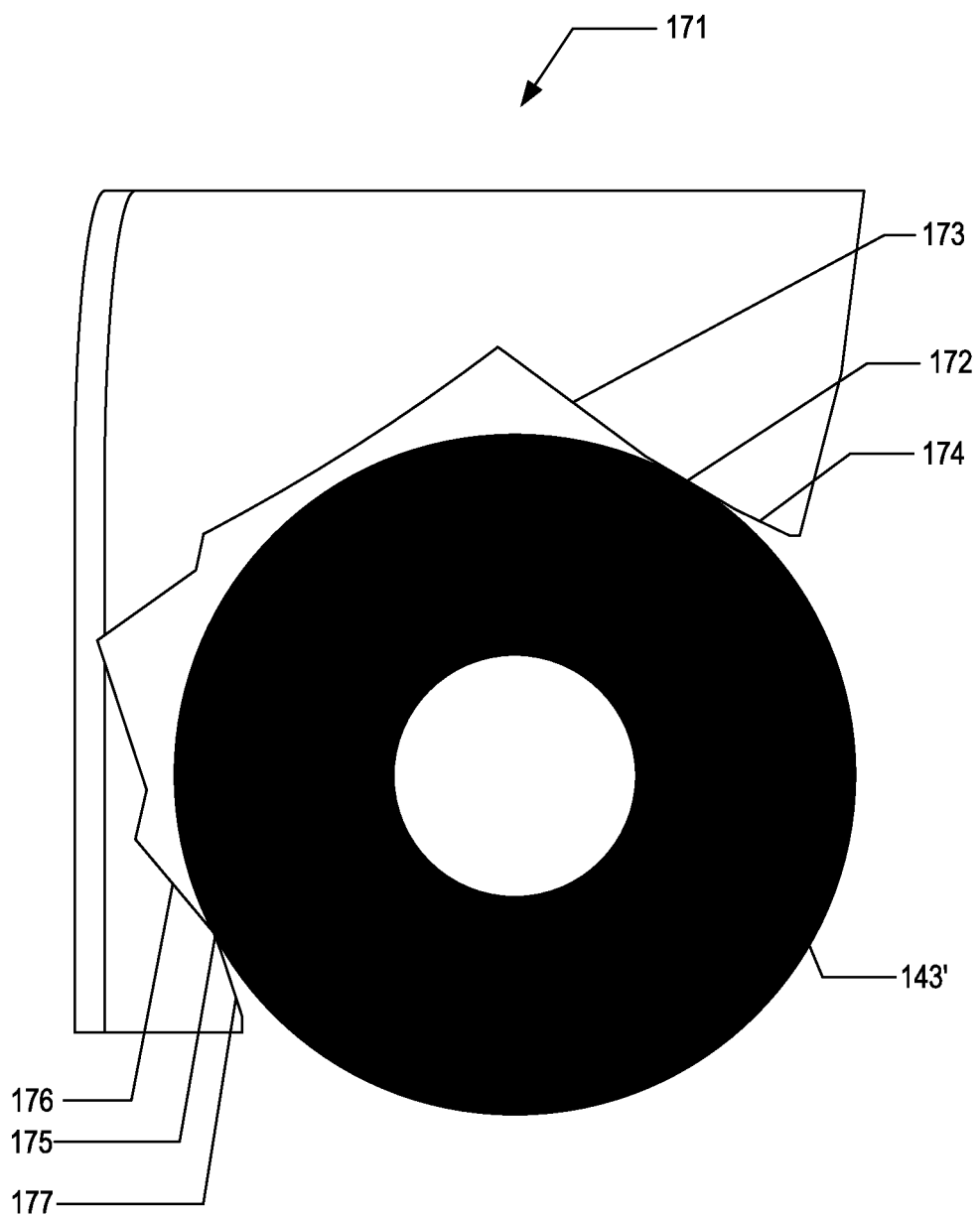

FIGS. 9A-9F illustrate an embodiment of an insert pocket 171 configured to engage and accommodate multiple differently-shaped indexable cutting inserts having a pentagon shape, a heptagon shape, or a round shape. FIGS. 9A-9C are views of the insert pocket 171 without a cutting insert positioned in the pocket 171. FIG. 9A is a top view and FIGS. 9B and 9C are side views. FIGS. 9D-9F show the insert pocket 171 engaging a pentagon-shaped cutting insert 141', a heptagon-shaped cutting insert 142', and a round-shaped cutting insert 143', respectively. The inserts shown in FIGS. 9D-9F are shaded relative to the other illustrated features to highlight the positioning of the inserts in the pocket 171 relative to the pocket walls.

The pocket wall 172, as shown in FIGS. 9A, 9B, and 9D-9F, corresponds to the insert-engaging pocket wall 152 shown in FIG. 8E, and is configured to mechanically contact and support the round-shaped cutting insert 143. The pocket wall 173, as shown in FIGS. 9A, 9B, and 9D-9F, corresponds to the insert-engaging pocket wall 153 in FIG. 8E, and is configured to mechanically contact and support the side 141a of the pentagon-shaped cutting insert 141. The pocket wall 174, as shown in FIGS. 9A, 9B, and 9D-9F, corresponds to the pocket wall 154 in FIG. 8E, and is configured to mechanically contact and support the side 142b of the heptagon-shaped cutting insert 142.

Likewise, the pocket wall 175, as shown in FIGS. 9A, 9C, and 9D-9F, corresponds to the pocket wall 162 shown in FIG. 8F, and is configured to mechanically contact and support the round-shaped cutting insert 143. The pocket wall 176, as shown in FIGS. 9A, 9C, and 9D-9F, corresponds to the pocket wall 163 shown in FIG. 8F, and is configured to mechanically contact and support the side 142e of the heptagon-shaped cutting insert 142. The pocket wall 177, as shown in FIGS. 9A, 9C, and 9D-9F, corresponds to the pocket wall 164 in FIG. 8F, and is configured to mechanically contact and support the side 141c of the pentagon-shaped cutting insert 141.

The pocket walls 172, 173, 174, 175, 176, and 177 are insert-engaging pocket walls and are perpendicular to the seat face 178 of the pocket 171. The pocket walls 179 shown in FIG. 9B and the pocket walls 180 shown in FIG. 9C are non-engaging pocket walls and are not necessarily perpendicular to the seat face 178 of the pocket 171 as long as the non-engaging pocket walls provide sufficient clearance between the pocket walls 179 and 180 and the non-engaging surfaces and cutting edges of a cutting insert.

Figure 10A:
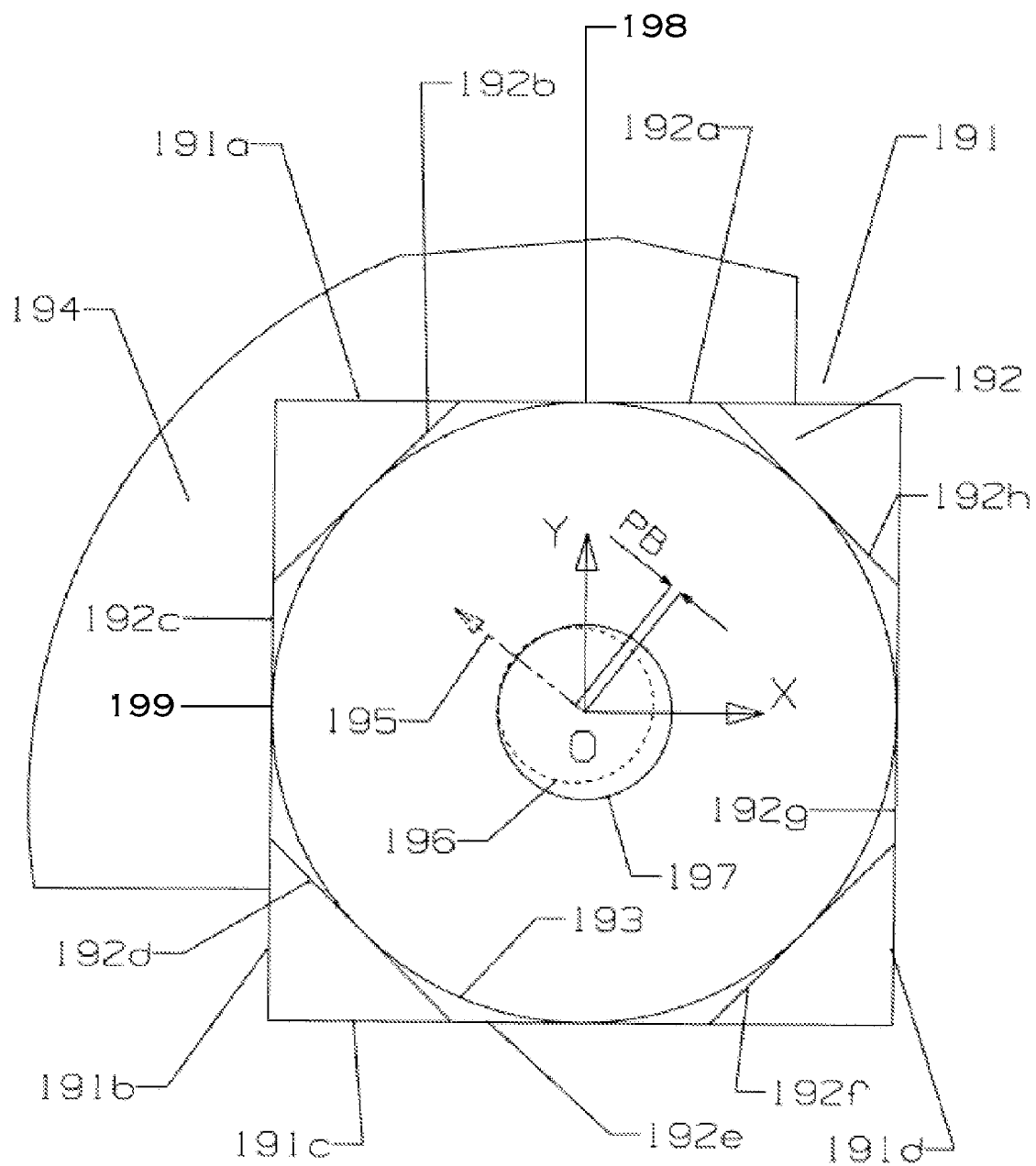
FIG. 10A is a schematic diagram illustrating the geometrical relationship among a round-shaped cutting insert, a square-shaped cutting insert, and an octagon-shaped cutting insert as positioned in a pocket in a tool holder.
Figure 10B:
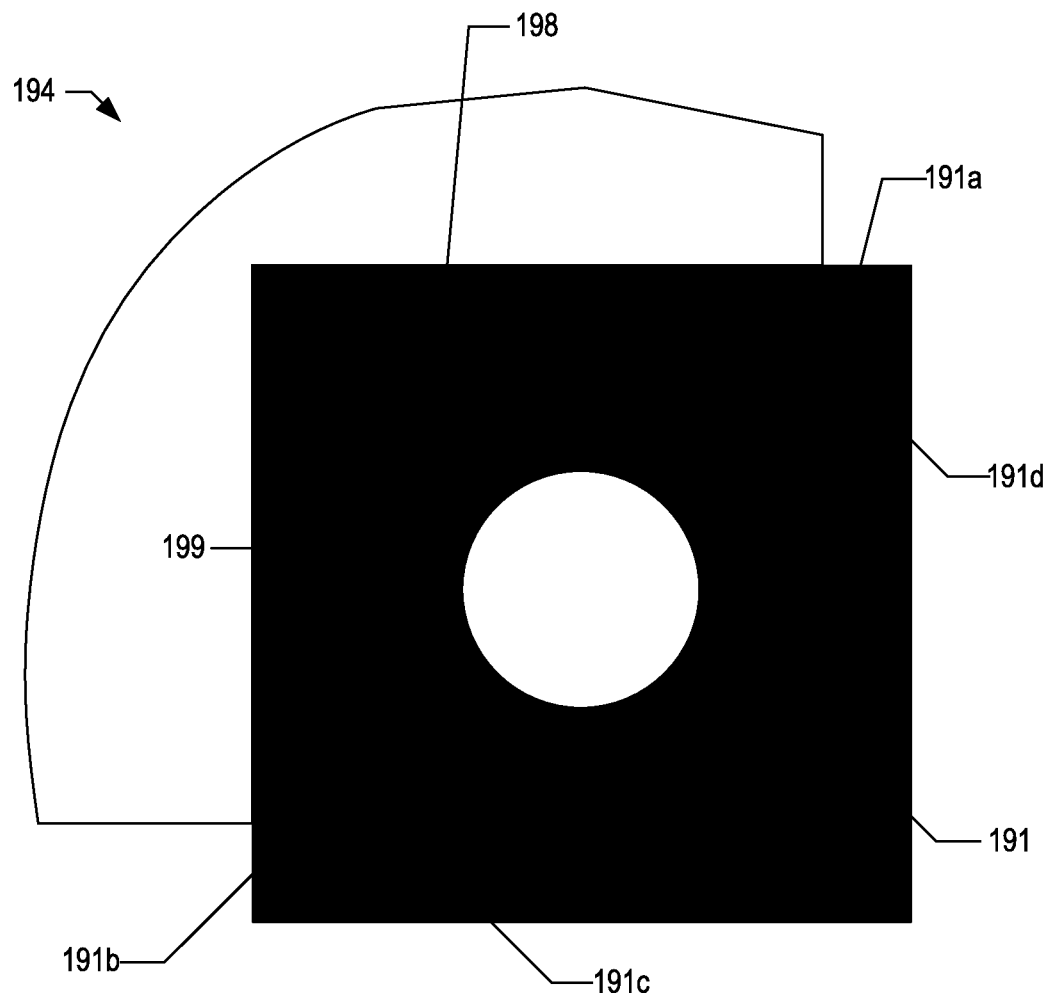
FIGS. 10B-10D are schematic diagrams of the insert pocket shown in FIG. 10A engaging a square-shaped cutting insert, an octagon-shaped cutting insert, and a round-shaped cutting insert, respectively.
Figure 10C:
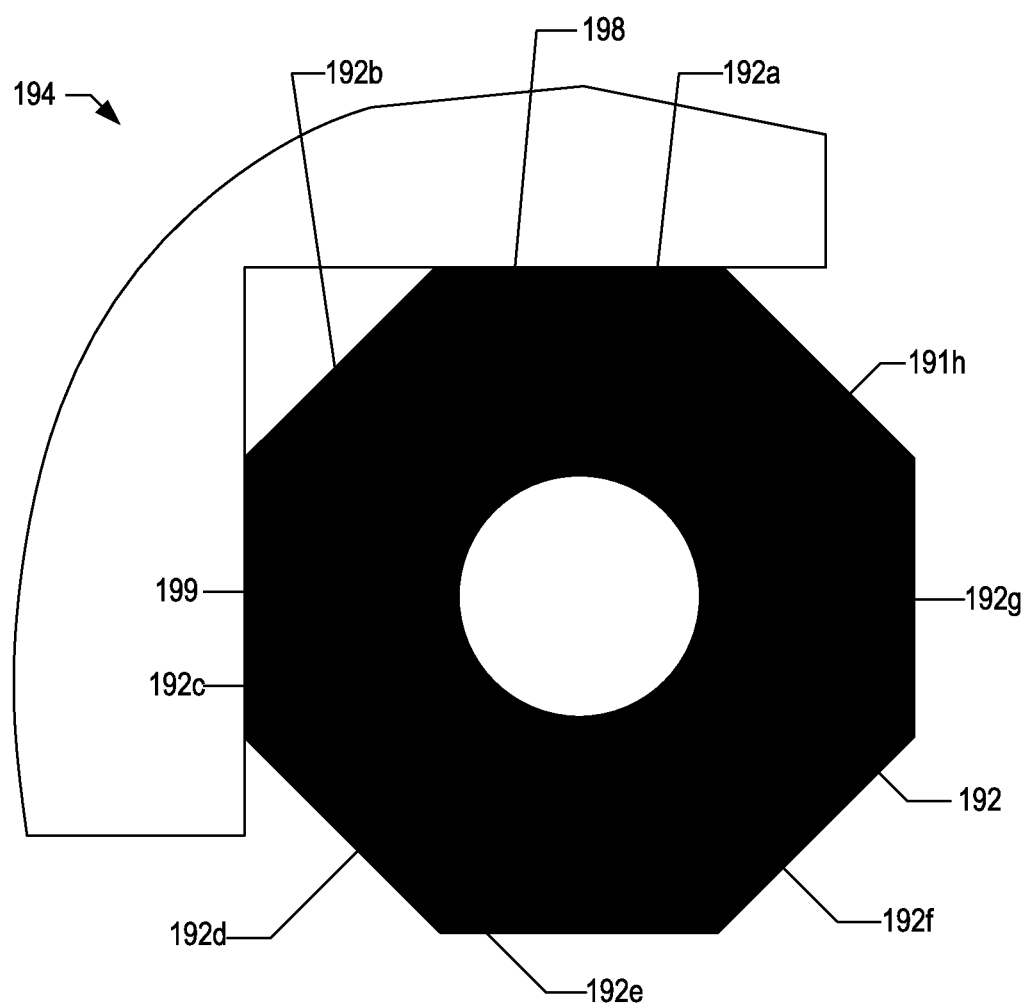
Figure 10D:
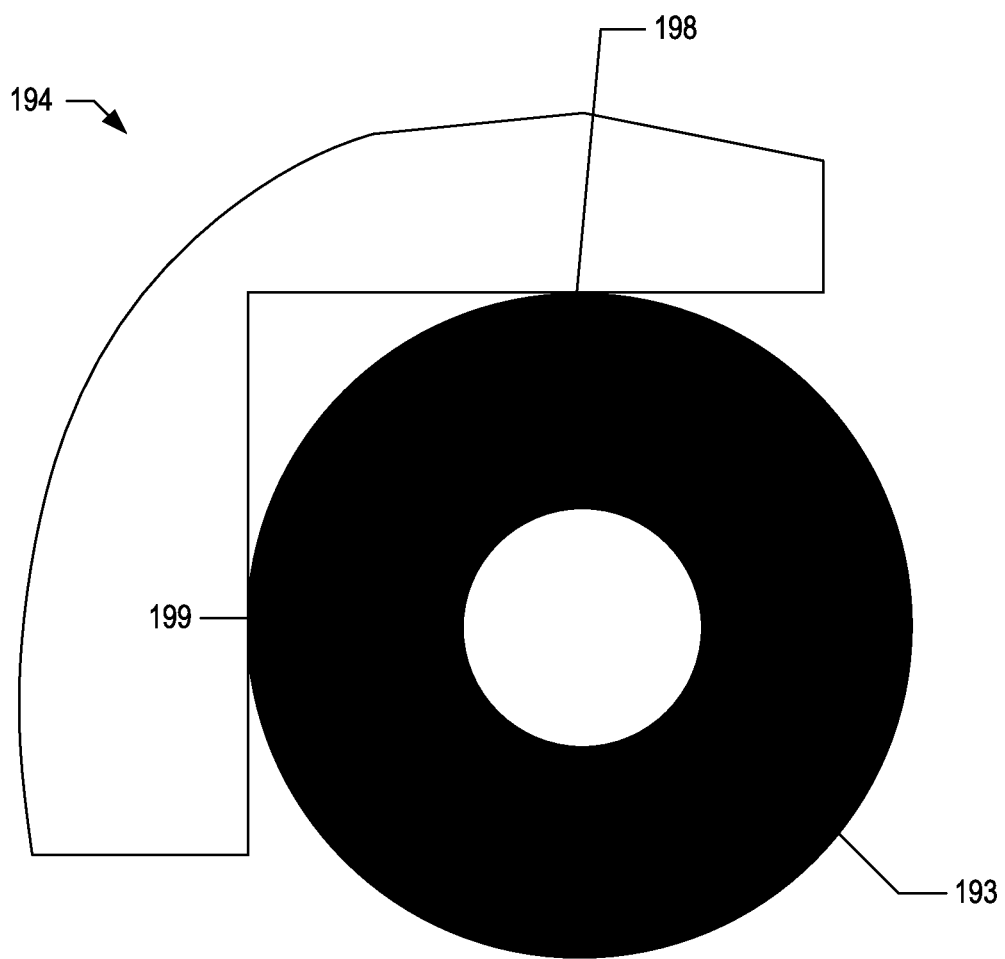

FIGS. 10A-10D illustrate an embodiment of an insert pocket configured to engage and accommodate multiple differently-shaped indexable cutting inserts. The pocket 194 is configured to mechanically contact and support three differently shaped double-sided cutting inserts, including a square-shaped insert 191 (FIG. 10B), an octagon-shaped insert 192 (FIG. 10C), and a round-shaped insert 193 (FIG. 10D). The square-shaped insert 191 has four polygonal sides 191a, 191b, 191c, and 191d. The octagon-shaped insert 192 has eight polygonal sides 192a, 192b, 192c, 192d, 192e, 192f, 192g, and 192h.

The sides 191a and 191b of the square-shaped insert 191 are pocket-engaging surfaces that mechanically contact the insert-engaging pocket walls 198 and 199, respectively, in the depicted indexed orientation of the insert 191. The sides 192a and 192c of the octagon-shaped insert 192 are pocket-engaging surfaces that mechanically contact the insert-engaging pocket walls 198 and 199, respectively, in the depicted indexed orientation of the insert 192. Because the square side 191a and the octagonal side 192a are co-planar, and because the square side 191b and the octagonal side 192c are also co-planar, the diameter of the round-shaped insert 193 is the same diameter as the IC of the square-shaped insert 191 and the octagon-shaped insert 192. The peripheral side of the round-shaped insert 193 also mechanically contacts the insert-engaging pocket walls 198 and 199. In this embodiment, each of the differently-shaped cutting inserts mechanically contacts the same insert-engaging pocket walls 198 and 199. The PB force resulting from the offset between the cutting insert center hole 197 and the pocket screw hole 196 is indicated by the arrow 195 in FIG. 10A.

Figure 11A:
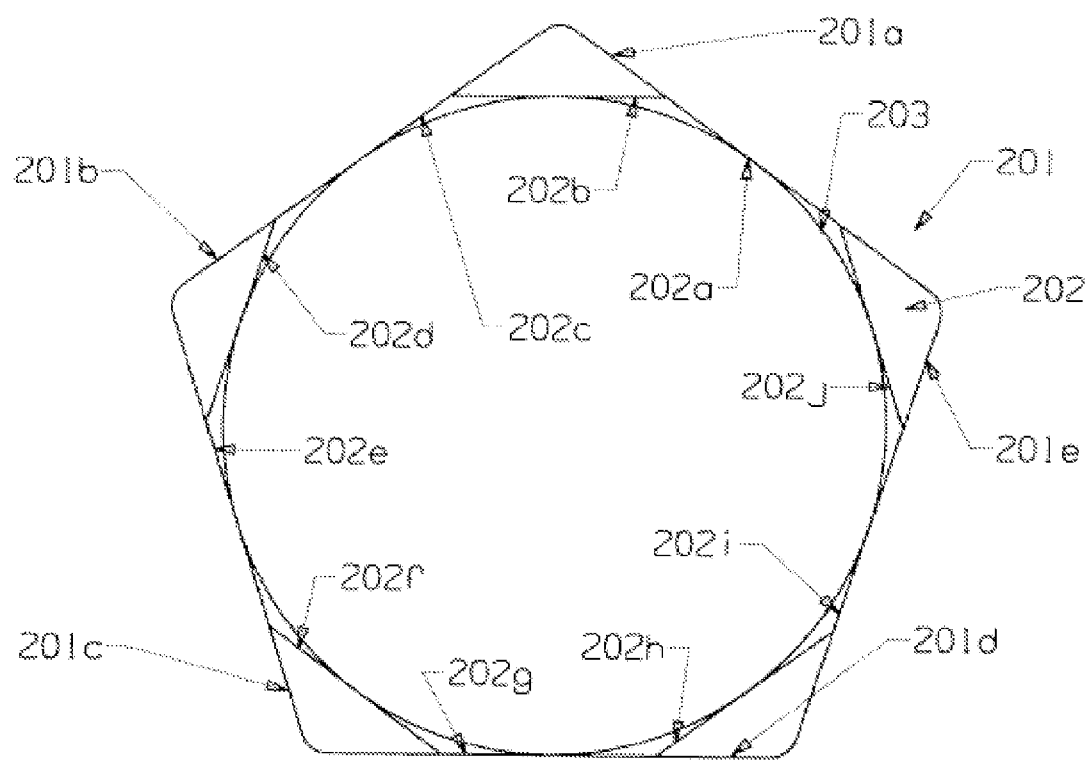
FIG. 11A is a schematic diagram illustrating the geometrical relationship among a round-shaped cutting insert, a pentagon-shaped cutting insert, and a decagon-shaped cutting insert.

FIG. 11A illustrates the geometrical relationship among a pentagon 201 representing a pentagon-shaped cutting insert including five polygonal sides 201a-201e; a decagon 202 representing a decagon-shaped cutting insert including ten polygonal sides 202a-202j; and a circle 203 representing a round double-sided cutting insert. The geometrical relationship illustrated in FIG. 11A is similar to the geometrical relationship discussed above in connection with FIG. 10A regarding the co-planar relationship between pocket-engaging surfaces of the multiple differently-shaped inserts. As shown in FIG. 11A, the diameter of the circle 203 is the same as an IC of the pentagon 201 and the decagon 202 because pentagonal sides 201a, 201b, 201c, 201d, and 201e are co-planar with decagonal sides 202a, 202c, 202e, 202g, and 202i, respectively. The shapes illustrated in FIGS. 10A and FIG. 11A may be modeled as a special case of Equation (6) in which dIC = 0. In this way, pentagonal sides 201a and 201c and decagonal sides 202a and 202e may include pocket-engaging surfaces and common insert-engaging pocket walls may be specified for all three differently-shaped inserts.

Figure 11B:
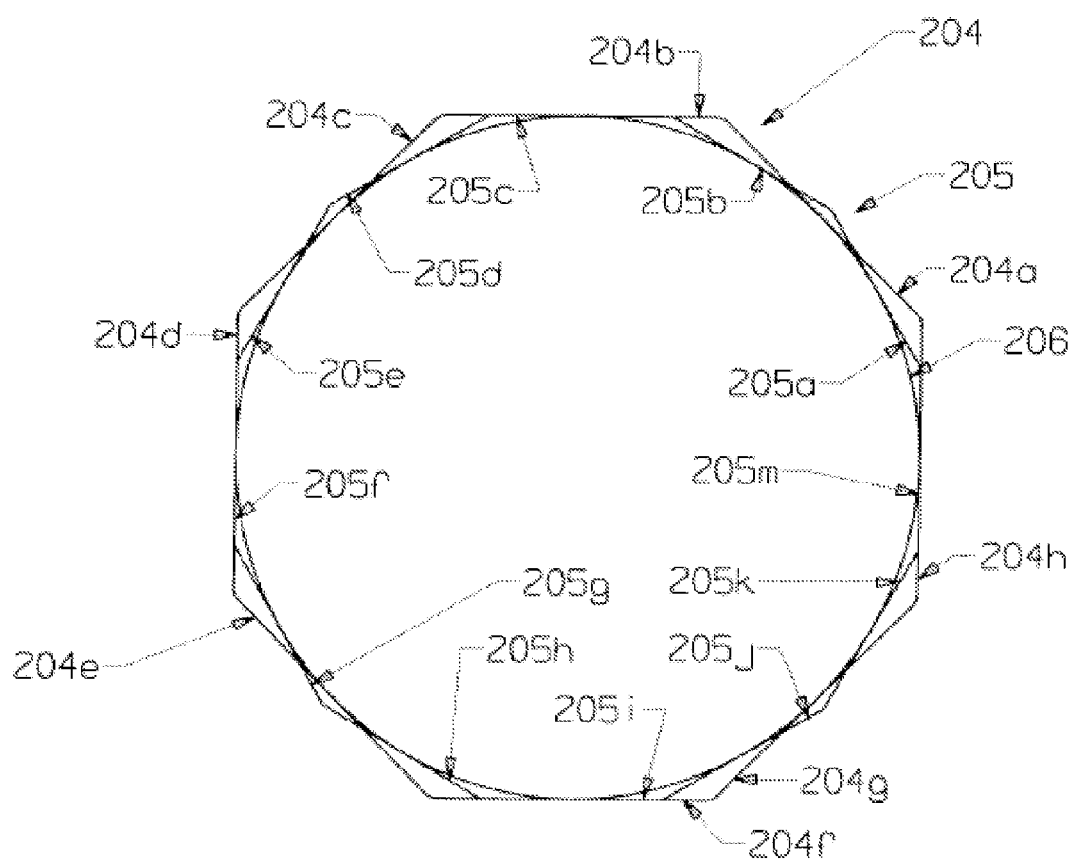
FIG. 11B is a schematic diagram illustrating the geometrical relationship among a round-shaped cutting insert, an octagon-shaped cutting insert, and a dodecagon-shaped cutting insert.

FIG. 11B illustrates the geometrical relationship among an octagon 204 representing an octagon-shaped cutting insert including eight polygonal sides 204a-204h; a dodecagon 205 representing a dodecagon-shaped cutting insert including twelve polygonal sides 205a-205m; and a circle 206 representing a round double-sided cutting insert. Three embodiments, each having different sets of pocket-engaging surfaces, may be specified as follows:

(a) Polygonal sides 204b and 205c; and polygonal sides 204d and 205f;
(b) Polygonal sides 204b and 205c; and polygonal sides 204e and 205g; and
(c) Polygonal sides 204a and 205b; and polygonal sides 204d and 205f.

The geometrical relationship of embodiment (a) is similar to the geometrical relationship discussed above in connection with FIGS. 10A and 11A regarding the co-planar relationship between pocket-engaging surfaces of the differently-shaped inserts. In this embodiment, the dIC parameter of Equation (6) is zero (dIC=0). Embodiments (b) and (c) are similar to the geometrical relationships illustrated in FIGS. 2D and 8D in which dIC is not equal to zero in Equation (6). Therefore, the relationship described by Equation (6) may also be expressed by Equation (12):

$$D_R \begin{cases} IC & \text{if the respective polygonal sides including the pocket-engaging surfaces are co-planar} \\ IC + dIC & \text{otherwise} \end{cases} \quad (12)$$

Figure 12:
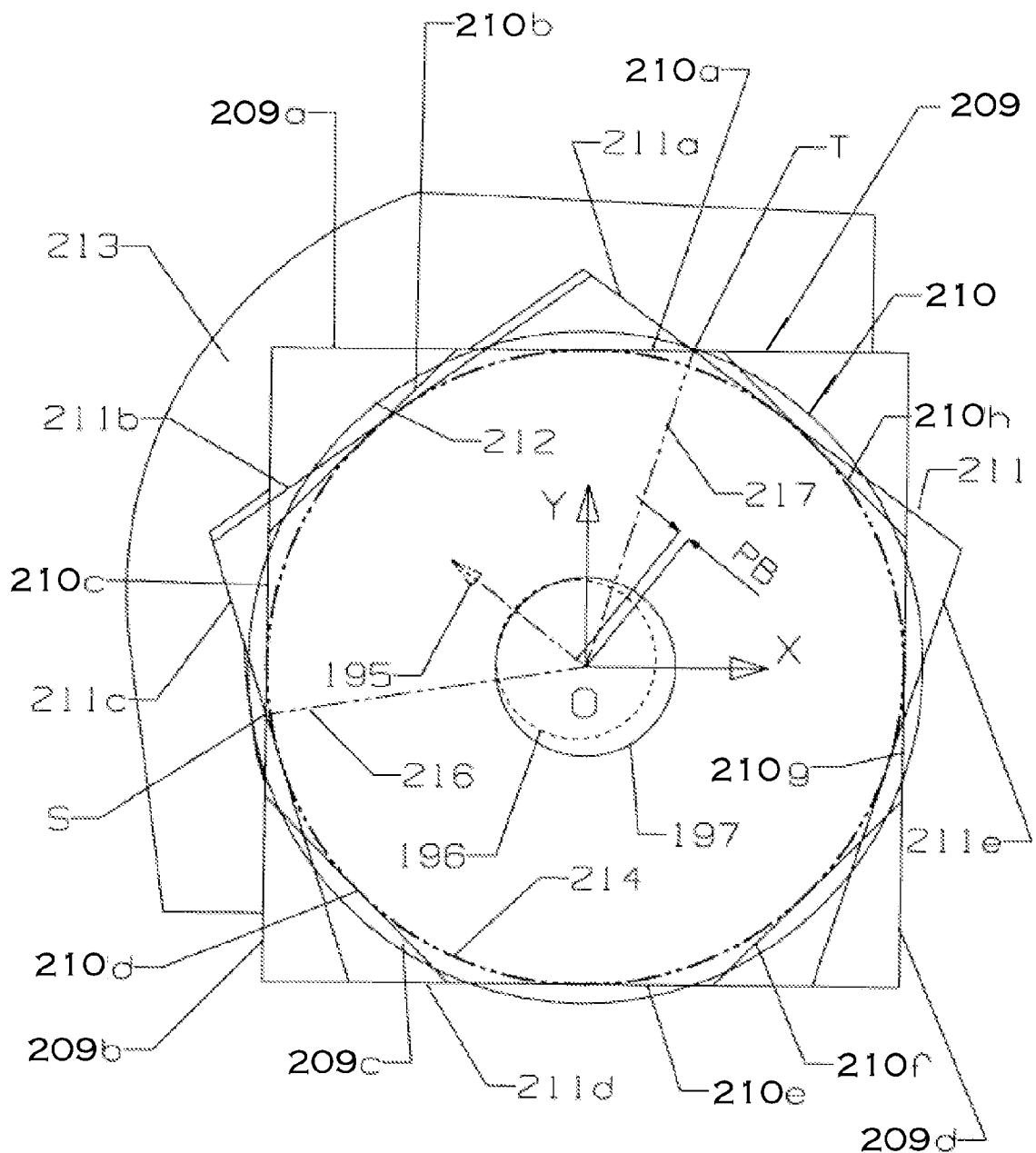
FIG. 12 is a schematic diagram illustrating the geometrical relationship among a round-shaped cutting insert, a square-shaped cutting insert, a pentagon-shaped cutting insert, and an octagon-shaped cutting insert as positioned in an insert pocket of a tool holder.

FIG. 12 illustrates an insert pocket 213 engaging and accommodating four differently-shaped cutting inserts including: a square-shaped insert 209; an octagon-shaped insert 210; a pentagon-shaped insert 211; and a round-shaped insert 212. As shown in FIG. 12, the respective polygonal cutting inserts (i.e., square, octagon, and pentagon) do not have polygonal sides that line up and are co-planar in a superimposed concentric orientation. Therefore, a common insert-engaging pocket wall cannot be specified because of the lack of common pocket-engaging surfaces. According to Equation (12), for this geometric orientation, $D_R$=IC+dIC. As a result, the round-shaped cutting insert 212 has a diameter that is larger by dIC than the diameter of the common IC 214 of the polygonal inserts 209, 210, and 211.

In this embodiment, first pocket-engaging surfaces may be represented by the square side 209a, the octagonal side 210a, and the pentagonal side 211a. Second pocket-engaging surfaces may be represented by the square side 209b, the octagonal side 210c, and the pentagonal side 211c. As shown in FIG. 12, the common intersection among the polygonal sides 209a, 210a, and 211a is at the point "T", which is connected to common center point "O" by the line 217. The common intersection among the polygonal sides 209b, 210c, and 211c is at the point "S", which is connected to common center point "O" by the line 216. A PB force results from the offset between the cutting insert center hole 197 and the pocket screw hole 196 is the direction indicated by the arrow 195.

The insert-engaging pocket walls may be quantitatively specified using a mathematical model analogous to the model described above. By deriving and applying a series of equations analogous to Equations (1)-(12), the insert-engaging pocket walls may be mathematically expressed in the X-O-Y orthogonal coordinate system and used to specify a pocket configuration as shown, for example, in FIGS. 13A-13G, which illustrate an embodiment of an insert pocket 231 configured to engage and accommodate multiple differently-shaped indexable cutting inserts having a square shape, an octagon shape, a pentagon shape, or a round shape.

Figure 13A:
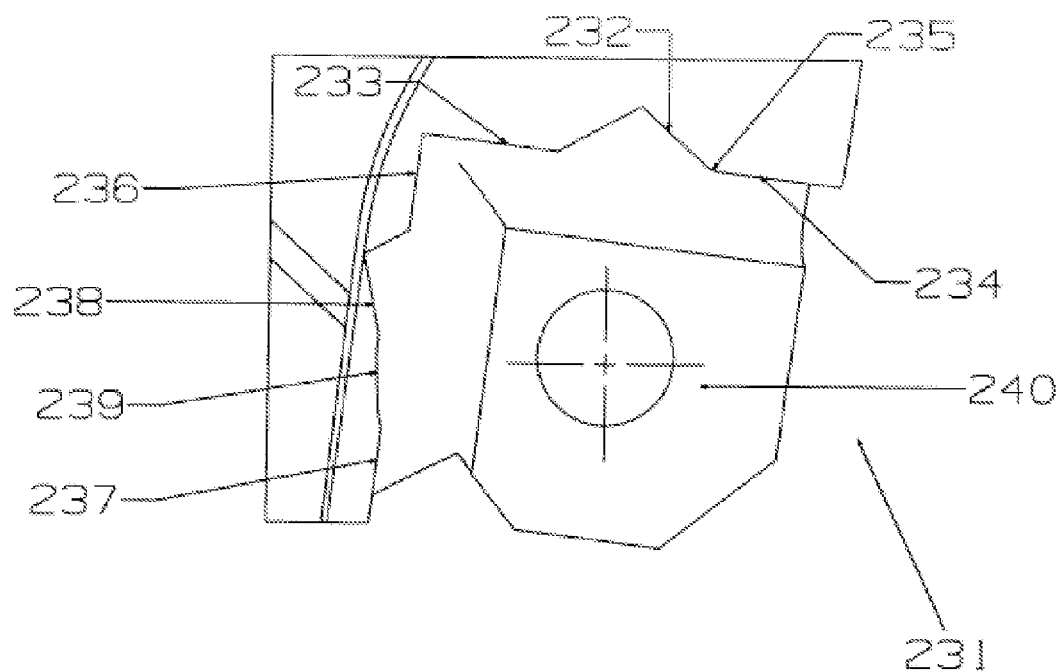
FIG. 13A is a top view of an insert pocket of a tool holder configured to accommodate, alternatively, round-shaped cutting inserts, square-shaped cutting inserts, pentagon-shaped cutting inserts, or octagon-shaped cutting inserts.
Figure 13B:
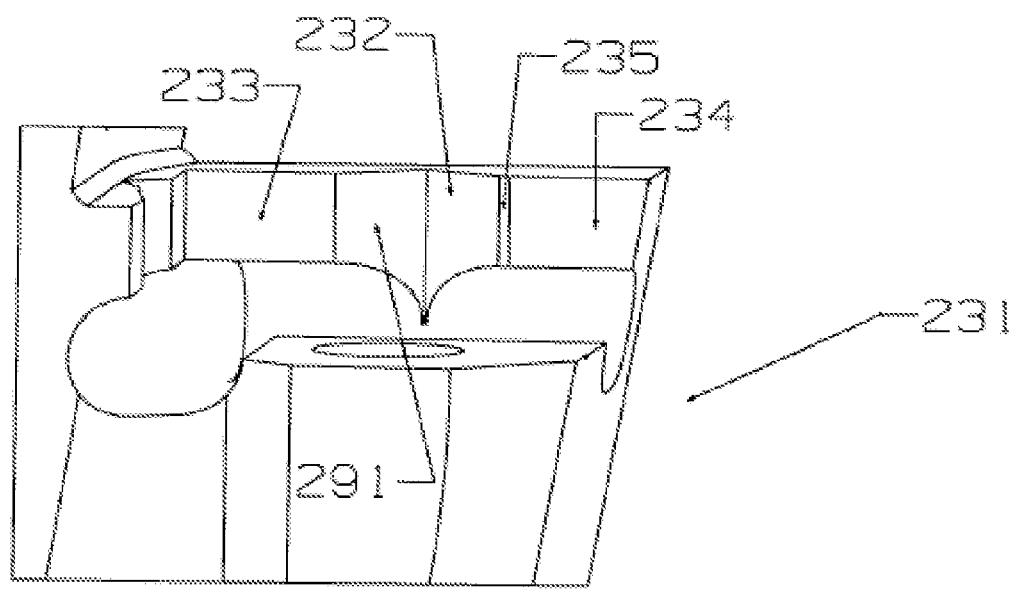
FIGS. 13B and 13C are side view of the insert pocket shown in FIG. 13A.
Figure 13C:
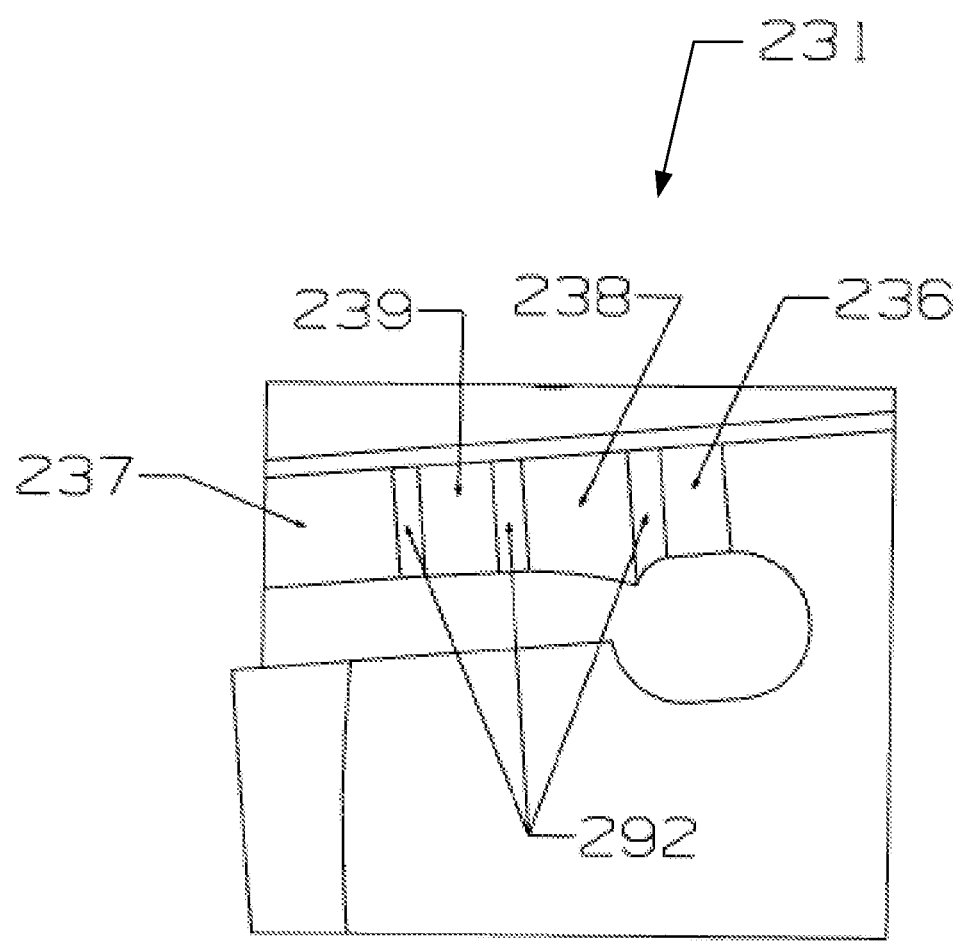
Figure 13D:
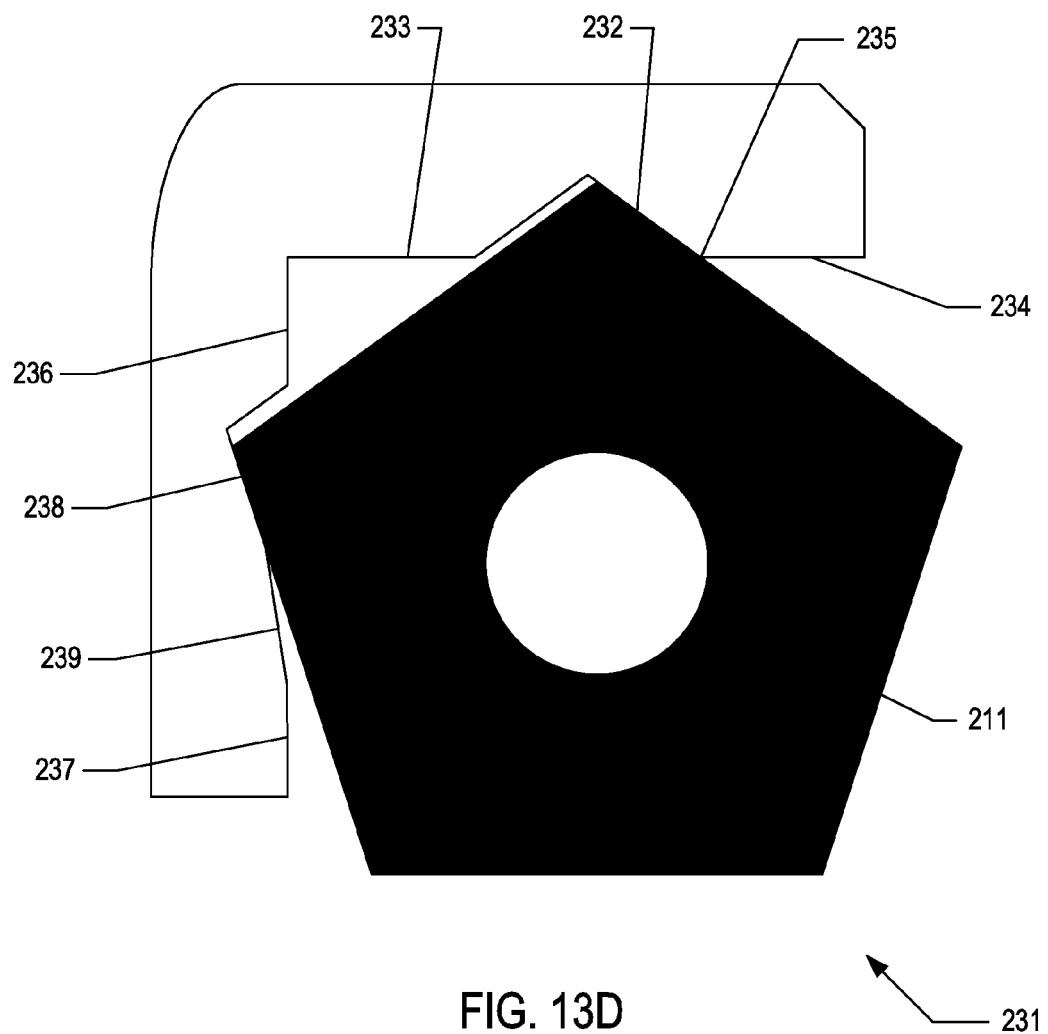
FIGS. 13D-13G are schematic diagrams of the insert pocket shown in FIG. 13A engaging a pentagon-shaped cutting insert, an octagon-shaped cutting insert, a round-shaped cutting insert, and a square-shaped cutting insert, respectively.
Figure 13E:
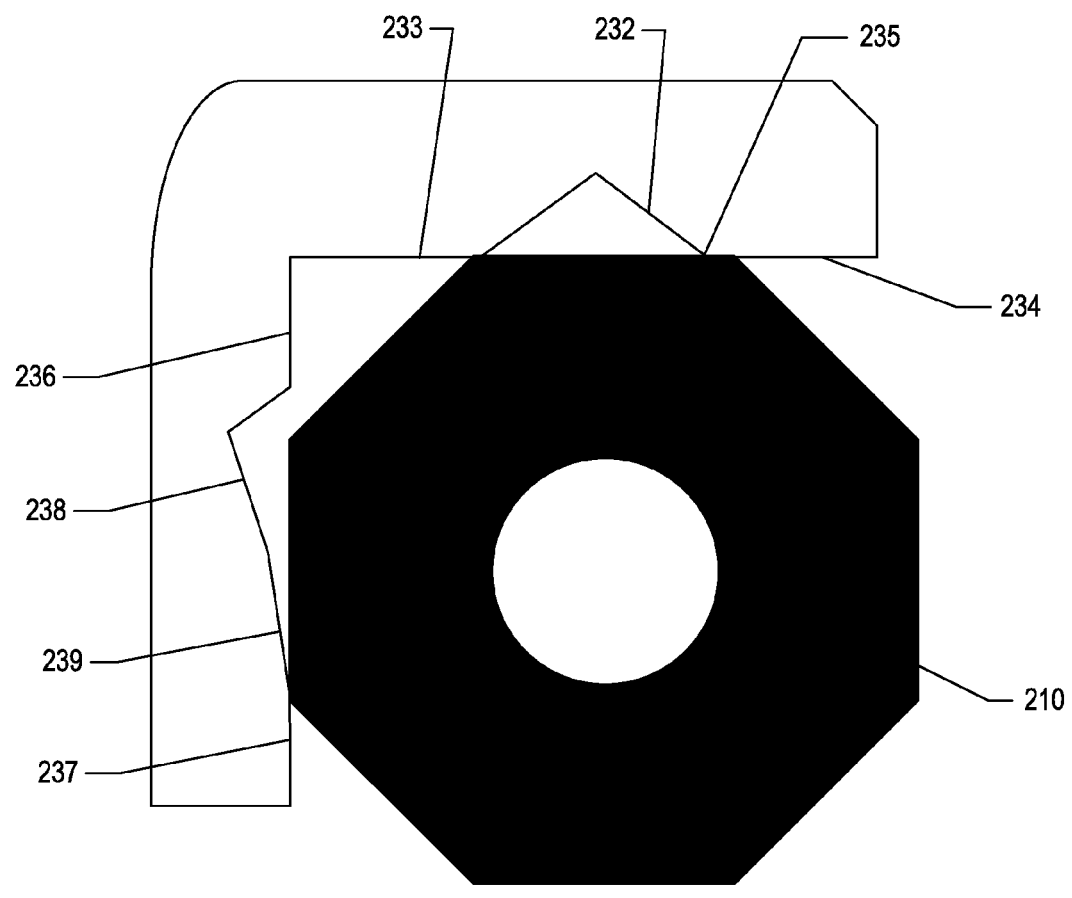
Figure 13F:
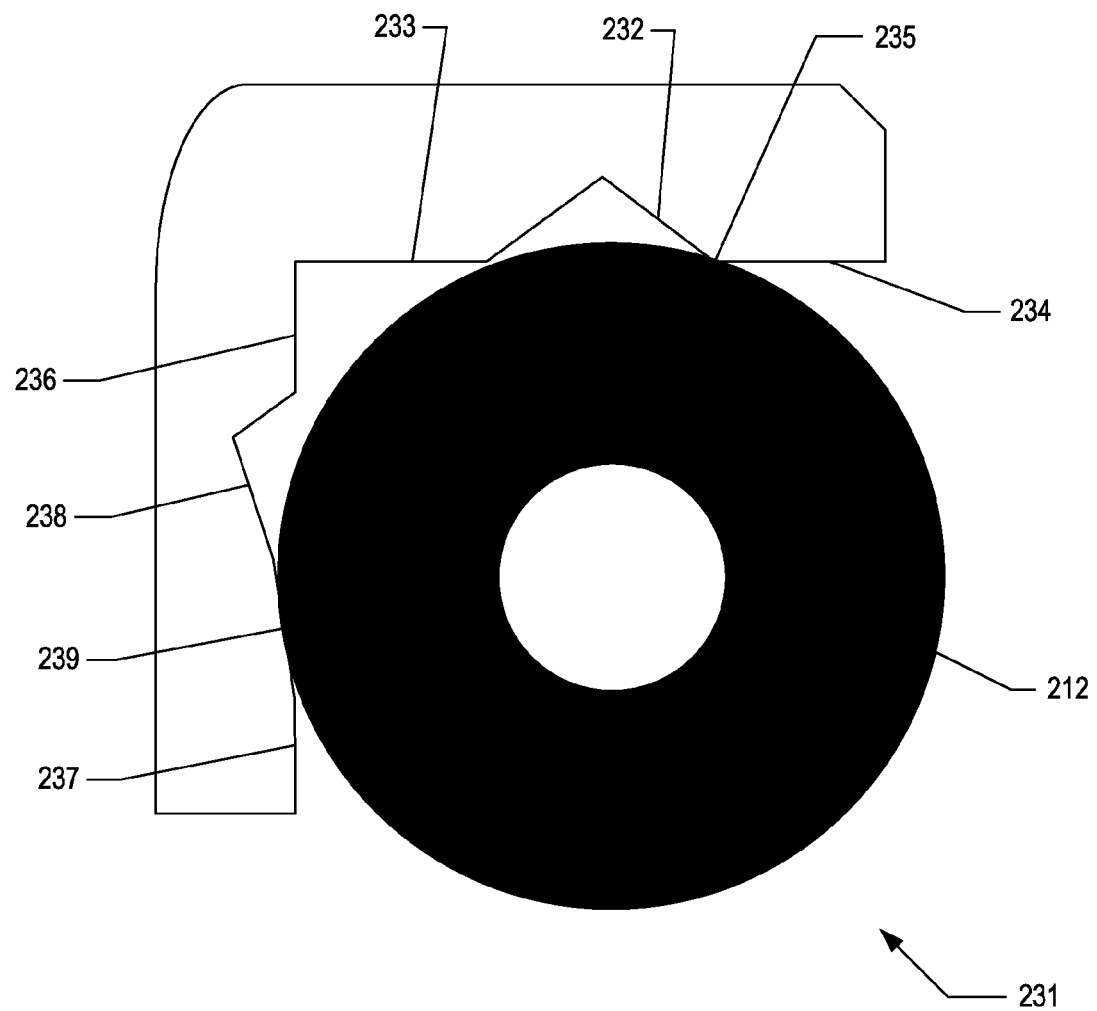
Figure 13G:
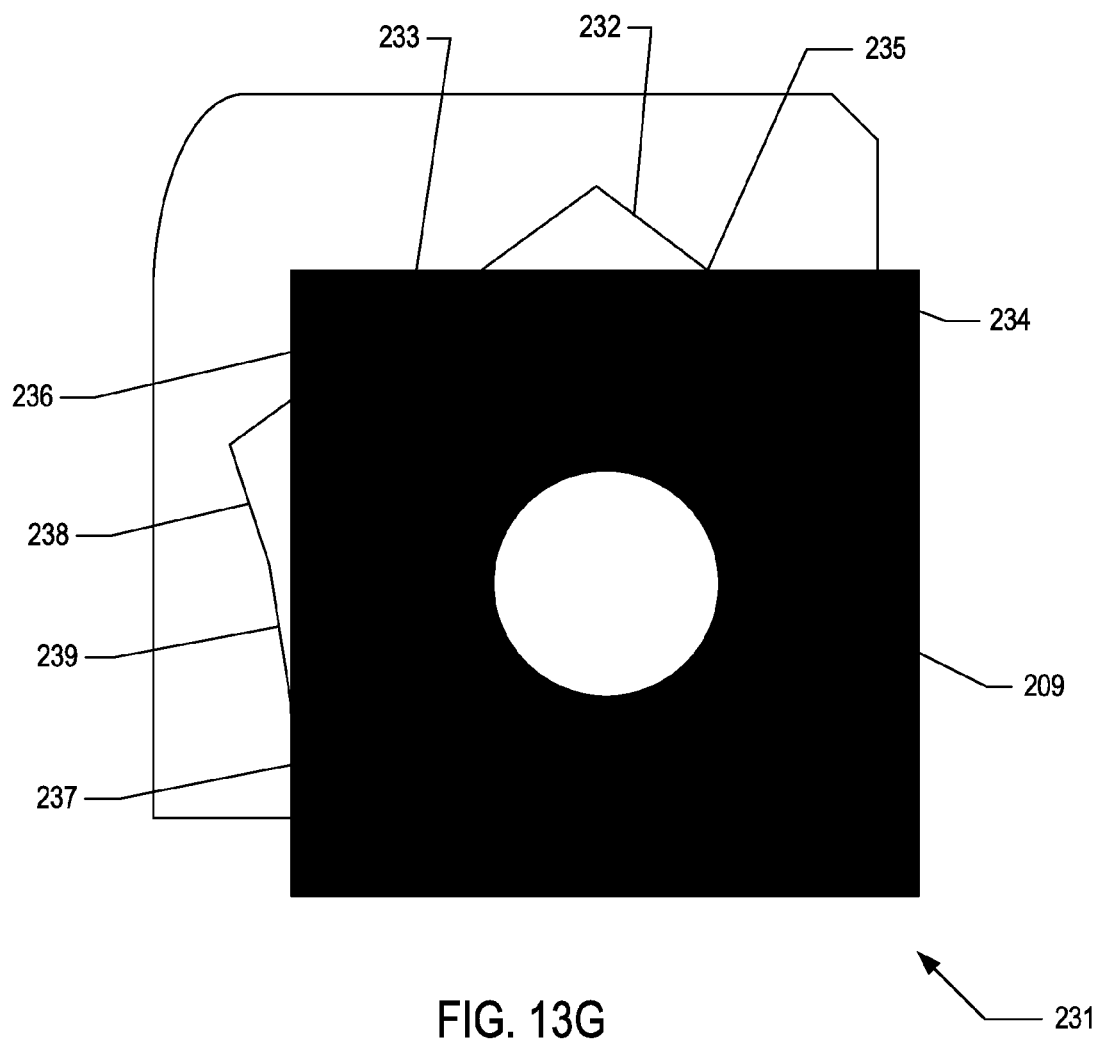

FIG. 13A is a top view and FIG. 13B and FIG. 13C are side views of the insert pocket 231 without having a cutting insert positioned in the pocket 231. FIGS. 13D-13G show the insert pocket 231 engaging a pentagon-shaped cutting insert, an octagon-shaped cutting insert, a round-shaped cutting insert, and a square-shaped cutting insert, respectively. The inserts shown in FIGS. 13D-13G are shaded relative to the other illustrated features to highlight the positioning of the inserts in the pocket 231 relative to the pocket walls.

The insert-engaging pocket wall 235, as shown in FIGS. 13A, 13B, and 13D-13G, is configured to mechanically contact and support the round-shaped cutting insert 212. The insert-engaging pocket wall 232, as shown in FIGS. 13A, 13B, and 13D-13G, is configured to mechanically contact and support the side 211a of the pentagon-shaped cutting insert 211. The insert-engaging pocket walls 233 and 234, as shown in FIGS. 13A, 13B, and 13D-13G, are configured to mechanically contact and support the side 209a of the square-shaped cutting insert 209 or the side 210a of the octagon-shaped cutting insert 210.

Likewise, the insert-engaging pocket wall 239, as shown in FIGS. 13A, 13C, and 13D-13G, is configured to mechanically contact and support the round-shaped cutting insert 212. The insert-engaging pocket wall 238, as shown in FIGS. 13A, 13C, and 13D-13G, is configured to mechanically contact and support the side 211c of the pentagon-shaped cutting insert 211. The insert-engaging pocket walls 236 and 237, as shown in FIGS. 13A, 13C, and 13D-13G, are configured to mechanically contact and support the side 209b of the square-shaped cutting insert 209. The insert-engaging pocket wall 237 is also configured to mechanically contact and support the side 210c of the octagon-shaped cutting insert 210.

The insert-engaging pocket walls 232, 233, 234, 235, 236, 237, 238, and 239 are perpendicular to the seat face 240 of the pocket 231. The non-engaging pocket wall 291 shown in FIG. 13B and the non-engaging pocket walls 292 shown in FIG. 13C are not necessarily perpendicular to the seat face 240 of the pocket 231 as long as they provide sufficient clearance between the pocket walls 291 and 292 and the non-contacting sides of a cutting insert.

As described above, the insert-engaging pocket walls according to various embodiments may be perpendicular to the corresponding seat faces. In various other embodiments, the insert-engaging pocket walls may have an angle less than (or equal to) 90 degrees with respect to the corresponding seat faces.

Figure 14A:
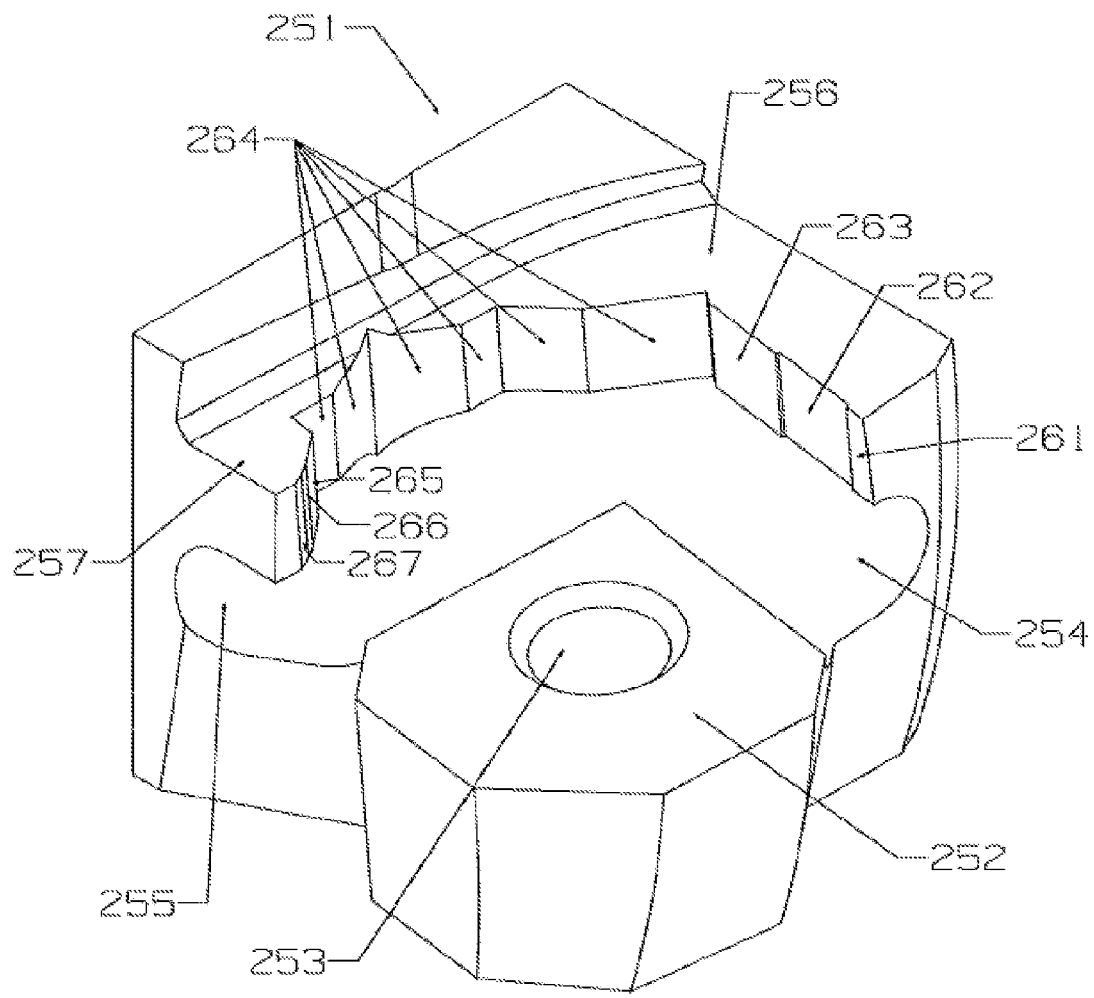
FIG. 14A is a perspective view of an insert pocket in a tool holder configured to accommodate, alternatively, round-shaped cutting inserts, hexagon-shaped cutting inserts, or octagon-shaped cutting inserts.

FIG. 14A shows a perspective view illustrating an embodiment of a single insert pocket configured to accommodate multiple differently-shaped indexable cutting inserts. The insert pocket 251 is configured to engage and accommodate multiple differently-shaped indexable cutting inserts having a hexagon shape, an octagon shape, or a round shape. The insert pocket 251 shown in FIG. 14A is similar to the insert pocket 81 shown in FIG. 5A, but the insert-engaging pocket walls of the insert pocket 81 in FIG. 5A are perpendicular to the corresponding seat face, and the insert-engaging pocket walls of the insert pocket 251 shown in FIG. 14A have an angle less than 90 degrees with respect to the corresponding seat face.

As shown In FIG. 14A, the insert pocket 251 includes a seat face 252 to contact and seat the top side or the bottom side of a double-sided cutting insert, a screw hole 253 to secure a cutting insert, top faces 256 and 257, and recesses 254 and 255 to provide relief space for the cutting edges of a double-sided cutting insert. The pocket 251 in FIG. 14A also includes a series of pocket walls 261, 262, 263, 264, 265, 266, and 267 (which function like the pocket walls 91, 92, 93, 94, 95, 96, and 97 in FIG. 5A). The pocket walls 261/263 and 265 in FIG. 14A (like the pocket walls 91/93 and 95 in FIG. 5A) are configured to engage an octagon-shaped double-sided cutting insert (such as, for example, the cutting insert 4 illustrated in FIG. 1). The pocket walls 261/263 and 267 in FIG. 14A (like the pocket walls 91/93 and 97 in FIG. 5A) are configured to engage a hexagon-shaped double-sided cutting insert (such as, for example, the cutting insert 5 illustrated in FIG. 1). The pocket walls 262 and 266 (like the pocket walls 92 and 96 in FIG. 5A) are configured to engage a round-shaped double-sided cutting insert (such as, for example, the cutting insert 6 illustrated in FIG. 1).

Figure 14B:
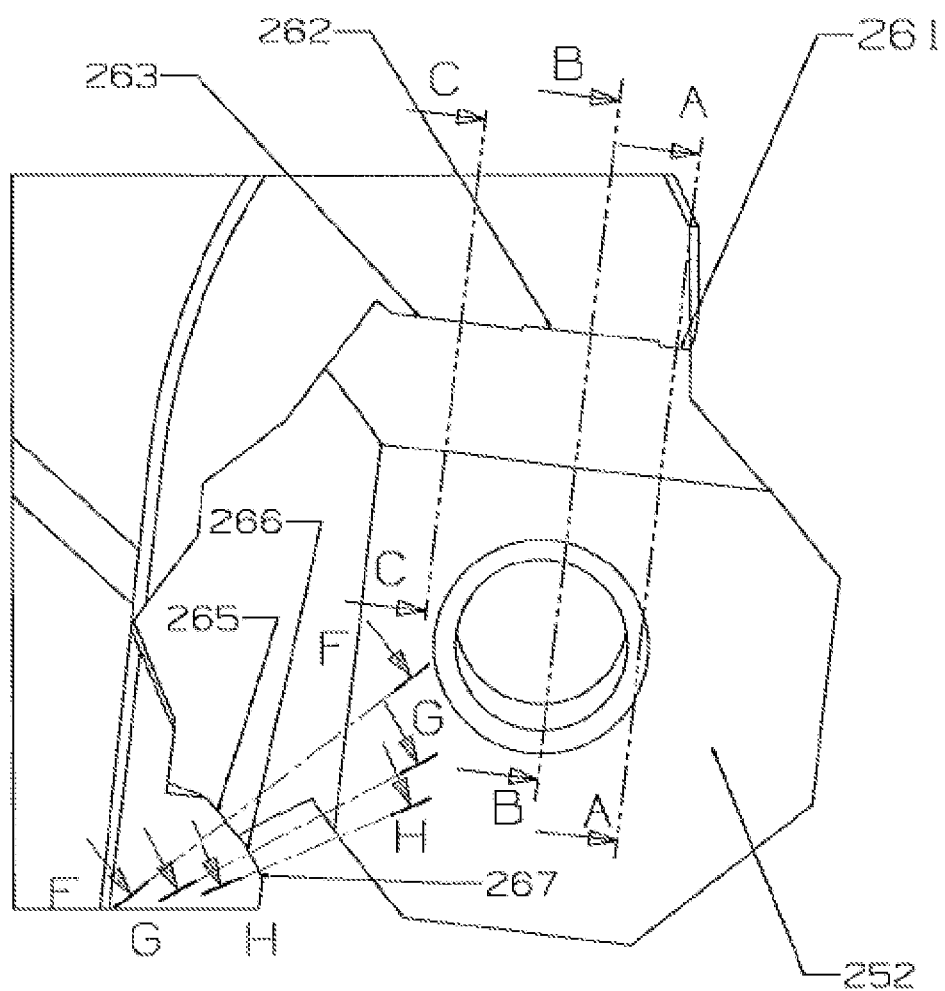
FIG. 14B is a top view of the insert pocket shown in FIG. 14A.
Figure 14C:
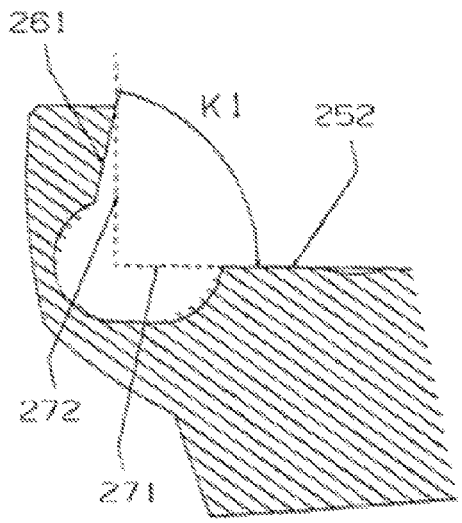
FIGS. 14C-14H show cross-sectional views along lines A-A, B-B, C-C, F-F, G-G, and H-H, respectively, as shown in FIG. 14B.
Figure 14D:
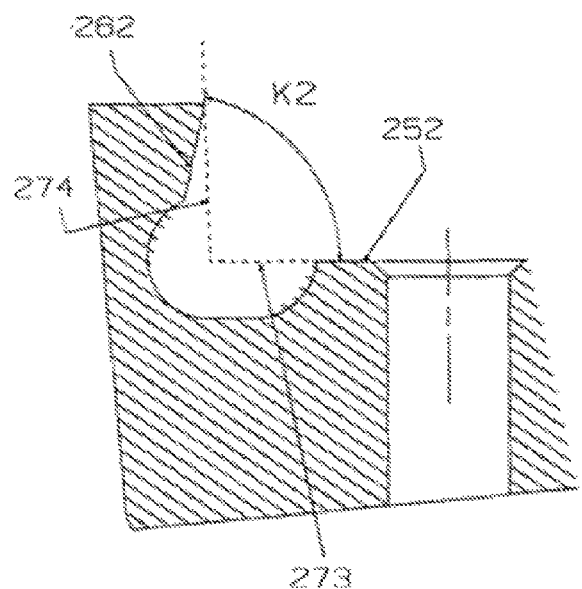
Figure 14E:
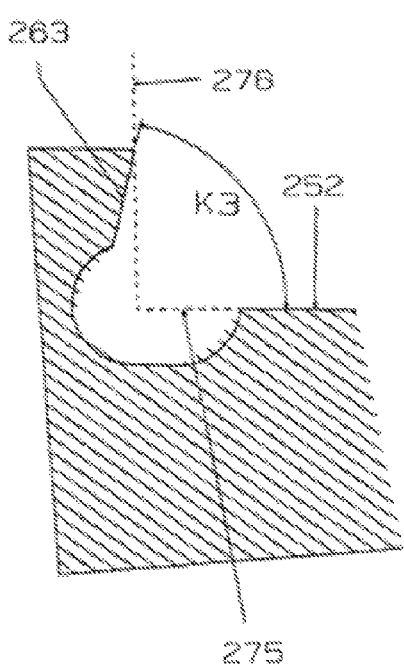

FIG. 14B is a top view of the insert pocket 251 showing six lines labeled A-A, B-B, C-C, F-F, G-G, and H-H. FIGS. 14C-14H show cross-sectional views along the lines shown in FIG. 14B in the directions indicated by the arrows corresponding to each sectional line. FIG. 14C shows Section A-A through the insert-engaging pocket wall 261. FIG. 14D shows Section B-B through the insert-engaging pocket wall 262. FIG. 14E shows Section C-C through the insert-engaging pocket wall 263. In Section A-A of FIG. 14C, the angle between the insert-engaging pocket wall 261 and the seat face 252 is defined as "K1". Likewise, the angle between the insert-engaging pocket wall 262 and the seat face 252 in Section B-B is defined as "K2" (FIG. 14D), and the angle between the insert-engaging pocket wall 263 and the seat face 252 in Section C-C is defined as "K3" (FIG. 14E).

The dotted line 271 in FIG. 14C may represent the bottom face of a hexagon-shaped cutting insert when secured in the pocket 251, and the dotted line 272 in FIG. 14C may represent a peripheral face of the same hexagon-shaped cutting insert. The dotted line 273 in FIG. 14D may represent the bottom face of a round-shaped cutting insert, and the dotted line 274 in FIG. 14D may represent a peripheral face of a round-shaped cutting insert. The dotted line 275 in FIG. 14E may represent the bottom face of an octagon-shaped cutting insert, and the dotted line 276 in FIG. 14E may represent a peripheral face of an octagon-shaped cutting insert. As illustrated in FIGS. 14C-14E, the intersecting dotted lines are perpendicular and represent a perpendicular orientation of a bottom face and a peripheral face of a standard-shaped insert engaged in the pocket 251.

Figure 14F:
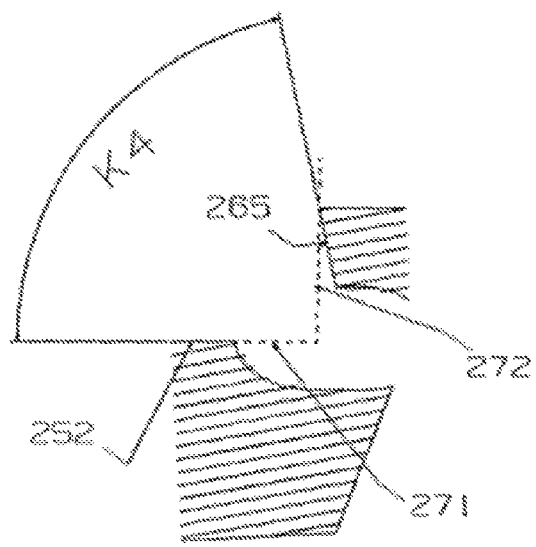
Figure 14G:
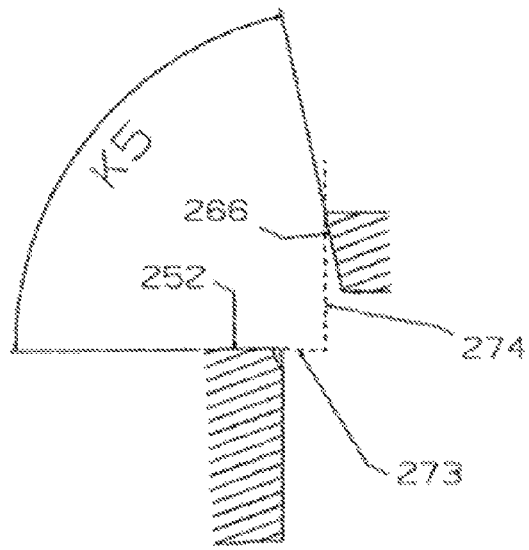
Figure 14H:
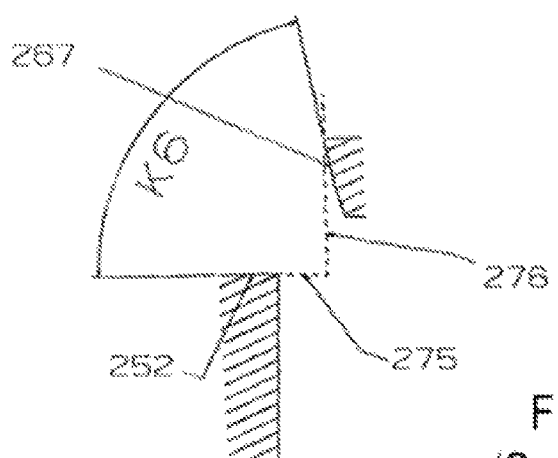

Similarly, FIG. 14F shows Section F-F through the insert-engaging pocket wall 265. FIG. 14G shows Section G-G through the insert-engaging pocket wall 266. FIG. 14H shows Section H-H through the insert-engaging pocket wall 267. In Section F-F of FIG. 14F, the angle between the insert-engaging pocket wall 265 and the seat face 252 is defined as "K4". Likewise, the angle between the insert-engaging pocket wall 266 and the seat face 252 in Section G-G is defined as "K5" (FIG. 14G), and the angle between the insert-engaging pocket wall 267 and the seat face 252 in Section H-H is defined as "K6" (FIG. 14H).

The dotted line 271 in FIG. 14F may represent the bottom face of an octagon-shaped cutting insert, and the dotted line 272 in FIG. 14F may represent a peripheral face of an octagon-shaped cutting insert. The dotted line 273 in FIG. 14G may represent the bottom face of a round-shaped cutting insert, and the dotted line 274 in FIG. 14G may represent a peripheral face of a round-shaped cutting insert. The dotted line 275 in FIG. 14H may represent the bottom face of a hexagon-shaped cutting insert, and the dotted line 276 in FIG. 14H may represent a peripheral face of a hexagon-shaped cutting insert. As illustrated in FIGS. 14F-H, the intersecting dotted lines are perpendicular and represent a perpendicular orientation of a bottom face and a peripheral face of a standard-shaped insert engaged in the pocket 251.

As illustrated in the cross-sectional views shown in FIGS. 14C-14H, the angles K1, K2, K3, K4, K5, and K6 are less than 90 degrees. In various embodiments, the angles K1, K2, K3, K4, K5, and K6 may each have an approximately equal value within conventional tolerances. Equal angles may decrease complexity in the manufacture of the pocket walls. In various embodiments, the angles K1, K2, K3, K4, K5, and K6 may each separately have a value of less than or equal to 90 degrees.

In the various embodiments of a single pocket configured to accommodate multiple differently-shaped double-sided indexable cutting inserts disclosed and described herein, the angle between an insert-engaging pocket wall and the corresponding seat face is less than or equal to 90 degrees, as illustrated in the above FIG. 5A, FIGS. 9A-9C, FIGS. 13A-13C, and FIGS. 14A-14H.

Various non-limiting embodiments of a single pocket configured to accommodate multiple differently-shaped indexable cutting inserts are described herein. The pocket may be particularly configured to accommodate double-sided milling inserts having standard shapes. The pocket and the multiple differently-shaped cutting inserts may be fabricated in various sizes and shapes provided that the components are dimensioned so that the multiple differently-shaped inserts may be used alternatively and interchangeably in a single pocket configuration. The pocket and multiple differently-shaped cutting insert system may be implemented in a variety of material cutting tools, such as, for example, turning inserts and holders, drilling inserts and holders, and milling inserts and holders. In various embodiments, the multiple differently-shaped inserts may be either single-sided or double-sided inserts. In various embodiments, the multiple differently-shaped inserts may be standard shaped inserts that do not include specially-shaped abutment features or other non-standard structural features required to engage an insert pocket.

For example, and without limitation, the insert pockets disclosed and described herein are structured to engage, support, and accommodate multiple differently-shaped double-sided cutting inserts that include symmetrical top and bottom sides. The symmetrical top and bottom sides may be connected by peripheral sides that are perpendicular to the top and bottom sides.

The mathematical models described herein (e.g., Equations (1)-(12) and analogous equations) may be used to develop CAD models of pocket configurations, tool holders, inserts, tool assemblies, and the like. The resulting CAD models may be used to fabricate or manufacture insert pockets, tool holders, cutting inserts, tool assemblies, and the like. For example, CAD models developed using the mathematical models described herein may be used to control a fabrication process (e.g., a computer numerical controlled (CNC) machining process) for a tool holder having pocket walls configured to accommodate multiple differently-shaped cutting inserts as described herein.

Tool holders, insert pockets, and cutting inserts according to the various embodiments described herein may be fabricated or manufactured using methods generally known and understood in the art and, therefore, it is not necessary to describe such methods herein. It is understood that all structures formed according to the various embodiments described herein, including tool holders, insert pockets, pocket configurations, and cutting insert shapes, are formed within typical design, engineering, fabrication, and manufacturing tolerances for cutting tools.

The present disclosure has been written with reference to various exemplary, illustrative, and non-limiting embodiments. However, it will be recognized by persons having ordinary skill in the art that various substitutions, modifications, or combinations of any of the disclosed embodiments (or portions thereof) may be made without departing from the scope of the invention as defined solely by the claims. Thus, it is contemplated and understood that the present disclosure embraces additional embodiments not expressly set forth herein. Such embodiments may be obtained, for example, by combining, modifying, or reorganizing any of the disclosed and described features, aspects, characteristics, limitations, and the like, of the embodiments variously described herein. Thus, this disclosure is not limited by the description of the various exemplary, illustrative, and non-limiting embodiments, but rather solely by the claims. In this manner, the applicants reserve the right to amend the claims during prosecution to add features as variously described herein.

What is claimed is:

1. A cutting insert pocket of a tool holder, the cutting insert pocket comprising:
    a seat face configured to engage either one of a top side and a bottom side of a double-sided cutting insert;
    at least two insert-engaging pocket walls configured to engage peripheral sides of multiple differently-shaped double-sided cutting inserts, the insert-engaging pocket walls having an angle less than or equal to 90 degrees with respect to the seat face; and
    a relief recess located between and separating the seat face and the at least two insert-engaging pocket walls, the relief recess configured to provide clearance space for the cutting edges of multiple differently-shaped double-sided cutting inserts positioned and secured in the pocket;
    wherein the cutting insert pocket is configured to accommodate a round-shaped double-sided cutting insert and at least one polygon-shaped double-sided cutting insert.

2. The cutting insert pocket of claim 1, comprising:
    more than two insert-engaging pocket walls configured to engage the peripheral sides of the multiple differently-shaped double-sided cutting inserts, each of the more than two insert-engaging pocket walls having an angle less than or equal to 90 degrees with respect to the seat face; and
    more than two non-engaging pocket walls configured to not contact multiple differently-shaped double-sided cutting inserts positioned and secured in the pocket.

3. The cutting insert pocket of claim 1, wherein the cutting insert pocket is configured to accommodate a round-shaped cutting insert and at least two different polygon-shaped cutting inserts.

4. The cutting insert pocket of claim 1, wherein the cutting insert pocket is configured to accommodate a round-shaped cutting insert and at least three different polygon-shaped cutting inserts.

5. The cutting insert pocket of claim 1, wherein the cutting insert pocket is configured to accommodate a round-shaped cutting insert, a hexagon-shaped cutting insert, and an octagon-shaped cutting insert.

6. The cutting insert pocket of claim 1, wherein the cutting insert pocket is configured to accommodate a round-shaped cutting insert, a pentagon-shaped cutting insert, and a heptagon-shaped cutting insert.

7. The cutting insert pocket of claim 1, wherein the cutting insert pocket is configured to accommodate a round-shaped cutting insert, a square-shaped cutting insert, and an octagon-shaped cutting insert.

8. The cutting insert pocket of claim 1, wherein the cutting insert pocket is configured to accommodate a round-shaped cutting insert, a pentagon-shaped cutting insert, and a decagon-shaped cutting insert.

9. The cutting insert pocket of claim 1, wherein the cutting insert pocket is configured to accommodate a round-shaped cutting insert, an octagon-shaped cutting insert, and a dodecagon-shaped cutting insert.

10. The cutting insert pocket of claim 1, wherein the cutting insert pocket is configured to accommodate a round-shaped cutting insert, a square-shaped cutting insert, a pentagon-shaped cutting insert, and an octagon-shaped cutting insert.

11. A tool holder comprising:
a cutting insert pocket comprising:
a seat face configured to engage a top side or a bottom side of multiple differently-shaped double-sided cutting inserts;
a series of insert-engaging pocket walls configured to engage peripheral sides of the multiple differently-shaped double-sided cutting inserts, the insert-engaging pocket walls having an angle less than or equal to 90 degrees with respect to the seat face;
a series of non-engaging pocket walls configured to not contact the multiple differently-shaped double-sided cutting inserts positioned and secured in the pocket; and
a relief recess located between and separating the seat face and the series of insert-engaging pocket walls, the relief recess configured to provide clearance space for the cutting edges of the multiple differently-shaped double-sided cutting inserts positioned and secured in the pocket;
wherein the cutting insert pocket is configured to accommodate a round-shaped cutting insert and at least one polygon-shaped cutting insert.

12. The tool holder of claim 11, wherein the cutting insert pocket is configured to accommodate a round-shaped cutting insert and at least two different polygon-shaped cutting inserts.

13. The tool holder of claim 11, wherein the cutting insert pocket is configured to accommodate a round-shaped cutting insert and at least three different polygon-shaped cutting inserts.

14. The tool holder of claim 11, wherein the cutting insert pocket is configured to accommodate a round-shaped cutting insert, a hexagon-shaped cutting insert, and an octagon-shaped cutting insert.

15. The tool holder of claim 11, wherein the cutting insert pocket is configured to accommodate a round-shaped cutting insert, a pentagon-shaped cutting insert, and a heptagon-shaped cutting insert.

16. The tool holder of claim 11, wherein the cutting insert pocket is configured to accommodate a round-shaped cutting insert, a square-shaped cutting insert, a pentagon-shaped cutting insert, and an octagon-shaped cutting insert.

17. A cutting tool system comprising:
a cutting insert; and
a tool holder comprising:
a cutting insert pocket comprising:
a seat face configured to engage a top side or a bottom side of multiple differently-shaped double-sided cutting inserts;
a series of insert-engaging pocket walls configured to engage peripheral sides of the multiple differently-shaped double-sided cutting inserts, the insert-engaging pocket walls having an angle less than or equal to 90 degrees with respect to the seat face;
a series of non-engaging pocket walls configured to not contact the multiple differently-shaped double-sided cutting inserts positioned and secured in the pocket; and
a relief recess located between and separating the seat face and the series of insert-engaging pocket walls, the relief recess configured to provide clearance space for the cutting edges of the multiple differently-shaped double-sided cutting inserts positioned and secured in the pocket;
wherein the cutting insert pocket is configured to accommodate a round-shaped cutting insert and at least one polygon-shaped cutting insert.

18. The cutting tool system of claim 17, wherein the cutting insert pocket is configured to accommodate a round-shaped cutting insert and at least two different polygon-shaped cutting inserts.

19. The cutting tool system of claim 17, wherein the cutting insert pocket is configured to accommodate a round-shaped cutting insert and at least three different polygon-shaped cutting inserts.

20. The cutting tool system of claim 17, wherein the cutting insert pocket is configured to accommodate a round-shaped cutting insert, a hexagon-shaped cutting insert, and an octagon-shaped cutting insert.

* * * * *